(12) United States Patent
Ticknor et al.

(10) Patent No.: US 7,283,696 B2
(45) Date of Patent: Oct. 16, 2007

(54) MICROFLUIDIC CONTROL FOR WAVEGUIDE OPTICAL SWITCHES, VARIABLE ATTENUATORS, AND OTHER OPTICAL DEVICES

(75) Inventors: Anthony J. Ticknor, Cupertino, CA (US); John T. Kenney, Palo Alto, CA (US); Giacomo Vacca, Menlo Park, CA (US); Dudley A. Saville, Princeton, NJ (US); Ken G. Purchase, Mountain View, CA (US)

(73) Assignee: Lightwave Microsystems, Inc., San Jose, CA (US)

( * ) Notice: Subject to any disclaimer, the term of this patent is extended or adjusted under 35 U.S.C. 154(b) by 0 days.

(21) Appl. No.: 11/289,188

(22) Filed: Nov. 28, 2005

(65) Prior Publication Data

US 2006/0083473 A1    Apr. 20, 2006

Related U.S. Application Data

(62) Division of application No. 10/085,885, filed on Feb. 27, 2002, now Pat. No. 7,016,560.

(60) Provisional application No. 60/272,337, filed on Feb. 28, 2001, provisional application No. 60/360,742, filed on Feb. 27, 2002.

(51) Int. Cl.
*G02B 6/10* (2006.01)

(52) U.S. Cl. .................. 385/14; 385/129; 385/140; 385/16

(58) Field of Classification Search ............ 385/14–24, 385/140, 129–132
See application file for complete search history.

(56) References Cited

U.S. PATENT DOCUMENTS

| 4,390,403 A | 6/1983 | Batchelder |
| 4,505,539 A | 3/1985 | Auracher et al. |
| 4,583,824 A | 4/1986 | Lea |

(Continued)

FOREIGN PATENT DOCUMENTS

DE    197 11 564 A1    10/1998

(Continued)

OTHER PUBLICATIONS

Beni, G. et al. (1981), "Electro-Wetting Displays," *Appl. Phys. Lett.* 38(4): 207-209.

(Continued)

*Primary Examiner*—Kevin S. Wood
(74) *Attorney, Agent, or Firm*—Morrison & Foerster LLP

(57) ABSTRACT

Devices utilize elements carried by a fluid in a microchannel to switch, attenuate, shutter, filter, or phase shift optical signals. In certain embodiments, a microchannel carries a gaseous or liquid slug that interacts with at least a portion of the optical power of an optical signal traveling through a waveguide. The microchannel may form part of the cladding of the waveguide, part of the core and the cladding, or part of the core only. The microchannel may also have ends or may be configured as a loop or continuous channel. The fluid devices may be self-latching or may be semi-latching. The fluid in the microchannel is moved using e.g., e.g., electrocapillarity, differential-pressure electrocapillarity, electrowetting, continuous electrowetting, electrophoresis, electroosmosis, dielectrophoresis, electro-hydrodynamic electrohydrodynamic pumping, magneto-hydrodynamic magnetohydrodynamic pumping, thermocapillarity, thermal expansion, dielectric pumping, and/or variable dielectric pumping.

39 Claims, 31 Drawing Sheets

U.S. PATENT DOCUMENTS

| | | | |
|---|---|---|---|
| 4,789,228 | A | 12/1988 | Le Pesant et al. |
| 4,818,052 | A | 4/1989 | Le Pesant et al. |
| 4,988,157 | A | 1/1991 | Jackel et al. |
| 5,181,016 | A | 1/1993 | Lee |
| 5,699,462 | A | 12/1997 | Fouquet et al. |
| 5,795,457 | A | 8/1998 | Pethig et al. |
| 5,921,678 | A | 7/1999 | Desai et al. |
| 5,956,005 | A | 9/1999 | Sheridon |
| 5,960,131 | A | 9/1999 | Fouquet et al. |
| 5,978,527 | A | 11/1999 | Donald |
| 6,055,344 | A | 4/2000 | Fouquet et al. |
| 6,072,924 | A | 6/2000 | Sato et al. |
| 6,170,981 | B1 | 1/2001 | Regnier et al. |
| 6,195,478 | B1 | 2/2001 | Fouquet |
| 6,210,128 | B1 | 4/2001 | Rife et al. |
| 6,231,737 | B1 | 5/2001 | Ramsey et al. |
| 6,284,113 | B1 | 9/2001 | Bjornson et al. |
| 6,287,520 | B1 | 9/2001 | Parce et al. |
| 6,306,659 | B1 | 10/2001 | Parce et al. |
| 6,331,073 | B1 | 12/2001 | Chung |
| 6,331,439 | B1 | 12/2001 | Cherukuri et al. |
| 6,334,676 | B1 | 1/2002 | Kaszczuk et al. |
| 6,337,740 | B1 | 1/2002 | Parce |
| 6,342,142 | B1 | 1/2002 | Ramsey |
| 6,470,106 | B2 * | 10/2002 | McClelland et al. .......... 385/16 |
| 6,487,333 | B2 * | 11/2002 | Fouquet et al. ............... 385/18 |
| 6,621,952 | B1 * | 9/2003 | Pi et al. ........................ 385/30 |
| 6,949,176 | B2 | 9/2005 | Vacca et al. |
| 7,016,560 | B2 | 3/2006 | Ticknor et al. |
| 2002/0048425 | A1 * | 4/2002 | McBride et al. ............... 385/16 |
| 2003/0006140 | A1 | 1/2003 | Vacca et al. |
| 2003/0012483 | A1 | 1/2003 | Ticknor et al. |

FOREIGN PATENT DOCUMENTS

| | | |
|---|---|---|
| EP | 0 815 940 A2 | 1/1998 |
| EP | 0 815 940 A3 | 1/1998 |
| EP | 0 884 714 A2 | 12/1998 |
| EP | 0 884 714 A3 | 12/1998 |
| FR | 2 794 039 A1 | 12/2000 |
| GB | 2 204 710 A | 11/1988 |
| GB | 2 207 522 A | 2/1989 |
| GB | 2 254 161 A | 9/1992 |
| JP | 06-175052 A | 6/1994 |
| JP | 07-092405 A | 4/1995 |
| JP | 08-062645 A | 3/1996 |
| WO | WO-01/98759 A2 | 12/2001 |
| WO | WO-01/98759 A3 | 12/2001 |
| WO | WO-02/068821 A2 | 9/2002 |
| WO | WO-02/068821 A3 | 9/2002 |
| WO | WO-02/069016 A2 | 9/2002 |
| WO | WO-02/069016 A3 | 9/2002 |

OTHER PUBLICATIONS

Jackel, J. L. et al. (1983). "Electro Wetting Switch for Multimode Optical Fibers," *Applied Optics* 22(11): 1765-1770.

Jang, J. et al. (2000). "Theoretical and Experimental Study of MHD (Magnetohydrodynamic Micropump," *Sensors and Actuators* 80:84-89.

Krijnen, G. J. M. et al. (1999). "Optical Devices Based on Fluidic Controlled Two-Mode Interference," *J. Micromech. Microeng.* 9:203-205.

Lea, M. C. (1981). "Optical Modulators Based on Electrocapillarity," *Optic Letters* 6(8):395-397.

Lee, J. et al. (2000). "Surface-Tension-Driven Microactuation Based on Continuous Electrowetting," *Journal of Microelectromechanical Systems* 9(2):171-180.

Lemoff, A. V. et al. (2000). "An AC Magnetohydrodynamic Micropump," *Sensors and Actuators* B63: 178-185.

Makihara, M. et al. (1999). "Micromechanical Optical Switches Based on Thermocapillary Integrated in Waveguide Substrate," *Journal of Lightwave Technology* 17(1):14-18.

Patent Abstracts of Japan for Japanese patent No. 06-175052, published on Jun. 24, 1994, 2 pages. (Abstract only).

Patent Abstracts of Japan for Japanese patent No. 07-092405, published on Apr. 07, 1995, 1 page. (Abstract only).

Patent Abstracts of Japan for Japanese patent No. 08-062645, published on Mar. 08, 1996, 1 page. (Abstract only).

Pollack, M. G. et al. (2000). "Electrowetting-Based Actuation of Liquid Dropets for Microfluidic Applications," *Applied Physics Letters* 77(11):1725-1726.

Prins, M. W. J. et al. (2001). "Fluid Control in Multichannel Structures by Electrocapillary Pressure," *Science* 291:277-280.

Richter, A. et al. (1990). "An Electrohydrodynamic Micropump," *IEEE Proc. Mems.* New York, USA, pp. 99-104.

Richter, A. et al. (1991). "Electrohydrodynamic Pumping and Flow Measurement," *IEEE Proc. Mems*, New York, USA, pp. 271-276.

Ross, D. et al. (2001). "Microfluidic Optical Switches Using Two Non-Mixing Fluids in a Mach Zehnder Interferometer," OECC/IOOC 2001 Conferences Incorporating ACOFT, Monday Jul. 2-Thursday Jul. 5, 2001, 2 pages.

Sakata, T. et al. (2001). "Improvement of Switching Time in a Thermocapillarity Optical Switch," *Journal of Lightwave Technology* 19(7):1023-1027.

Sato, M. (1994). "Electrocapillarity Optical Switch," *IEICE Trans. Commun.* E77-B(2):197-203.

Togo, H. et al. (1999). "Multi-Element Thermo-Capillary Optical Switch and Sub-Nanoliter Oil Injection for its Fabrication," *Miro Electro Mechanical Systems. 12th IEE International Conference.* Jan. 17-21, 1999 pp. 418-423.

Vallet, M. et al. (1996) "Electrowetting of Water and Aqueous Solutions on Poly(Ethylene Terephthalate) Insulating Films," *Polymer* 37(12):2465-2470.

* cited by examiner

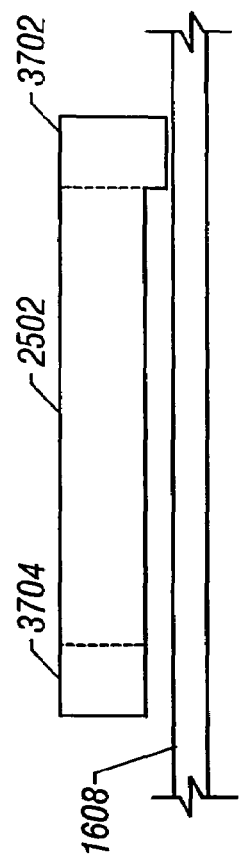
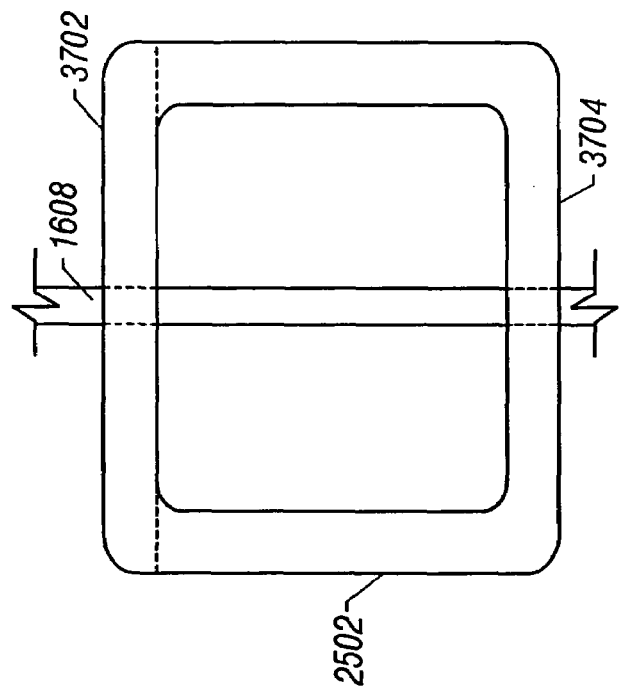
FIG. 37
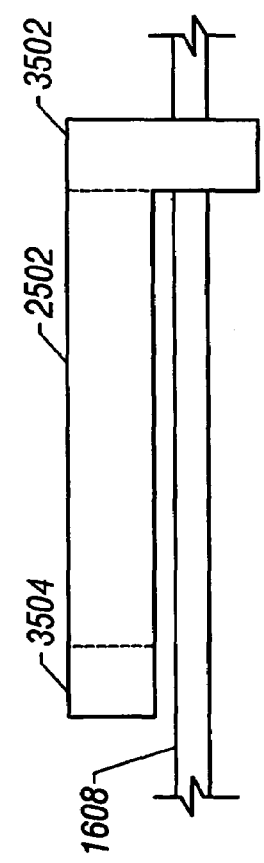
FIG. 38
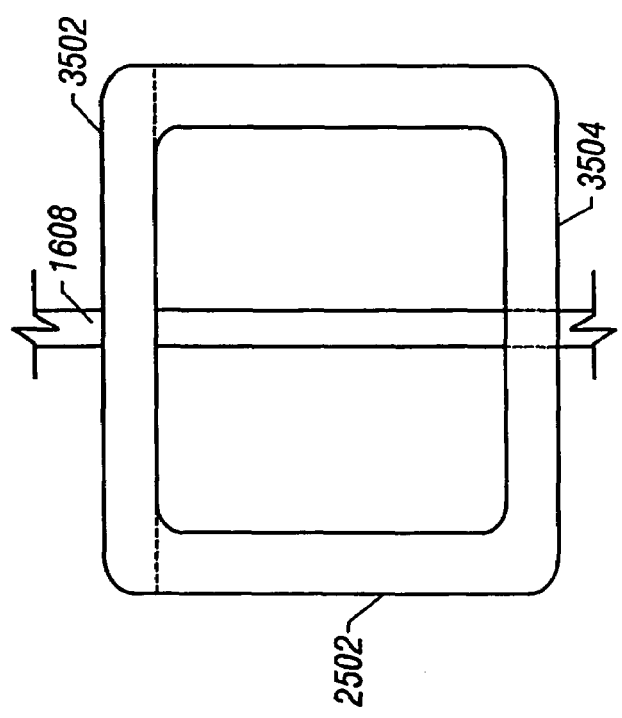
FIG. 35
FIG. 36

US 7,283,696 B2

MICROFLUIDIC CONTROL FOR WAVEGUIDE OPTICAL SWITCHES, VARIABLE ATTENUATORS, AND OTHER OPTICAL DEVICES

This application is a divisional of U.S. patent application Ser. No. 10/085,885, filed Feb. 27, 2002 now U.S. Pat. No. 7,016,560, which claims the benefit of priority of U.S. Provisional Ser. No. 60/272,337, filed Feb. 28, 2001, the contents of which are hereby incorporated by reference into the present disclosure. This application also incorporates by reference U.S. Provisional Application No. 60/360,742, entitled "Microfludic Control For Waveguide Optical Switches, Variable Attenuators, And Other Optical Devices" filed on Feb. 27, 2002.

TECHNICAL FIELD

This invention relates generally to optical switches, shutters, and dynamically programmable optical attenuators. In particular, the invention provides implementations for switching optical signals among optical waveguides or changing the transmission of optical signals within optical waveguides by means of displacement of fluids incorporated within or adjoining to waveguide structures. Application of the invention facilitates the implementation of monostable and/or bistable mechanical switches and variable optical attenuators in an integrated photonic circuit.

BACKGROUND OF THE INVENTION

Fiber optics communication links are used in numerous applications and, in particular, are extensively utilized as the primary means of carrying telecommunications and internet traffic between, and increasingly within, concentrations of users. These optical networks and their required management become increasingly sophisticated as their reach and capabilities increases. Of particular importance is reliable, electronically-automated means for setting and reconfiguring the interconnections and transmissivity levels of these links at the optical level so the various optical streams may be properly groomed and routed. Although it is possible to achieve these functions by converting the optical energy to electrical signals, routing the electrical signals, and converting back to optical form, much higher performance can be achieved by directly manipulating the optical streams. This is referred to as "transparent" operation, since once the setting is configured, the optical signals obey the set routing regardless of the nature of the information they carry. The physical implementation of setting and reconfiguring these transparent interconnections is a primary domain of optical switches and variable attenuators.

Current optical technology for switching and variable attenuation can be divided into two major classifications. The first and currently dominant approach is mechanical, whereby the physical displacement of at least one element of the optical path within the device changes the coupling of the optical signals at one input port from one output port to another. Mechanical switches can provide highly efficient switching, with very little of the optical energy getting out of the channel (low insertion loss) and extremely little optical energy leaking into unselected configurations (low crosstalk). Mechanical switches, however, tend to require rather bulky packaging to help isolate the optical paths from unwanted disturbances, and, being an assembly of mechanical movements and bulk optical devices, are not directly integratable with the other waveguide devices used in optical network management. Also, being an assembly with moving parts and requiring to maintain tolerances usually below 1 µm, mechanical switches elicit heightened concerns for reliability issues. Recently, several approaches have been undertaken to miniaturize mechanical optical switches using the micromechanical structures realizable in MEMS technologies. This provides some promise for improvement of the basic mechanical reliability and the potential to place more switch elements in a single package. However, these are still just miniaturized versions of bulk switches and still have significant lengths of optical path outside of waveguides and hence require extraordinary isolation from mechanical disturbances. Furthermore, while these approaches employ processes that can make multiple switches during a single process step, assembly constraints for interfacing optical fiber or other guided-wave components to the free-space switch still limit the potential for mass production and there is no accommodation for integration with other waveguide elements.

The other major class of technology for optical switching and variable attenuation is refractive. Here the optical paths typically are wholly within waveguides and the distribution of refractive indices along the optical paths is altered by a stimulus, typically a local application of heat or electric field, to route the optical signals along selected branches of the waveguide network. Such switches and attenuators are directly integratable with other waveguide devices, and the production methods, including the necessary fiber bonding, are better suited for mass production. Since there is no physical displacement of the alignment for the optical paths, the solid-state switches promise attainment of improved reliability over mechanical switches, particularly as evaluated over large populations of switches in real-world deployments. These types of switches as standard components represent a less mature technology than standard mechanical switches. In order to achieve the desired sensitivity to the thermal or electric-field stimulus, the materials currently used for such waveguides do not provide lossless, polarization-insensitive transmission such as is obtained in high-quality silica planar waveguides. The constructed switches do not typically as yet provide as low insertion loss as mechanical switches and may not be capable of the ultra-high isolation that can be achieved in mechanical switches.

Another class of less widely pursued switching mechanisms that combine some of the characteristics of both mechanical and refractive approaches is based on microfluidics. Microfluidics encompasses a broad range of effects and the basic physics has been well studied for quite some time. Reported applications to optical switching are limited to one basic structure: a fluid region along the back of a turning facet at an abrupt waveguide bend or crossing [e.g., see J. L. Jackel et al., U.S. Pat. No. 4,988,157 (1991); M. Hideki et al., Jap. Pat. No. 6-175052 (1994); M. Sato, Jap. Pat. No. 7-092405 (1995); J. E. Fouquet et al., U.S. Pat. No. 5,699,462 (1997); D. K. Donald, U.S. Pat. No. 5,978,527 (1999)]. One fluid will have a refractive index near that of the waveguide mode, typically near 1.45, and when occupying the region behind the facet will render the reflectivity of the facet to be near zero. Optical signals encountering the facet in this condition will travel predominantly straight through the facet where they will couple into a coaxially-aligned waveguide just beyond the fluid region. When another fluid of much lower refractive index, typically a gas or vapor with index of refraction near 1.0, is moved to or created at the facet, the facet becomes nearly fully reflective. Optical signals encountering this facet will deflect off the facet and couple into another waveguide with an axis disposed at a position and angle with respect to the incoming waveguide so as to collect the deflected optical signal. In theory these devices can be very efficient. High efficiency requires well-aligned optical facets with very high optical quality; in particular, the reflective state poses stringent requirements on the quality of the facet because of the large refractive index contrast between the waveguides and the gas or vapor in the region behind the facet. In practice these facets are very difficult to make [e.g., see J. E. Fouquet et al., U.S. Pat. No. 5,960,131 (1999); J. E. Fouquet et al., U.S. Pat. No. 6,055,344 (2000); M. Sato et al., U.S. Pat. No. 6,072,9247 (2000)] and there are major challenges to overcome for making and assembling highly efficient devices with high yield. Further, most previously disclosed microfluidics-based devices rely on either a phase change or;a substantial thermal gradient in the liquid, and they would not generally be considered low-power switching methods.

SUMMARY OF THE INVENTION

The invention provides families of optical waveguide devices for various purposes including switching and attenuation of optical signals where the effect that a device has on an optical signal is controlled by the movements of minute volumes of fluid having different refractive indices. In any of the contexts of this invention, it is to be recognized that the term "fluid" is applied to describe regions of liquid, vapor, or gas, and may include aerosols, slurries, suspensions, or other two- or three-phase systems in which a solid, liquid, and/or gas or vapor is present. The regions within which the fluids are moved preferably contain more than one volume of fluid that is immiscible with the adjacent volume. Movement of the fluid then moves the interface between these volumes within a particular region such that one fluid is displaced by another over some fraction of that volume. The microfluidic effect or motive force utilized to move the fluid interfaces may be electrocapillarity, differential-pressure electrocapillarity, electrowetting, continuous electrowetting, electrophoresis, electroosmosis, dielectrophoresis, electrohydrodynamic pumping, magnetohydrodynamic pumping, thermocapillarity, thermal expansion, dielectric pumping, variable dielectric pumping, or similarly related effects. In many instances, the motive force acts upon an interface between two fluids.

In the technical findings of this invention each of these effects may be utilized to deliberately reconfigure the distribution of refractive index and/or optical absorption in the vicinity of a physical optical pathway such as an optical waveguide. The deliberate induction of these reconfigurations further forms optical devices in which the transmitted optical signal is programmably altered by the consequent changes in the refraction, diffraction, dispersion, reflection, retardation, and/or absorption of the optical signal in the pathway. These changes are manifested as a change in the overall transmission of an optical signal through the device according to any of numerous effects including interference, delta-beta coupling, damped resonant coupling, mode spoiling or leakage, mode evolution, scattering, diffraction, dispersion, total internal reflection, frustrated total internal reflection, dielectric reflection, and metallic reflection.

Production of arrays or other concentrated collections of such devices by known methods provides a practically achievable density that is far less than the ultimate optically achievable density. The number of elements that can be placed in a given area is typically limited by the bulk and power-dissipation requirements of the actuation method, and/or by the need to expand the optical mode to a form that will suitably interact with the device. By utilizing the findings of this invention, these devices can be made with ultra-low power dissipation, utilizing structures that are comparable in size and geometry to the optical waveguides and that manipulate the optical signal directly within the waveguide. Consequently, the mechanisms of this invention are more naturally integrated with dense arrays of integrated optical devices, thereby providing improved efficiency and higher functional density.

In any of the embodiments of this invention, the optical component of the device is to be constructed such that some fraction or essentially all of the optical field transmitted by the device extends into or through a region occupied by one or more of the fluids. Displacement of one fluid by another within this region induces a refractive change in the optical path through the device. Refractive changes are intended to include changes to either the phase-accumulation (i.e., the 'real'), or the absorptive (i.e., the 'imaginary'), or both, components of the index of refraction. The optical circuit of the device is designed to translate this change into the desired transmissive effect, such as switching or programmable attenuation. Interfaces between different fluids in these regions can be intentionally moved by one or more microfluidic effects to accomplish desired switching or attenuation effects.

The fluid regions may be capillary channels nominally parallel and adjacent to the optical pathways along distances typically of several millimeters, where the nominal movement of the fluid interfaces is longitudinal along the optical path, providing a continuous range of total refractive change. The regions may also be narrow or broad areas where a fluid interface moves laterally across the optical path, providing a more abrupt total refractive change.

In many applications of this invention, the path of the optical circuit is preferably defined by optical waveguides. The refractive properties of any segment of a waveguide are primarily determined by the cross-sectional refractive profile in the near vicinity of the waveguide. This is determined by the distribution of materials and their refractive properties within the range of optical influence in a conceptual slice depicting a plane perpendicular to the direction of optical propagation for that segment. For instance, in devices for fiber optical telecommunications networks, waveguide devices are preferably single-mode with core dimensions a few microns across and the optical influence extends into the cladding substantially no more than 20 μm from the center of the core. In waveguide-based embodiments of this invention, the fluid region may make up part or all of either waveguide cladding or core, or both, along the relevant segments of the waveguide. The refractive properties of the waveguide segment are altered when one fluid displaces another to provide the desired device function.

This invention includes waveguide devices having two or more non-contiguous segments along the propagation axis. For instance, a fluid trench may wholly or partially interrupt a waveguide along a short length of the core. The resulting gap is preferably short enough not to introduce an undesired level of optical loss as the optical signal diffracts unguided across the trench and couples back into the subsequent waveguide segment. In the telecommunication waveguide device mentioned above, the trench could be up to about 20 μm wide without introducing excessive incidental loss. Again, displacing the fluid in the trench with another with different refractive properties provides the optical change that engages the device function.

The moving refractive fluids of the device may be one or more of the fluids directly acted upon by the microfluidic motive force used, and may also include subordinate fluid volumes that are displaced by the movement of the primary fluid volumes. Furthermore, there may be subordinate refractive, diffractive, reflective, or absorptive elements that are solid and are dragged along by the surface tension and interfaces of the fluids, or by viscous drag of the fluid flow itself.

The motive force supplied to move the fluids is preferably located away from the optical zone (the optical zone being that area of a device into which the electromagnetic field of the optical signal extends). This permits features such as electrodes to be positioned away from the optical zone, and this also allows the use of fluids that are particularly well-suited to their purpose to be positioned at the appropriate location. For example, one or more fluids that have a high capacity to be moved can be positioned in the motive force region where other components such as electrodes are located, and another fluid or fluids that have suitable optical properties can be positioned in the optical zone or sufficiently near the optical zone to be moved into the optical zone upon either application or removal of the motive force.

In many instances, the volumes of fluids incorporated into a single device measure in the picoliter to milliliter range, with typical volumes measured in nanoliters. Devices of the invention typically have small microchannels where fluid motion is dominated by interfacial forces and not by gravity. Round capillary channels are typically less than 1 mm in radius, while square- or rectangularly-shaped microchannels are typically less than 1 mm in width and less than 100 μm in depth. In many preferred embodiments, the microchannels have widths between 1 mm and 10 μm, and the depth of these microchannels is between 10 and 25 μm.

Moving the fluid or fluids using forces induced by a potential difference or electric field can provide the low power dissipation sought of a preferred embodiment of this invention. The present invention also improves on prior art (e.g., in devices employing the mechanism of total internal reflection) by allowing the use of two liquids, instead of a liquid and a gas or vapor, for the two states in an optical switch. This relaxes the requirements on the quality of optical facets that cross a waveguide, resulting in greater manufacturability and higher yield. Further, many of the devices and methods disclosed herein provide ways to improve significantly certain performance characteristics (such as, e.g., insertion loss) compared to existing devices and methods that rely, e.g., on total internal reflection.

The devices of the invention may be configured to be compatible with modern methods of fabricating integrated optical devices and to provide high-performance operation and superior reliability.

BRIEF DESCRIPTION OF THE DRAWINGS

Relationships of this invention to the field and several representative embodiments thereof will be readily understood by the subsequent detailed description including references to the accompanying drawings, wherein like reference tags refer to equivalent structural members within the accompanying drawings.

In FIG. 16-55, the cladding is not illustrated for sake of clarity.

FIG. 16-24 depict various crossing configurations of a core and an open-ended channel.

FIG. 16-18 illustrate a core and channel configuration in which the channel intersects the core and extends into the cladding above the core.

FIG. 19-21 illustrate a core and channel configuration in which the channel intersects a portion of the core and in addition extends into the cladding above the core.

FIG. 22-24 illustrate a core and channel configuration in which the channel crosses the core by surrounding it on more than one side without intersecting it.

FIG. 25-42 depict various configurations of a core and a continuous channel.

FIG. 31 illustrates the use of multiple fluids with different functions in the same channel.

FIG. 32 illustrates a variable optical attenuator or shutter in which the channel replaces a segment of the core.

FIG. 41 illustrates a core and channel configuration in which the channel is patterned to enhance control of fluid movement.

FIG. 42 illustrates a semi-latching core and continuous channel configuration that uses a tapered channel segment.

FIG. 43 illustrates one embodiment of the invention, a digital variable optical attenuator.

FIG. 44 depicts a side view of one version of the attenuator of FIG. 43.

FIG. 46-48 illustrate a switch, attenuator, or shutter based on a directional coupler of the invention.

FIG. 49 illustrates a switch or shutter based on a directional coupler.

FIG. 50-51 depict a switch, attenuator, or shutter based on a Mach-Zehnder interferometer.

FIG. 52 illustrates a switch or shutter based on a Mach-Zehnder interferometer.

FIG. 53 illustrates a multimode interference filter of the invention.

FIG. 54 illustrates a mode-evolution switch.

FIG. 55 illustrates a diffracting filter employing the invention.

Figure 1:
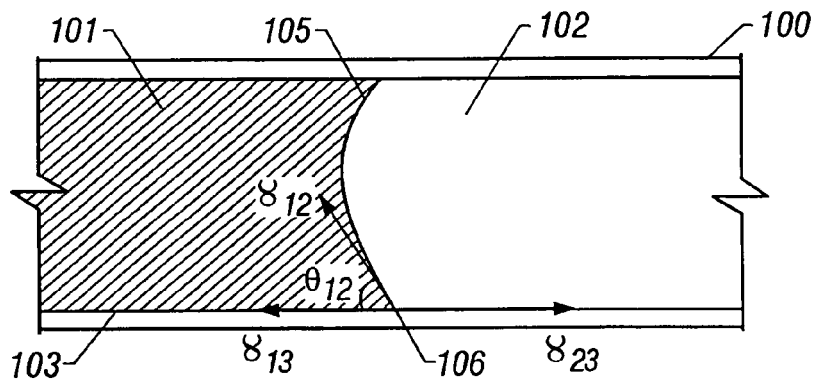
FIG. 1 illustrates a fluid-fluid interface in a microchannel.

Although the figures depict electrodes in certain positions such as at the bottom, on the sides, or above or beneath channels, the electrodes may be positioned in any convenient location in relation to the channels so long as the electrodes provide the designated effect. The electrodes may further be arranged in different ways with respect to the fluids, according to the requirements of the motive force used, as described herein.

Also, the electrodes are shown in the figures as connected to a DC voltage source. In the invention, the voltage signal applied to the electrodes may be dc, ac, a combination of the two, and may further be modulated, depending on the requirements of the motive force used and on the details of the device, such as, e.g., size, geometry, and material properties of the fluids.

The electrodes may further be in direct contact with the fluid or fluids, or they may be separated from them by a thin passivation layer or layers (e.g., a 1-µm film of $SiO_2$), depending on the motive force used and on the details of the device. For example, a passivation layer or layers may not be present when flow of DC electrical current through one or more fluids is desired. Conversely, a passivation layer or layers may be present in cases where such flow of electrical current is unnecessary or detrimental, or to prevent electrochemical reactions at the electrode surfaces.

Further, certain figures illustrate the fluid channel being separated from the core of the waveguide by a thin layer. This layer may or may not be present in the invention, and thus the fluid channel may reside directly on the core or may be separated from it by, e.g., a portion of cladding material in the various embodiments of the invention.

DETAILED DESCRIPTION OF PREFERRED EMBODIMENTS

Several embodiments are discussed below and with reference to the attached drawings. These descriptions and drawings provide examples of certain embodiments of the invention and are not to be construed as limiting the scope of the invention. Instead, the invention is to be accorded the breadth as described herein and as defined in the claims that form part of this specification.

One factor in the operation of devices according to this invention is the ability to displace small volumes of liquid, in some cases only a few picoliters, in response to an electrical signal. Fluids can be moved by dielectric pumping or variable dielectric pumping, in which a difference in capacitance is used to move two dielectric fluids in contact with one another. Other forces used to move fluids include electrical effects (such as electrocapillarity, differential-pressure electrocapillarity, electrowetting, and continuous electrowetting) and thermal effects (such as thermocapillarity) that change the interfacial energy at the interfaces between fluids and at the interfaces between liquids and solids; the electrokinetic effects of electroosmosis and electrophoresis; and dielectrophoresis, electrohydrodynamic pumping, and magnetohydrodynamic pumping. Also, the invention involves devices relying on the thermal expansion on fluids constrained in capillary channels.

Following is a detailed description of the basic physics of certain microfluidic effects, followed by a description of some channel configurations in which the microfluidic effects can be incorporated and embodied. Next is a description of devices that can be formed using these microfluidic effects and channel configurations, followed by a description of methods of fabricating the devices.

Physics of Microfluidics

When fluids are confined to microchannels, a dominant role is played by interfacial forces, which act at boundaries between different phases of the same medium (e.g., liquid-vapor) or between different media (e.g., solid-liquid, liquid-liquid, solid-gas, or liquid-gas). To portray microfluidic behavior, the concepts of surface energy and surface tension are useful [e.g., see J. Israelachvili, *Intermolecular and Surface Forces*, $2^{nd}$ ed. (Academic Press, London, 1991); A. W. Adamson and A. P. Gast, *Physical Chemistry of Surfaces*, $6^{th}$ ed. (Wiley, New York, 1997)].

From a microscopic perspective, an atom or molecule at a surface experiences a different local environment compared to one in the bulk. This asymmetry can be represented by the surface energy $\gamma$, which is defined as the increase in the Gibbs free energy of a thermodynamic system due to a unit increase in surface area. Surface energy (energy per unit area, $J/m^2$) and surface tension (force per unit length, N/m) are two interpretations of the same quantity, and are dimensionally and numerically equivalent.

The surface energy of a material (e.g., medium i) in vacuum is indicated with $\gamma_i$. When two dissimilar materials 1 and 2 are in contact, their interfacial energy $\gamma_{12}$ is given by the Dupré equation:

$$\gamma_{12} = \gamma_1 + \gamma_2 - W_{12}, \quad \text{(Eq. 1)}$$

where $W_{12}$ is the work of adhesion per unit area needed to separate, in vacuum, media 1 and 2 from mutual contact. A more general form of the Dupré equation relates $W_{132}$, the work of adhesion per unit area of media 1 and 2 in medium 3 (where 3 is something other than vacuum), to the pairwise interfacial energies of the three media:

$$W_{132} = \gamma_{13} + \gamma_{23} - \gamma_{12}. \quad \text{(Eq. 2)}$$

For the purposes of the invention, the case of three media is particularly important. The devices described herein typically involve at least a solid (e.g., the microchannel wall), a liquid, and either another liquid or a gas or vapor. This situation is depicted in FIG. 1, which shows a cross-section through three-phase contact line 106 in microchannel 100. Here 101 is a liquid (medium 1 in Eq. 2), 102 is a gas (medium 2), and 103 is the solid wall (medium 3). In addition to the interfacial tensions, the behavior of this system is characterized by the contact angle $\theta_{12}$ measured through medium 1; for equilibrium, the free energy of the system must be minimized with respect to variations in $\theta_{12}$. This requirement leads to the Young-Dupré equation:

$$\gamma_{13} + \gamma_2 \cos \theta_{12} \gamma_{23}, \quad \text{(Eq. 3)}$$

which expresses the intuitive notion that the interfacial tensions must be mechanically balanced at the contact line. A liquid is said to wet a solid surface if the contact angle is less than 90°.

The presence of an interfacial tension $\gamma_{12}$ at the boundary 105 between media 1 and 2 means that, if the interface is curved, there will be a pressure step $P_{cap}$ across it called capillary pressure. This is encapsulated in the Young-Laplace equation:

$$P_{cap} = \gamma_{12}\left(\frac{1}{R_A} + \frac{1}{R_B}\right), \quad \text{(Eq. 4)}$$

where $R_A$ and $R_B$ are the principal radii of curvature of the interface. The sign of the pressure difference is such that the pressure on the convex side is higher. The shape and, hence, the curvature of the interface depend primarily on three factors: the geometry of the confining boundaries, the interfacial tension, and the contact angle. For zero contact angle, the radius of curvature adopted by an interface spanning a microchannel of width a is approximately $R=a/2$; a finite contact angle modifies this to $R=a/(2 \cos \theta_{12})$. In the devices of the invention, the microchannels typically have an approximately rectangular cross-section, so $$P_{cap} = 2\gamma_{12}\cos\theta_{12}\left(\frac{1}{w} + \frac{1}{d}\right), \quad \text{(Eq. 5)}$$

where w is the width and d is the depth of the microchannel.

Normally the pressure step $P_{cap}$ is associated with the rise (or fall) of the liquid level, under gravity, in a capillary tube dipped into an open reservoir. In a microfluidic system, however, the weight of the fluid plays a minor role. The equilibrium state of a microfluidic device has more to do with the configuration of the channels and any reservoir pressures. For example, if a uniform microchannel forms a closed loop, the capillary pressure steps across all the fluid-fluid interfaces add up to zero around the loop, at equilibrium. This kind of configuration makes for a so-called self-latching system, where the fluids move in response to a stimulus and remain in their new position after the stimulus is removed. If, on the other hand, a single microchannel connects two separate, sealed reservoirs, the hydrostatic pressures in the reservoirs provide a restoring force against fluid movement in the channel. This second kind of configuration constitutes a so-called semi-latching system, where the fluids return to their original position once the stimulus is removed.

To generate fluid movement, the equilibrium state needs to be altered by adding extra forces to the system. The microfluidic motive forces described herein achieve that in different ways. Some (e.g., electrocapillarity, differential-pressure electrocapillarity, electrowetting, continuous electrowetting, and thermocapillarity) do so by programmably modifying the existing capillary pressures $P_{cap}$ between fluids (Eq. 5) through the interfacial tension $\gamma_{12}$, the contact angle $\theta_{12}$, or both. Others (e.g., electrophoresis, electroosmosis, dielectrophoresis, electrohydrodynamic pumping, magnetohydrodynamic pumping, thermal expansion, dielectric pumping, and variable dielectric pumping) do so by programmably introducing additional forces or pressures.

The small channel sizes and the comparatively low speeds of fluid flow in microfluidic systems mean that the flow is typically characterized by a low Reynolds number, which measures the relative importance of inertial and viscous forces. This implies that the flow is laminar and dominated by viscous forces. As pressure changes develop due to some motive force, the fluid accelerates until viscous losses balance the driving force. The expression describing the fluid flow in a channel at low Reynolds numbers, while known, is cumbersome; here we present as an example the simplified case of a channel where the width w is much greater than the depth d. The viscosity is then dominated by the smaller dimension d, and the average steady fluid speed $\tilde{v}$ due to a pressure difference $\Delta P$ becomes $$\tilde{v} = \frac{\Delta P d^2}{12\mu L}, \quad \text{(Eq. 6)}$$

where $\mu$ is the fluid dynamic viscosity and L is the length of the channel.

In the field of the invention, the flow may further depart from this approximate expression due to the presence of interfaces between dissimilar fluids, due to the finite extent of a fluid segment (a slug) or segments within an otherwise gas-filled microchannel, or due to the presence of bends or cross-sectional variations in the microchannels. Further, in some devices of the invention, it may be desirable to apply (turn on) the motive force only for brief intervals of time, during which the flow may or may not become fully developed. The expression embodied in Eq. 6 is, therefore, to be understood as an order-of-magnitude indicator of the flow speeds involved.

In some preferred embodiments of the invention, the principle is to displace one fluid with another over some distance in a microchannel, the two fluids differing in refractive index. This concept holds regardless of the motive force used. Depending on the actuation principle used, however, different requirements will be imposed on the physical properties of the fluids employed in the invention. For example, when moving fluids by dielectric pumping, the dielectric constant of the fluid is a critical property, while when using thermal expansion, the coefficient of thermal expansion is central.

Table 1 provides a selection of physical properties of fluids that may be used in the invention. Quoted values are compiled from several sources and have varying degrees of accuracy; blank boxes indicate that a value was not available. The physical properties of fluids listed in Table 1 are: the refractive index $n_D$ (measured at the sodium line, $\lambda_D=589.3$ nm); the density $\rho$, the melting and boiling points, respectively $T_m$ and $T_b$; the dynamic viscosity $\mu$; the surface energy $\gamma$, and the dielectric constant $\in$. Also listed are the cohesive energy densities $\delta_d$, $\delta_p$, and $\delta_n$, respectively indicating the contributions from dispersion forces, polarization forces, and hydrogen bonding. These can be used, in techniques known to those skilled in the art, to estimate the mutual miscibility of different fluids or the solubility of other substances in a fluid, and the properties of the resulting mixtures or solutions. Additional properties not listed in Table 1, but that may be relevant to the choice of fluids for a device, include electrical conductivity and formation of polarizable interfaces. The fluids are chosen based on individual properties (e.g., low viscosity to reduce drag during actuation), as well as based on the properties of fluids in combinations (e.g., low miscibility to prevent large shifts in the material properties of the individual fluids).

TABLE 1

Selected physical properties of fluids that may be used in the invention.

| fluid | $n_D$ | $\rho$ $10^3$ kg/m$^3$ | $T_m$ °C. | $T_b$ °C. | $\mu$ $10^{-3}$Ns/m$^2$ | $\gamma$ $10^{-3}$N/m | $\epsilon$ | $\delta_d$ J$^{1/2}$/cm$^{3/2}$ | $\delta_p$ J$^{1/2}$/cm$^{3/2}$ | $\delta_h$ J$^{1/2}$/cm$^{3/2}$ |
|---|---|---|---|---|---|---|---|---|---|---|
| acetone | 1.359 | 0.792 | −95 | 57 | 0.32 | 23.7 | 20.85 | 15.5 | 10.4 | 7.0 |
| acetonitrile | 1.346 | 0.783 | −42 | 82 | 0.35 | 29.3 | 37.00 | 15.8 | 18.0 | 6.1 |
| acetophenone | 1.534 | 1.026 | 20 | 202 | 1.62 | 39.8 | 17.39 | 18.0 | 8.6 | 3.7 |
| benzene | 1.501 | 0.879 | 6 | 80 | 0.60 | 28.9 | 2.28 | 18.1 | 1.0 | 2.0 |
| bromobenzene | 1.560 | 1.499 | −31 | 156 | 0.99 | 36.5 | 5.40 | 20.5 | 5.5 | 4.1 |
| 1-bromonaphthalene | 1.658 | 1.488 | 3 | 281 | 4.52 | 44.2 | 5.12 | 19.6 | 3.1 | 4.1 |
| butyrolactone | 1.434 | 1.129 | −44 | 206 | 1.70 | 58.2 | 39.00 | 19.6 | 16.6 | 7.4 |
| carbon tetrachloride | 1.463 | 1.595 | −25 | 77 | 0.88 | 27.0 | 2.24 | 16.9 | 0.0 | 0.0 |
| chlorobenzene | 1.525 | 1.107 | −50 | 132 | 0.80 | 33.6 | 5.71 | 18.9 | 4.3 | 2.1 |
| cyclohexane | 1.429 | 0.779 | 7 | 81 | 0.90 | 25.5 | 2.02 | 16.7 | 0.0 | 0.0 |
| cyclohexanol | 1.466 | 0.962 | 24 | 162 | 56.20 | 33.9 | 15.00 | 17.4 | 4.1 | 13.5 |
| cyclohexanone | 1.451 | 0.973 | −24 | 156 | 1.80 | 34.5 | 18.30 | 17.7 | 8.4 | 5.1 |
| decahydronaphthalene | 1.476 | 0.883 | −37 | 191 | 2.80 | 31.1 | — | 18.4 | 0.0 | 0.0 |
| 1,2-dichloroethane | 1.444 | 1.257 | −35 | 84 | 0.73 | 24.2 | 10.65 | 18.1 | 5.3 | 4.1 |
| diethyl ketone | 1.394 | 0.816 | −42 | 103 | 0.44 | 25.1 | 17.00 | 15.7 | — | — |
| dimethylacetamide | 1.438 | 0.937 | −20 | 166 | 0.92 | 34.0 | 37.78 | 16.8 | 11.5 | 10.2 |
| dimethylformamide | 1.427 | 0.949 | −58 | 153 | 0.80 | 37.4 | 36.16 | 17.4 | 13.7 | 11.3 |
| dimethyl sulphoxide | 1.476 | 1.102 | 19 | 189 | 2.00 | 43.5 | 46.68 | 18.9 | 16.4 | 10.2 |
| ethanol | 1.362 | 0.789 | −116 | 79 | 1.08 | 22.8 | 24.30 | 15.8 | 8.8 | 19.5 |
| ethylbenzene | 1.498 | 0.867 | −93 | 135 | 0.64 | 29.2 | 2.41 | 17.3 | 0.6 | 1.4 |
| ethylene glycol | 1.427 | 1.113 | −14 | 199 | 17.40 | 47.7 | 35.85 | 16.9 | 11.1 | 26.0 |
| formamide | 1.445 | 1.134 | 3 | 211 | 3.30 | 58.2 | 109.00 | 17.2 | 26.2 | 19.0 |
| gallium | — | 6.095 | 30 | 2403 | — | 720.0 | — | — | — | — |
| glycerol | 1.473 | 1.260 | 18 | 290 | 950.00 | 63.4 | 42.50 | 17.3 | 12.1 | 29.3 |
| heptane | 1.386 | 0.684 | −91 | 98 | 0.39 | 20.3 | 1.92 | 15.2 | 0.0 | 0.0 |
| hexane | 1.375 | 0.660 | −94 | 69 | 0.29 | 18.4 | 1.89 | 14.8 | 0.0 | 0.0 |
| isobutyl acetate | 1.388 | 0.871 | −99 | 116 | 0.65 | 23.7 | 5.29 | 15.1 | 3.7 | 7.6 |
| isobutyl alcohol | 1.397 | 0.801 | −108 | 107 | 3.57 | 23.0 | 17.70 | 15.2 | 5.7 | 16.0 |
| mercury | 1.750 | 13.546 | −39 | 357 | 1.55 | 475.0 | — | — | — | — |
| methanol | 1.331 | 0.792 | −98 | 65 | 0.55 | 22.6 | 33.62 | 15.2 | 12.3 | 22.3 |
| 2-methoxyethanol | 1.400 | 0.966 | −85 | 124 | 1.60 | 35.0 | 16.93 | 16.2 | 9.2 | 16.4 |
| nitrobenzene | 1.553 | 1.204 | 6 | 211 | 2.03 | 43.9 | 35.87 | 18.8 | 12.3 | 4.1 |
| nitroethane | 1.390 | 1.052 | −70 | 115 | 0.64 | 32.2 | 28.00 | 16.3 | 15.6 | 4.5 |
| nitromethane | 1.380 | 1.130 | −29 | 101 | 0.62 | 36.8 | 38.57 | 16.1 | 18.8 | 5.1 |
| N-methyl-2-pyrrolidone | 1.468 | 1.028 | −20 | 202 | 1.67 | 41.8 | 32.00 | 17.9 | 12.3 | 7.2 |
| nonane | 1.405 | 0.718 | −53 | 151 | 0.50 | 19.0 | 2.00 | 15.5 | 0.0 | 0.0 |
| perfluorooctane | 1.300 | 1.766 | −25 | 103 | 0.70 | 16.0 | 2.00 | 12.5 | 0.0 | 0.0 |
| propylene carbonate | 1.421 | 1.201 | −49 | 242 | 2.80 | 40.5 | 65.00 | 20.1 | 18.0 | 4.1 |
| pyridine | 1.509 | 0.982 | −42 | 115 | 0.88 | 38.0 | 12.30 | 19.5 | 8.8 | 5.9 |
| 1,1,1-trichloroethane | 1.438 | 1.325 | −31 | 74 | 0.80 | 25.6 | 7.53 | 16.8 | 4.3 | 2.0 |
| water | 1.333 | 0.998 | 0 | 100 | 0.89 | 72.8 | 80.37 | 12.8 | 31.3 | 34.2 |
| m-xylene | 1.497 | 0.864 | −50 | 139 | 0.58 | 28.9 | 2.37 | 17.1 | 1.0 | 1.0 |
| o-xylene | 1.506 | 0.880 | −28 | 144 | 0.77 | 30.1 | 2.57 | 17.2 | 1.0 | 1.0 |
| p-xylene | 1.496 | 0.861 | 13 | 138 | 0.61 | 28.4 | 2.27 | 17.0 | 1.0 | 1.0 |

$n_D$: refractive index at the sodium D line;
$\rho$: density;
$T_m$: melting point;
$T_b$: boiling point;
$\mu$: viscosity;
$\gamma$: surface tension;
$\epsilon$: dielectric constant;
$\delta_d$, $\delta_p$, $\delta_h$: cohesive energy densities.

A device of the invention may be designed where only two fluids are employed, chosen on the basis of their refractive indices and physical properties relevant for the motive force used. In some cases, however, the constraints on the refractive indices posed by the desired optical function and the constraints on other physical properties posed by the motive force may be incompatible. That is, there may not be two fluids that possess both the desired refractive indices and the physical properties needed for the particular motive force to be used. It becomes advantageous, then, to use separate fluids for the actuation function and for the optical function. In this way fluids may be selected for their optical properties, and other fluids may be selected for the abilities to be moved by the desired motive force. Thus, each function can be independently optimized, yielding a potentially superior device.

In some cases, a pure fluid may not exist with a value of a relevant physical property falling within the desired range. It is possible, then, to mix two or more fluids to obtain a mixture with the desired property. For example, propylene carbonate can be mixed with quinolin to yield a mixture with an index intermediate between the 1.41 of propylene carbonate and the 1.7 of quinolin.

Other properties of a fluid used may likewise be controlled by adding soluble materials. For example, dissolving a surfactant such as Triton-X or FC430 in water reduces the surface tension, which is an important property in microfluidic devices in general. Also, dissolving a salt such as potassium chloride in water increases the electrical conductivity, a critical property, for example, in the electrokinetic actuation principles.

Additional modifications of physical properties of a fluid may be achieved by suspending microscopic solid particles in it. The particles may be magnetic, enabling an applied magnetic field to move or assist in moving the fluid. The particles may also be introduced in the form of a colloidal suspension. The colloidal suspension disperses light that propagates through the fluid by scattering and thus can attenuate the optical signal that passes into the colloid. The particles may further be absorbers, enabling the resulting fluid to attenuate the optical field by absorption.

Further, it may be desirable, in designing a device of the invention, to alter the physical properties of the surfaces that contact the fluids. The three-phase contact angle $\theta_{12}$, for example, can be affected not only by modifying the surface energies of the fluids, but also by modifying the surface energy of the microchannel walls (Eq. 3). One possibility is to treat the microchannel surfaces with compounds known to change the surface chemistry, such as nitric acid or hydrogen peroxide. Another possibility is to coat the microchannel walls with a thin film of a silane coupling agent, a fluorocarbon, or a fluoropolymer in order to reduce the surface energy. For example, a channel cut into the surface of silica (which has a surface energy of approximately 0.300 N/m) can be coated with a molecular layer of a silane coupling agent, a fluorocarbon, or a fluoropolymer having a surface energy of less than 0.020 N/m. Where it is important to minimize the contribution of capillary forces, it is preferable to choose or modify the various interface energies to yield a three-phase contact angle that is approximately 90° (Eq. 5).

It is also possible to selectively treat or coat different portions of the microchannel in order to achieve the desired balance between surface interactions and actuation forces. For example, one may coat only the top of the microchannel with a thin film of, e.g., a silane coupling agent, a fluorocarbon, or a fluoropolymer, that reduces the surface energy. This yields a different contact angle on the top than on the sides and bottom of the microchannel, allowing control of the shape and curvature of the fluid-fluid interface. One may also coat segments of a microchannel but not others, effectively introducing position-dependent surface interactions that can be used in the design of a device for enhancing the movement of a fluid slug at certain positions and stopping or hindering the movement at others. The advancing or receding interface of a fluid slug requires more energy to pass a discontinuity on the surface than is required to move on a smooth surface. For example, a fluid interface such as a water/air interface may move along a silica surface by capillary pressure (with $\theta_{12}=0°$), but stops when encountering a low-surface-energy feature such as a narrow, thin strip of a silane coupling agent, a fluorocarbon, or a fluoropolymer laid across the channel (because $\theta_{12}$ exceeds 100°). Movement resumes when sufficient additional pressure is applied to overcome this irregularity and move the water/air interface past it.

In addition, in many systems, the three-phase contact angle $\theta_{12}$ is not uniquely defined: it may depend, for example, on whether the fluid-fluid interface is static or moving in one direction or the other. The difference between advancing and receding contact angles, known as the contact-angle hysteresis, is an extra source of energy dissipation. To minimize the hysteresis, one can carry out surface treatments on the microchannel walls with, e.g., nitric acid or hydrogen peroxide, or one may coat the microchannel surfaces with a thin film of low-surface-energy materials such as silane coupling agents, fluorocarbons, or fluoropolymers. Bringing the average contact angle close to 90° (as described above, e.g., by using surface treatments or by the choice of materials) helps to alleviate problems associated with contact-angle hysteresis, as the overall contribution of capillary forces is thereby minimized.

Electrocapillarity

Several of the motive forces described herein have to do with charge distributions of electrolytes (ionic solutions) at and near interfaces. A surface in contact with an electrolyte becomes charged due to the ionization or dissociation of surface groups, or adsorption of ions from the electrolyte. Ions in the electrolyte of opposite polarity to the surface charge are attracted to the surface; ions of the same polarity are repelled. The result is a thin layer of diffuse charge next to the surface. The charge profile in the diffuse layer can be characterized by the Debye decay length. The Debye length, typically a few nanometers, shrinks with increasing ion concentration. Taken together, the surface charge and the accompanying diffuse charge are called the electric double layer. In some instances it is helpful to think of the combination of surface charge and diffuse layer as a parallel-plate capacitor. In particular, the energy per unit area stored in a capacitor is $$W_{cap} = \frac{1}{2}cV^2, \qquad \text{(Eq. 7)}$$

where c is the capacitance per unit area and V is the voltage (potential) drop across the capacitor. In the present context, $W_{cap}$ adds to the work of adhesion per unit area $W_{12}$ in Eq. 1, modifying the overall surface energy or interface tension $\gamma_{12}$. Capacitor analogies facilitate an understanding of electrocapillarity (EC).

Figure 2:
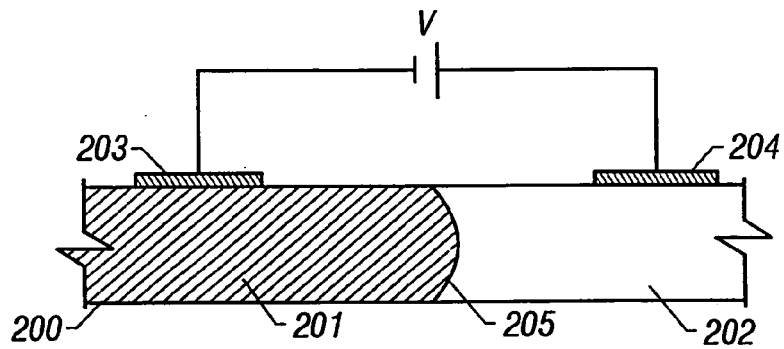
FIG. 2 depicts a microchannel configured to move fluids using electrocapillarity.

The electrocapillary effect is manifested as a change in interface tension between two immiscible, nonreacting, and electrically conductive liquids due to a voltage difference between them [e.g., see A. W. Adamson and A. P. Gast, *Physical Chemistry of Surfaces*, 6$^{th}$ ed. (Wiley, New York, 1997); M. C. Lea, *Opt. Lett.* 6, 395 (1981)]. As illustrated in FIG. 2, liquid 201 (e.g., a liquid metal such as mercury) and liquid 202 (e.g., an electrolyte such as an aqueous salt solution) form interface 205 within microchannel 200. Due to the interaction between the two liquids, a surface charge and an electric double layer form at interface 205, resulting—using the capacitor analogy—in a voltage drop across it. This intrinsic voltage drop can be modified by applying an external DC voltage V between the two liquids at electrodes 203 and 204: the net of the two is the voltage drop experienced across the interface. The intrinsic voltage is usually labeled $V_{PZC}$, where PZC stands for Point of Zero Charge: this reflects the fact that, when an equal and opposite external voltage is applied, the intrinsic voltage is compensated and the interface regains charge neutrality.

The interface tension then becomes, from Eq. 1 and 7, $$\gamma_{12} = \gamma_{12}^{max} - \frac{1}{2}c(V - V_{PZC})^2, \qquad \text{(Eq. 8)}$$

where c is the capacitance per unit area of the electric double layer and $\gamma_{12}^{max}$ is the interface tension in the absence of double layer effects. The change in interface tension at interface 205 alters the equilibrium described by the Young-Dupré equation (Eq. 3), the Young-Laplace equation (Eq. 4), and the resulting capillary pressure step (Eq. 5). For example, for mercury in contact with aqueous electrolytes, $V_{PZC}$ (on the mercury side) is approximately −0.48 V (using a reference electrode arrangement known as the calomel electrode), $\gamma_{12}^{max}$ is in the range of 0.400 to 0.430 N/m, c is on the order of 0.5 μF/mm², and $\theta_{12}$ is close to 180°. A typical reduction in interface tension in this system due to an applied voltage of 1 V is 0.1 N/m. This would cause a pressure change of about 20,000 Pa (roughly 0.2 atmospheres) in a microchannel 500 μm wide and 10 μm deep. It should be kept in mind that Eq. 8 is an approximation; the details of the EC effect depend on the properties of the two liquids and the ions in solution.

TABLE 2

Compatibility of some classes of fluids that may be used in the invention.

| phase 2 | phase 1 | | | | | | |
|---|---|---|---|---|---|---|---|
| | H₂O | Hg | Ga | FC | HC | Si | NB |
| H₂O | X | * | * | * | * | * | * |
| Hg | * | X | * | * | * | * | * |
| Ga | * | * | X | * | * | * | * |
| FC | * | * | * | X | * | * | * |
| HC | * | * | * | * | X | * | ~ |
| Si | * | * | * | * | * | X | ~ |
| NB | * | * | * | * | ~ | ~ | X |

H₂O: water/salt solution;
Hg: mercury;
Ga: gallium alloy;
FC: fluorocarbon/salt solution;
HC: hydrocarbon/salt solution;
Si: silicone oil/salt solution;
NB: nitrobenzene/salt solution.
X: miscible;
*: immiscible;
~: somewhat miscible.

The modified capillary pressure step at interface 205 resulting from EC causes the fluids to move. Referring again to FIG. 2, suppose that fluids 201 and 202 are each connected to a reservoir, and that initially the fluids are allowed to come to equilibrium. After a voltage is applied, the original reservoir pressures are no longer balanced by the capillary pressure step at interface 205. For example, if the interface tension at interface 205 is lowered, flow from left to right ensues to reestablish equilibrium in the two reservoirs; flow in the opposite direction occurs if the interface tension is increased. The direction of movement is determined by the sign of the curvature of the interface, as well as by the sign of the change in interface tension.

There are several factors to consider in choosing fluids for EC-based devices. The two liquids must conduct electricity and are preferably mutually immiscible. Moreover, preferably little or no charge transfer occurs across the interface throughout the voltage range used in actuation. Table 2 shows the binary EC combinations of some of the fluids that may be used in a device of the invention. Normally insulating or poorly conductive fluids, such as water and hydrocarbons, may be made conductive by dissolving appropriate salts into them. In this case, the salts used preferably do not transfer appreciably across interfaces; suitable salts include potassium chloride for aqueous solutions and tetrabutylammonium tetraphenylborate for organic solvents and hydrocarbons. Since even nominally immiscible liquids mix to some extent, in practice the operating liquids are mutually saturated. The requirement is then that the saturation concentrations be sufficiently low to avoid large-scale mixing of the fluids (which would defeat the ability to move the fluids as separate slugs). Also, it is necessary that there be a three-phase contact line where the interface between the two fluids meets the solid wall. In order to achieve this, it may be necessary to alter the interfacial energies of the system by coating the microchannel surface with surface-treatment compounds such as silane coupling agents, fluorocarbons, or fluoropolymers (making the surface more hydrophobic).

As Eq. 8 shows, the dependence of interface tension on applied voltage is quadratic. Accordingly, it is possible to actuate an EC-based device in a roughly symmetrical way whether the voltage is positive or negative. It is possible, then, to drive such a device with AC voltage. When supplying an AC driving signal, it is important to consider the frequency of response of the system. In EC-based devices, the dominant time scale is typically the formation of the electric double layer (i.e., the capacitive charging of the interface); this sets an effective upper limit to the frequency of the AC signal.

The presence of an offset $V_{PZC}$ and the different shape of the EC curve in its left and right branches modify this simplified picture to some extent. To optimize actuation, the applied voltage can be made much larger than the offset $V_{PZC}$; alternatively, a DC bias can be added to the AC signal to neutralize the offset. In either case, particular care needs to be taken with regard to the sign and magnitude of the applied voltages in order to avoid electrochemical reactions that may jeopardize the integrity of the electrode surfaces.

In devices that use the EC principle, or in any devices where electrodes are to be in contact with one or more fluids, it may be important to ensure the stability of the electrode surfaces if long-term operation is necessary. Under certain circumstances, direct contact is satisfactory, for example when voltages and ionic concentrations are kept low. In other cases, however, the electrodes can react electrochemically with the electrolyte solution, resulting in undesirable electrode deterioration and evolution of byproducts. To prevent this occurrence, one may use a fully polarizable electrode, so that there is no current flow at the electrode surface and no chemical change is allowed to occur. Another possibility is to coat the electrode surface with a thin layer of oxide (e.g., metal oxide or silicon oxide), polymer, or glass. This effectively turns the electrode into a polarizable electrode, and if the layer is thin enough, its electrical consequences can be minimized.

Electrocapillarity may be used in an optical device such as a phase shifter by configuring the device to utilize effective index modification. Electrocapillarity may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Electrocapillarity may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Electrocapillarity may be used in an optical device such as a multiplexer or demultiplexer by configuring the device to utilize diffraction of the different wavelengths using a diffraction element. Electrocapillarity may also be used in an optical device such as a filter by configuring the device to utilize dispersion of the different wavelengths using the dispersive properties of an MZI or an MMI.

Differential-Pressure Electrocapillarity

Figure 3:
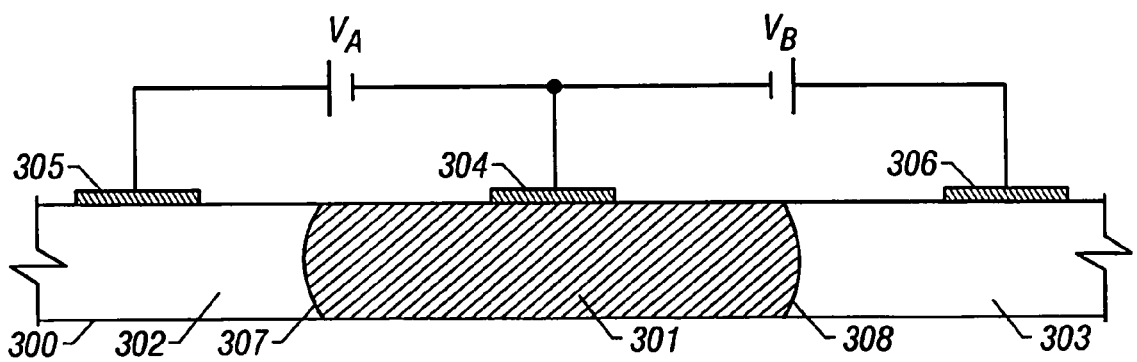
FIG. 3 illustrates a microchannel configured to move fluids using differential-pressure electrocapillarity.

The EC effect described above allows programmable modification of the properties of a single interface. We have discovered an extension of the EC principle that affords greater flexibility. By placing, e.g., three conducting fluids in series in a microchannel, and by making separate electrical contacts to each, two interfaces can be affected independently. Referring to FIG. 3, liquid 301 (e.g., an electrolyte such as an aqueous salt solution) is placed between liquids 302 and 303 (e.g., electrolytes such as salt solutions in nitrobenzene), which may or may not be identical. Applying a DC voltage $V_A$ between electrodes 304 and 305 results in an EC effect at interface 307, while applying a DC voltage $V_B$ between electrodes 304 and 306 results in a separate EC effect at interface 308. As the resulting changes in interface tension (see Eq. 8) can be independently programmed, different pressure steps (Eq. 5) can be induced at the two interfaces. Accordingly, we call this the differential-pressure electrocapillary (DPEC) effect. For example, suppose that fluids 302 and 303 are identical, that each is connected to a reservoir, and that the fluids are allowed to come to equilibrium. In a uniform channel in the absence of an applied voltage, the capillary pressure steps across interfaces 307 and 308 are equal in magnitude and opposite in sign, leading to hydrodynamic balance. Setting the voltages to different values results, in general, in different modifications to the interface tension at the two interface—say a lower tension at interface 308 than at 307. The reservoir pressures are then no longer balanced by the pressure steps at the two interfaces, and fluid flow from left to right ensues due to the resulting pressure gradient.

The ability to affect two interfaces independently with DPEC allows a wider range of configurations than in single-interface EC. The principles of operation in DPEC may be understood by referring to Eq. 8, which describes the voltage-dependent interface tension as an inverted parabola horizontally offset by $V_{PZC}$. The two interfaces under consideration (i.e., interfaces 307 and 308 in FIG. 3) are represented by two separately adjustable points on this curve. One advantage of DPEC is that it enables, within a given voltage range, creation of a greater pressure gradient than is possible with EC acting on a single interface. For example, by only applying $V_A=-V_{PZC}$ to interface 307, the overall interface tension difference across central slug 301 is 1.5 c $(V_{PZC})^2$. But if, in addition, $V_B=V_{PZC}$ is applied to interface 308, the overall difference becomes 2 c $(V_{PZC})^2$, an increase of one third with no higher voltages involved. This can be important where higher voltages would lead to undesirable electrode reactions.

Another advantage is to shift the balance in capillary pressure between the two interfaces to a point on the curve with greater slope. For example, at equilibrium both voltages may be set to $V_A=V_B=-V_{PZC}$. Compared to $V_A=V_B=0$, the new balance point allows for a larger pressure change in response to a given voltage step. Alternatively, a smaller voltage signal is required to achieve a given pressure difference. A further advantage of DPEC is to provide for symmetrical bidirectional action simply by swapping the voltages between electrodes 304 and 306. Yet another advantage lies in allowing a greater range of bidirectional action with voltage signals of a single polarity, for example by biasing the balance point at some positive voltage. As in the single-interface EC effect, it is also possible to use AC voltage signals instead of dc, paying particular attention to the resulting effective balance between the two interfaces.

In choosing the fluids for a device based on DPEC, there are several criteria as well as constraints. For clarity, we will refer to the exemplary diagram illustrated in FIG. 3. First, both interfaces 307 and 308 are to be controlled with EC, so both pairs of liquids on either side of them (301/302 and 301/303) need to be EC pairs. Some suitable EC liquid pairs have already been shown in Table 2. Since in a closed system eventually all phases come to equilibrium, it is preferred that each of the three liquids be mutually immiscible. For example, the triad water/mercury/nitrobenzene (where salts are dissolved in both water and nitrobenzene) would be suitable. If the device is designed symmetrically (that is, if liquids 302 and 303 are the same), there are fewer constraints, as only a single EC liquid pair is used. For example, water/nitrobenzene/water would be a suitable choice.

Differential-pressure electrocapillarity may be used in an optical device such as a phase shifter by configuring the device to utilize effective index modification. Differential-pressure electrocapillarity may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Differential-pressure electrocapillarity may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Differential-pressure electrocapillarity may be used in an optical device such as a multiplexer or demultiplexer by configuring the device to utilize diffraction of the different wavelengths using a diffraction element. Differential-pressure electrocapillarity may also be used in an optical device such as a filter by configuring the device to utilize dispersion of the different wavelengths using the dispersive properties of an MZI or an MMI.

Electrowetting

A phenomenon closely related to electrocapillarity is electrowetting (EW): the change in three-phase contact angle with applied voltage [e.g., see G. Beni and S. Hackwood, *Appl. Phys. Lett.* 38, 207 (1981); M. Vallet et al., *Polymer* 37, 2465 (1996); Sheridon, U.S. Pat. No. 5,956,005

(1999); M. G. Pollack et al., *Appl. Phys. Lett.* 77, 1725 (2000); M. W. Prins et al., *Science* 291, 277 (2001)]. While in EC the two fluids are conductive and the solid is an insulator, in EW one of the two fluids and the solid are conductors and the other fluid is an insulator. Carrying the analogy further, in both cases an external voltage modifies an interface tension. In EC this occurs at the interface between the two liquids ($\gamma_{12}$ in Eq. 3); in EW it occurs between the conductive liquid and the solid ($\gamma_{13}$ in Eq. 3). The change is brought about in both cases by capacitive charging at the interface.

Figure 4:
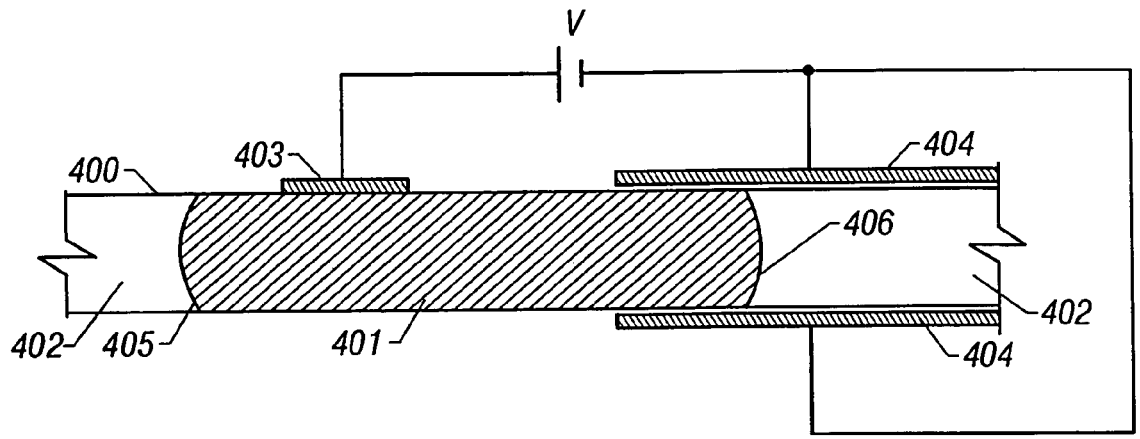
FIG. 4 illustrates a microchannel in which fluids are moved using electrowetting.

The application of EW to microfluidic actuation is illustrated in FIG. 4. A liquid slug 401 (e.g., an electrolyte such as an aqueous salt solution) is placed within an insulating fluid 402 (liquid or gas, e.g., air or sulfur hexafluoride) within microchannel 400. Electrode 404, which covers part or all of the perimeter of the microchannel wall, is separated from electrolyte 401 by a thin insulating layer. As a DC voltage V is applied between electrodes 403 and 404, the increased charge density at the interface between electrolyte 401 and electrode 404 causes a drop in tension at that interface. The resulting change in curvature of interface 406 causes fluid motion.

The solid-conductor-electrolyte interface in EW behaves as a capacitor, much like the liquid-liquid interface in EC. Accordingly, interface tension $\gamma_{13}$ is modified by the capacitive energy per unit area $W_{cap}$ (Eq. 7). Neglecting the thickness of the electric double layer in the electrolyte, the capacitance per unit area c is approximately $$c = \frac{\varepsilon_0 \varepsilon}{a}, \quad \text{(Eq. 9)}$$

where $\varepsilon$ is the dielectric constant and a the thickness of the insulating layer, and $\varepsilon_0$ is the permittivity of vacuum. The interface tension $\gamma_{13}$ then becomes, from Eq. 1, 7, and 9, $$\gamma_{13}(V) = \gamma_{13}(0) - \frac{\varepsilon_0 \varepsilon}{2a} V^2. \quad \text{(Eq. 10)}$$

Finally, the reduced interface tension $\gamma_{13}$ shifts the balance in the Young equation (Eq. 3), resulting in a new three-phase contact angle $\theta_{12}$:

$$\cos\theta_{12}(V) = \cos\theta_{12}(0) + \frac{\varepsilon_0 \varepsilon}{2a\gamma_{12}} V^2. \quad \text{(Eq. 11)}$$

The attendant pressure imbalance in microchannel 400 (Eq. 5) results in fluid motion.

The form of the voltage-dependent contact angle in Eq. 11 shows that, as in the other electrocapillary effects described above, it is also possible to actuate an EW-based device using AC voltages instead of dc. The maximum signal frequency is typically determined by the charging time constant of the interfacial capacitor, which in the EW effect depends not only on the properties of the electrolyte but also on those of the insulating layer.

The materials used in a device based on EW differ in some respects from those used in an EC-based device. Of the two fluids used, one is electrically conductive; most of the liquids shown in Table 2 would be suitable, e.g., a water/salt solution. As for the other fluid, an insulating liquid or gas is used: for example, air, sulfur hexafluoride, fluorocarbons, and hydrocarbons. The microchannel can be patterned in silica, silicate, or other glass, or in a polymer such as polyimide. To make the microchannel surface conductive, the channel can be coated with metal, and to insulate the electrodes from the liquid, the conductive surfaces may further be coated with a thin layer or a monolayer of insulator, such as metal oxide, silicon oxide, silicate, or other glass. Finally, depending on the surface properties of the coatings and on the interfacial tension of the fluids, it may be desirable to treat the surface of the insulator in order to alter the three-phase contact angle or to reduce the contact-angle hysteresis. Compounds such as silane coupling agents, fluorocarbons, and fluoropolymers yield a lower starting surface energy, while polyimides yield an intermediate starting surface energy.

Electrowetting may be used in an optical device such as a phase shifter by configuring the device to utilize effective index modification. Electrowetting may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Electrowetting may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Electrowetting may be used in an optical device such as a multiplexer or demultiplexer by configuring the device to utilize diffraction of the different wavelengths using a diffraction element. Electrowetting may also be used in an optical device such as a filter by configuring the device to utilize dispersion of the different wavelengths using the dispersive properties of an MZI or an MMI.

Continuous Electrowetting

Figure 5:
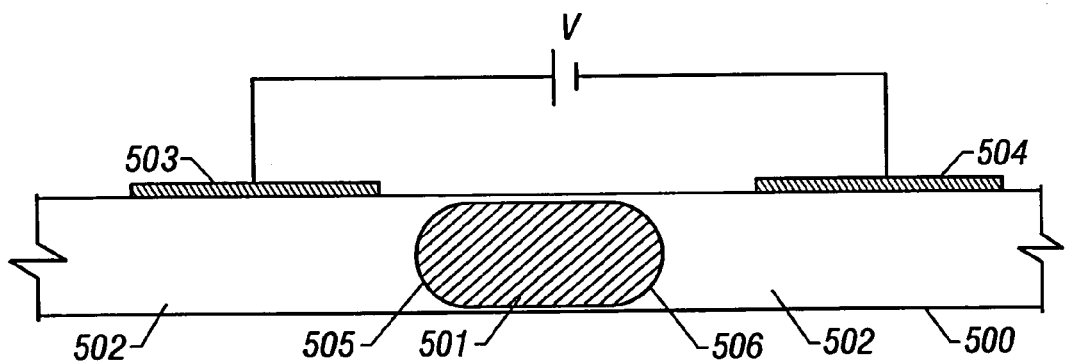
FIG. 5 depicts a microchannel in which fluids are moved using continuous electrowetting.

Continuous electrowetting (CEW) is another variation of the electrocapillary effect where the change in interface tension is continuous [e.g., see J. L. Jackel et al., *Appl. Opt.* 22, 1765 (1983); M. C. Lea, U.S. Pat. No. 4,583,824 (1986); M. Sato, *IEICE Trans. Comm.* E77-B, 197 (1994); M. Sato, Jap. Pat. No. 7-092405 (1995); J. Lee and C.-J. Kim, *JMEMS* 9, 171, (2000)]. As illustrated in FIG. 5, liquid slug 501 (typically a liquid metal such as mercury) is completely surrounded by electrolyte 502 (e.g., an aqueous salt solution) in microchannel 500: in particular, the electrolyte forms a continuous thin film around slug 501 that connects the left and right portions of the fluid. As in the EC effect, an electric double layer forms at the interface, surrounding slug 501. When a DC voltage V is applied between (non-polarizable) electrodes 503 and 504, a current begins to flow throughout electrolyte 502. Most of the voltage drop in the electrolyte occurs in the portion surrounding slug 501, because the resistance there is highest (smallest electrolyte cross-section); the voltage in that section is therefore position-dependent. However, if the slug is metallic, its surface is an equipotential surface, i.e., it has a constant voltage. Therefore, there is a position-dependent voltage difference between the surface of the slug and the surrounding electrolyte. According to Eq. 8, this translates into a position-dependent interface tension between the slug and the electrolyte. This gradient in interface tension leads to traction on the interface that moves the slug.

CEW works because an imbalance is created in the interface tension between one end of the slug and the other. This imbalance is a result of an asymmetry in the electro-capillary curve, which can result from the different curvature of the positive and negative branches as well as from the location of the point of zero charge $V_{PZC}$. This asymmetry determines the direction of fluid motion with respect to the polarity of the applied voltage. In the absence of asymmetry, the interface tension would still be position-dependent, but there would be no net difference between the two ends of the slug and there would be no motion. The interface tension imbalance means that inverting the polarity of the applied voltage also inverts the direction of fluid motion. A CEW-based device, then, may only be driven with a DC signal. On the other hand, a single set of electrodes is sufficient to obtain bidirectional motion.

While CEW is closely related to electrocapillarity, there are some important differences. In both EC and CEW, the charge density in the electric double layer changes once an external voltage is applied. In EC, however, what is relevant is the final configuration of charges, so the charging process is treated as a transient. In CEW, current flow is central: after the current stops flowing, the voltage along the thin electrolyte layer surrounding the metal slug becomes constant, so the interface tension gradient ceases to exist. Another difference is that electrical contact in EC is made to two different fluid phases, while in CEW the two contacts are applied at different locations of the same fluid phase. Yet another difference between EC and CEW is that the electrolyte phase is essentially continuous and completely surrounds the liquid metal slug. This is in contrast to EC, where there is a well-defined three-phase contact line where fluid-fluid interface meets the solid wall. As a consequence, the choice of systems suitable for the CEW effect is more constrained. One well-studied system is that of a mercury slug surrounded by an aqueous electrolyte. Other fluid pairs may be used, as long as the electrolyte phase is continuous and surrounds the metallic slug. For this purpose, it may be useful to coat the microchannel in order to make the surface sufficiently hydrophilic. In place of a liquid metal, one may also use another electrolyte (immiscible and nonreacting with the first), as long as its ionic concentration is sufficiently high that its surface can be approximately treated as an equipotential.

In the physical realization of the CEW effect, there may be contributions to the motion of the central slug in addition to a surface tension modulation. For example, if there is any net charge on the slug, electrophoresis will play a role (see Sec. 1.5 below), and due to the selective adsorption of ions from the outer electrolyte onto the solid wall, electroosmosis may also take place (see Sec. 1.6 below). Typically, however, these contributions are small compared to the surface tension effects.

Continuous electrowetting may be used in an optical device such as a phase shifter by configuring the device to utilize effective index modification. Continuous electrowetting may be used in an optical device such as a shutter or an attenuator by configuring the device to utilize: (a) mode leakage or spoiling; (b) scattering or absorption; (c) dielec- tric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Continuous electrowetting may be used in an optical device such as a switch by configuring the device to utilize: (a) dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Continuous electrowetting may be used in an optical device such as a multiplexer or demultiplexer by configuring the device to utilize diffraction of the different wavelengths using a diffraction element. Continuous electrowetting may also be used in an optical device such as a filter by configuring the device to utilize dispersion of the different wavelengths using the dispersive properties of an MZI or an MMI.

Electrophoresis

Figure 6:
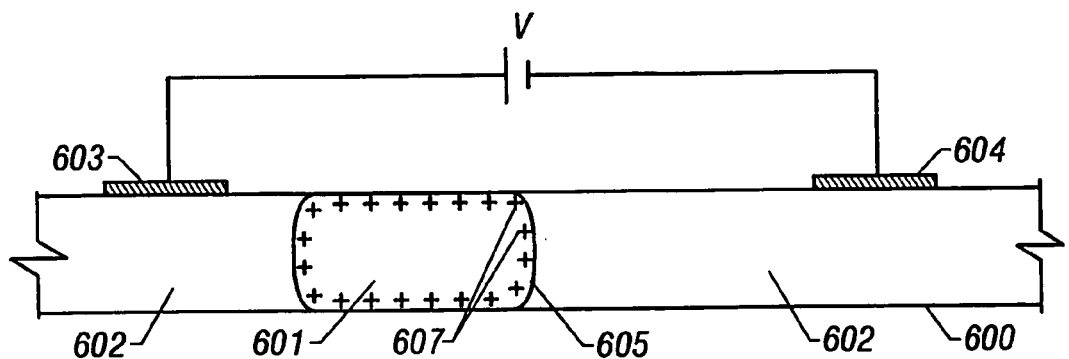
FIG. 6 illustrates a microchannel configured to move fluids using electrophoresis.

Several electrokinetic phenomena can be utilized to move liquids and their interfaces in microchannels. Electrophoresis is the movement of a charged particle in a fluid due to an electric field applied along the fluid [e.g., see D. J. Shaw, *Electrophoresis* (Academic Press, New York, 1969)]. Particle motion occurs because of electrostatic (Coulomb) interaction of the charge with the electric field. There are several ways to use electrophoresis; for the purpose of microfluidic actuation, an example is illustrated in FIG. 6. Fluid slug 601 (e.g., an insulator such as silicone oil) is placed in microchannel 600 and is surrounded by fluid 602 (e.g., an insulator such as air). Charges 607 of a single polarity, soluble only in fluid 601 and not 602, are injected into fluid 601; for example, these charges may arise from electrons injected into fluid 601 by means of a sharp point emitter electrode (not shown) set at a large negative potential. Because of mutual electrostatic repulsion, the charges arrange themselves at the interfaces with the microchannel walls and with fluid 602. Fluid slug 601 effectively becomes a deformable particle with an associated net charge. As a DC voltage V is applied between electrodes 603 and 604, the resulting electric field produces a force on the charges 607. For positive polarity, the charges are drawn away from the positive electrode toward the negative electrode. As the charges cannot cross into fluid 602, interface 605 is pulled along with the charges toward the negative electrode. Movement in the opposite direction can be obtained by reversing the polarity of the applied voltage V. Since electrophoretic motion depends on V and not $V^2$, DC voltage signals are necessary for actuation.

Electrophoresis may be used in an optical device such as a phase shifter by configuring the device to utilize effective index modification. Electrophoresis may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multi-mode interferometer (MMI) so as to direct the optical signal to a discard port. Electrophoresis may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Electrophoresis may be used in an optical device such as a multiplexer or demultiplexer by configuring the device to utilize diffraction of the different wavelengths using a diffraction element. Electrophoresis may also be used in an optical device such as a filter by configuring the device to utilize dispersion of the different wavelengths using the dispersive properties of an MZI or an MMI.

Electroosmosis

Figure 7:
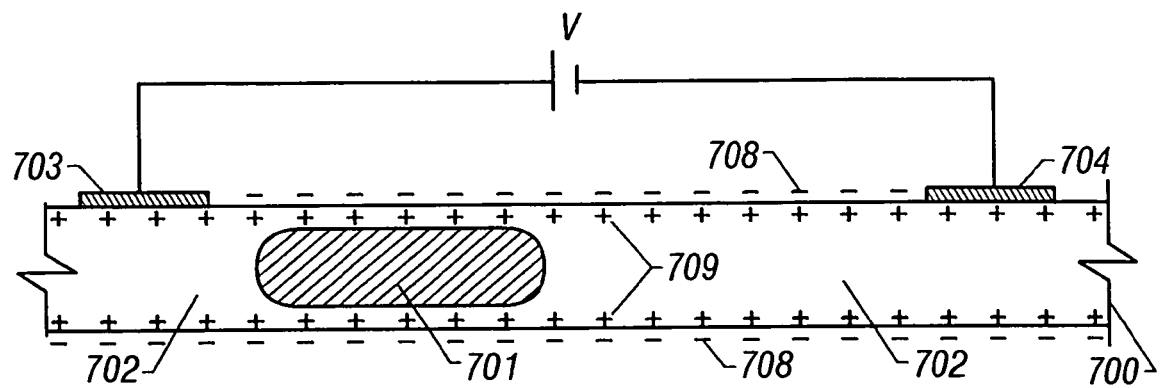
FIG. 7 illustrates a microchannel configured to move fluids using electroosmosis.

Another electrokinetic actuation principle is electroosmosis: the movement of an electrolytic fluid along a charged solid surface by means of an electric field applied along the surface [e.g., see D. J. Shaw, *Electrophoresis* (Academic Press, New York, 1969)]. Referring to FIG. 7, fluid slug 701 (e.g., an insulator such as silicone oil) is placed in microchannel 700 and surrounded completely by fluid 702 (e.g., an electrolyte such as an aqueous salt solution). Proper choice, or tailoring, of the interfacial tensions may be necessary to achieve this configuration, depending on the fluids used. Specifically, the interface tension between fluid 702 and microchannel 700 should be sufficiently lower than the interface tension between fluid 701 and microchannel 700 so that fluid 702 preferentially wets the microchannel surface. A rule of thumb is that the three-phase contact angle be close to 180°, e.g., as in the system water/decane in a glass microchannel. The surfaces of microchannel 700 acquire a surface charge 708 due to exposure to the electrolyte (e.g., typically a negative charge for a glass surface in contact with an aqueous salt solution). The ions in the electrolyte respond to this fixed surface charge by forming diffuse charge layers 709. When a DC voltage V is applied between electrodes 703 and 704, the resulting electric field produces an electrostatic force on the charges in the diffuse layers 709. For a negative surface charge, the diffuse layers are positively charged and move along the microchannel in the direction from the positive electrode toward the negative electrode. Insulating slug 701 is pulled along by viscous drag. It is preferable to avoid having obstructions or other hydrodynamic impedances in the region in which the fluids are to move, as such impedances could induce a counterflow profile within the electrolyte. As in electrophoresis, electroosmotic motion depends on V and not $V^2$; therefore DC voltage signals are necessary for actuation. On the other hand, movement in the opposite direction can be obtained simply by reversing the polarity of the applied voltage V.

Electroosmosis may be used in an optical device such as a phase shifter by configuring the device to utilize effective index modification. Electroosmosis may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multi-mode interferometer (MMI) so as to direct the optical signal to a discard port. Electroosmosis may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Electroosmosis may be used in an optical device such as a multiplexer or demultiplexer by configuring the device to utilize diffraction of the different wavelengths using a diffraction element. Electroosmosis may also be used in an optical device such as a filter by configuring the device to utilize dispersion of the different wavelengths using the dispersive properties of an MZI or an MMI.

Dielectrophoresis

Yet another electrokinetic effect that can be used for microfluidic actuation is dielectrophoresis, which refers to the movement of a dielectric particle in a fluid subject to a non-uniform electric field [e.g., see H. A. Pohl, *Dielectrophoresis* (Cambridge University Press, Cambridge, UK, 1978)]. A particle with a given polarizability (dielectric constant), surrounded by a fluid with a different polarizability, experiences a net polarization in an electric field. If the field is uniform, the force due to the interaction between the field and the induced polarization averages to zero; but if the field is anisotropic, the asymmetric interaction between the field and the induced polarization results in a net force on the particle. The direction and magnitude of the force depend on the sign and magnitude of the dielectric contrast between the particle and the surrounding fluid, and on the electric field profile. For a particle with a higher polarizability than its surroundings, the direction is towards points of high electric field.

Figure 8:
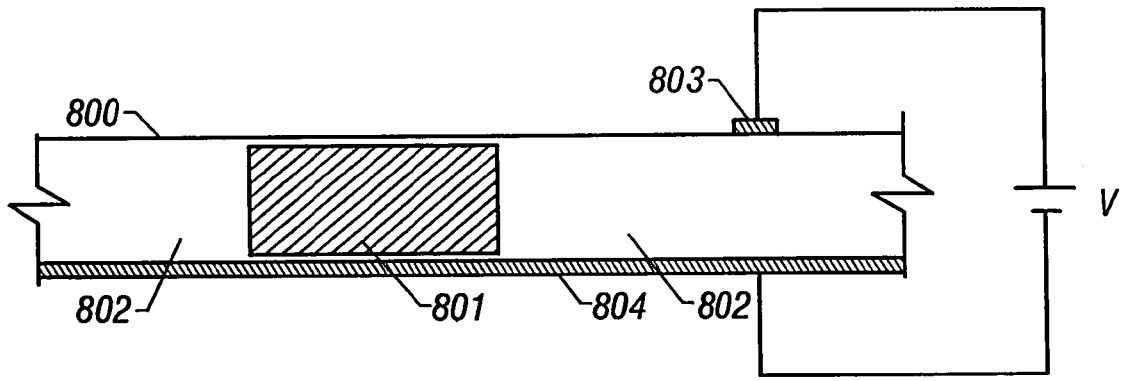
FIG. 8 depicts a microchannel configured to move fluids via dielectrophoresis.

Dielectrophoresis may be used to actuate a microfluidic device. As illustrated in FIG. 8, a solid block 801 (e.g., a high-dielectric-constant material such as sapphire or silicon) is immersed in fluid 802 (e.g., a low-dielectric-constant fluid such as perfluorooctane). As a DC voltage V is applied between electrodes 803 and 804, the resulting nonuniform electric field causes block 801 to move within fluid 802 towards the high-field region near electrode 803. This action can be used to displace block 801 directly, or the block may be used as a piston to displace fluid 802 and/or other fluids in contact with fluid 802 in the microchannel. To reduce friction between block 801 and the microchannel walls, fluid 802 is preferably a low-viscosity liquid.

Figure 9:
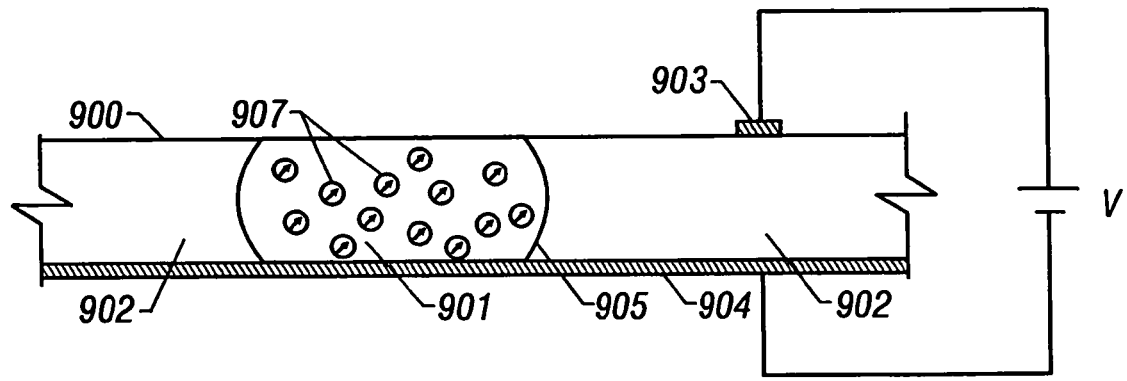
FIG. 9 illustrates a microchannel in which a solid is moved through a fluid, using dielectrophoresis.

FIG. 9 illustrates another application of dielectrophoresis for microfluidic actuation. Fluid slug 901 (e.g., a low-dielectric-constant fluid such as perfluorooctane) is placed in microchannel 900 in between fluid 902 (e.g., another fluid with a similar low dielectric constant, and mutually immiscible with the first, such as nonane). Particles 907 with high dielectric constant (e.g., sapphire microspheres or silicon microcrystals) are suspended in fluid 901. As a DC voltage V is applied between electrodes 903 and 904, the resulting nonuniform electric field draws the particles toward the high-field region next to electrode 903. Fluid 901 is pulled along by viscous drag. Microparticles 907 preferably do not cross interface 905 into fluid 902 so that the particles remain localized in fluid 901 and are not dispersed into both fluids 901 and 902; depending on the choice of fluids and particles, the microparticles may be coated with a film that is wet by fluid 901 but not by fluid 902.

Since dielectrophoresis depends on the square of the electric field gradient, both DC and AC voltage signals are suitable. The use of AC signals eliminates potentially disrupting influences, such as unwanted electrophoresis from any residual net charge on the suspended particles, or electrode reactions. On the other hand, net charges on the solid block or suspended particles could be used in conjunction with DC voltage signals to combine dielectrophoretic and electrophoretic actuation. Proper care is needed in this case (e.g., passivation with a thin layer of oxide or polymer) to protect the electrodes from electrochemical reactions.

Dielectrophoresis may be used in an optical device such as a phase shifter by configuring the device to utilize effective index modification. Dielectrophoresis may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Dielectrophoresis may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Dielectrophoresis may be used in an optical device such as a multiplexer or demultiplexer by configuring the device to utilize diffraction of the different wavelengths using a diffraction element. Dielectrophoresis may also be used in an optical device such as a filter by configuring the device to utilize dispersion of the different wavelengths using the dispersive properties of an MZI or an MMI.

Electrohydrodynamic Pumping

Figure 10A:
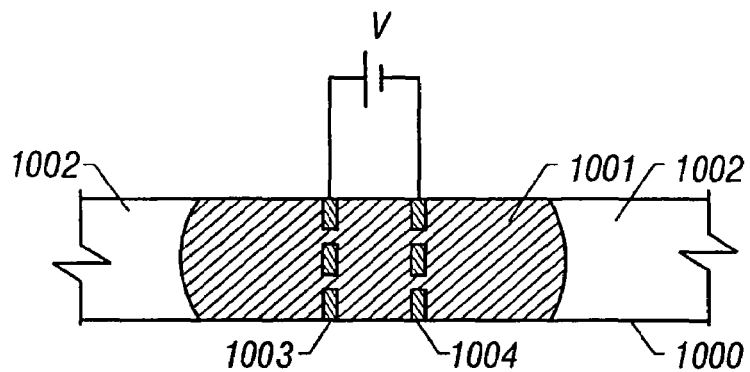
FIGS. 10A and 10B illustrate a microchannel configured to move fluids using electrohydrodynamic pumping.
Figure 10B:
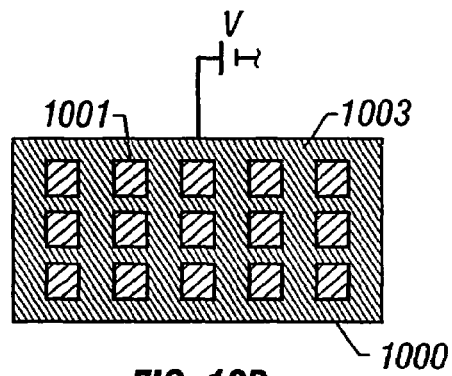

Electrohydrodynamic (EHD) injection pumping is based on the generation of free charges in a fluid and subsequent movement using an applied electric field [e.g., see A. Richter and H. Sandmaier, *IEEE Proc. MEMS* 1990, Napa Valley, Calif., USA, 99 (1990); A. Richter et al., *IEEE Proc. MEMS* 1991, New York, N.Y., USA, 271 (1991)]. Referring to FIG. 10A, microchannel 1000 contains fluid 1001 (e.g., a liquid with low electrical conductivity such as ethanol) in between fluid 1002 (e.g., a gas such as air). As a DC voltage V is applied between microgrid electrodes 1003 and 1004 (which span microchannel 1000, as shown in FIG. 10B), free charges are generated in the fluid near the electrode surfaces, as a result of a combination of electrolysis, electrochemical reactions at the electrode surfaces, and/or direct charge injection from the electrodes. These free charges, subjected to the electric field between the two grids, are then set into motion by the Coulomb (electrostatic) force and pull bulk fluid 1001 along by viscous drag. Because EHD pumping works by acting on the injected space charges, fluid 1001 preferably has a low background conductivity to minimize Joule heating and other deleterious effects due to electrolyte ion transport.

Electrohydrodynamic pumping may be used in an optical device such as a phase shifter by configuring the device to utilize effective index modification. Electrohydrodynamic pumping may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Electrohydrodynamic pumping may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Electrohydrodynamic pumping may be used in an optical device such as a multiplexer or demultiplexer by configuring the device to utilize diffraction of the different wavelengths using a diffraction element. Electrohydrodynamic pumping may also be used in an optical device such as a filter by configuring the device to utilize dispersion of the different wavelengths using the dispersive properties of an MZI or an MMI.

Magnetohydrodynamic Pumping

Figure 11:
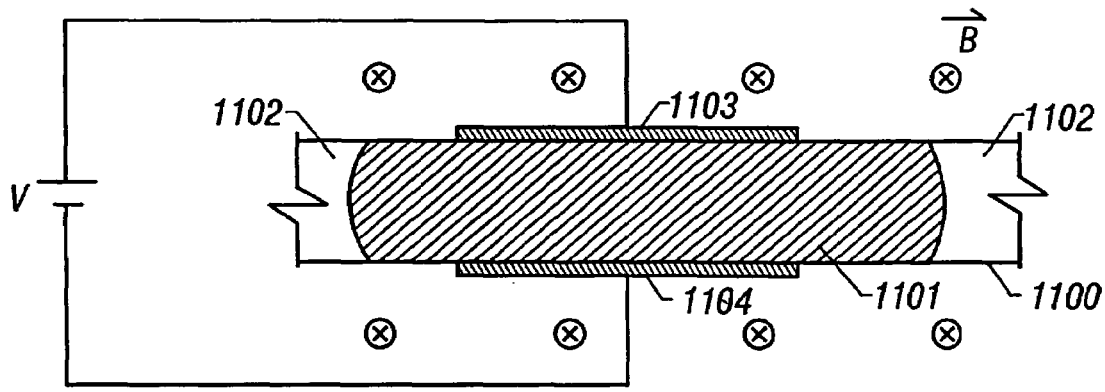
FIG. 11 illustrates a microchannel in which fluids are moved using magnetohydrodynamic pumping.

In the magnetohydrodynamic (MHD) effect, an electric field and a magnetic field are used together to cause fluid motion in an electrolyte [e.g., see J. Jang and S. S. Lee, *Sens. Act.* 80, 84 (2000); A. V. Lemoff and A. P. Lee, *Sens. Act. B* 63, 178 (2000)]. The principle is illustrated in FIG. 11: fluid 1101 (e.g., an electrolytic fluid such as an aqueous salt solution) is placed within fluid 1102 (e.g., a gas such as air) in microchannel 1100 between electrodes 1103 and 1104. An external permanent magnet provides a magnetic field pointing into the page. As a DC voltage V is applied between the electrodes, the resulting electric field generates a current I in the ions of the electrolyte; this current experiences a transversal force, due to the magnetic field, that results in fluid motion along the microchannel. For steady DC actuation, the current is sustained by electrochemical reactions at the electrode surfaces.

The MHD principle is based on the Lorentz force that moving charges experience in a magnetic field B:

$$F = dI \times B = dIB\hat{x},  \quad (\text{Eq. 12})$$

where d is the electrode separation, and x is the direction of the microchannel axis for the geometry indicated in FIG. 11. The Lorentz force points in the same direction for both polarities of charges in the electrolyte. The resulting pressure difference generated with MHD is $$\Delta P = \frac{F}{wd} = \frac{VBL\sigma}{d}, \quad \text{(Eq. 13)}$$

where the relationship I=VLwσ/d for an electrolyte of conductivity σ was used, and L and w are the length and width of the electrodes.

Reversal of the direction of motion in DC actuation may be obtained by reversing the direction of the current. In order to avoid electrode reactions, an AC voltage actuation may be used, but the magnetic field needs to be AC also, and needs to be synchronous with the voltage signal. An AC magnetic field may be generated using an external electromagnet, or microcoils may be built into the device. When these conditions are satisfied, the direction of motion is determined by choosing the proper phase relationship between the voltage and magnetic signals.

Magnetohydrodynamic pumping may be used in an optical device such as a phase shifter by configuring the device to utilize effective index modification. Magnetohydrodynamic pumping may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Magnetohydrodynamic pumping may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Magnetohydrodynamic pumping may be used in an optical device such as a multiplexer or demultiplexer by configuring the device to utilize diffraction of the different wavelengths using a diffraction element. Magnetohydrodynamic pumping may also be used in an optical device such as a filter by configuring the device to utilize dispersion of the different wavelengths using the dispersive properties of an MZI or an MMI.

Thermocapillarity

Figure 12:
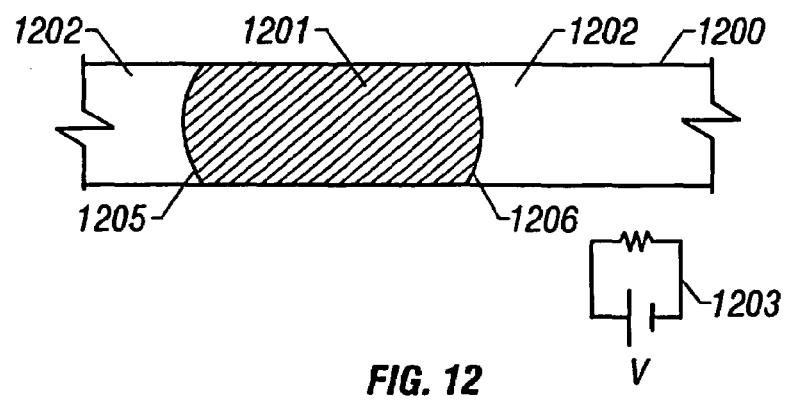
FIG. 12 illustrates a microchannel configured to move fluids using thermocapillarity.

Thermocapillarity causes fluid movement because of a temperature-induced change in surface tension [e.g., see M. Sato, Jap. Pat. No. 08-062645 (1996); M. Makihara et al., *J. Lightwave Technol.* 17, 14 (1999); T. Sakata et al., *J. Lightwave Technol.* 19, 1023 (2001).]. As illustrated in FIG. 12, fluid slug 1201 (e.g., silicone oil) is placed in microchannel 1200 and surrounded by fluid 1202 (e.g., a gas such as air). As a voltage is applied to resistive heater 1203, a temperature gradient develops along the microchannel. In particular, interface 1206 becomes hotter than interface 1205. Since interface tension generally decreases with increasing temperature, the tension of interface 1206 is reduced by a greater amount than that of interface 1205. The result is a capillary pressure imbalance (Eq. 5) that causes fluid motion.

The direction of motion depends on the curvature of the interfaces, and therefore on the three-phase contact angle of the interfaces against the microchannel wall. If fluid 1201 wets microchannel 1200, interfaces 1205 and 1206 are concave (as seen from outside the fluid slug) and motion occurs towards the cooler end; if fluid 1201 does not wet the microchannel, the interfaces are convex and motion takes place towards the hotter end. Because of the need to establish a thermal gradient, it should be noted that moving a fluid using thermocapillarity typically consumes substantially more power than the other microfluidic actuation principles discussed herein.

Thermocapillarity may be used in an optical device such as a phase shifter by configuring the device to utilize effective index modification. Thermocapillarity may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Thermocapillarity may be used in an optical device such as a switch by configuring the device to utilize: (a) metallic, dielectric, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Thermocapillarity may be used in an optical device such as a multiplexer or demultiplexer by configuring the device to utilize diffraction of the different wavelengths using a diffraction element. Thermocapillarity may also be used in an optical device such as a filter by configuring the device to utilize dispersion of the different wavelengths using the dispersive properties of an MZI or an MMI.

Thermal Expansion

Figure 13:
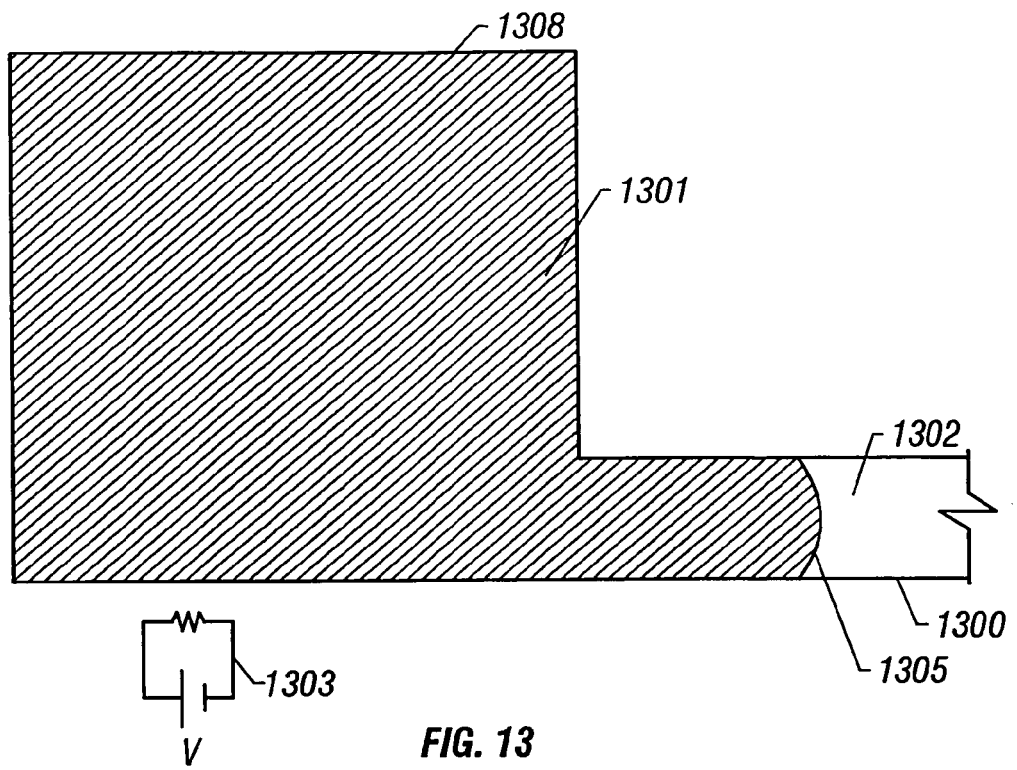
FIG. 13 depicts a microchannel configured to move fluids using thermal expansion.

Another method of moving an interface in a capillary is thermal expansion. As illustrated in FIG. 13, fluid 1301 (e.g., silicone oil) fills large volume reservoir 1308 and has interface 1305 with fluid 1302 (e.g., a gas such as air) in capillary 1300. A temperature increase in the reservoir, driven for example by activating resistive heater 1303, causes the fluid to expand, and as a consequence interface 1305 moves forward along the capillary, away from the reservoir. Movement in the opposite direction is obtained by turning off heater 1303 and/or by cooling the fluid in the reservoir using a heat exchanger such as a Peltier cooler. Alternatively, microchannel 1300 connects two similar reservoirs, each in proximity to a heater. The two heaters may be used in turn to push interface 1305 in one direction or the other.

The coefficient of thermal expansion of the fluid and the amount of temperature change determine the degree of movement of the interface. Expansion for liquids is on the order of 0.3 to 1 part in 1000 for 1° C. temperature change. For instance, for a capillary having a cross-sectional area of 100 μm$^2$ and a 1 mm$^3$ reservoir and for a change of 1° C., there would be a movement of the interface of more than 10 mm. The expansion could also be in a gas reservoir, where the expansion would be on the order of 4 parts in 1000. In this case, interface 1305 would be between a gas 1301 (e.g., air) and a liquid 1302 (e.g., silicone oil). The heater used to effect the temperature change of the desired amount may be placed in proximity to or inside the fluid in the reservoir.

Thermal expansion may be used in an optical device such as a phase shifter by configuring the device to utilize effective index modification. Thermal expansion may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Thermal expansion may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Thermal expansion may be used in an optical device such as a multiplexer or demultiplexer by configuring the device to utilize diffraction of the different wavelengths using a diffraction element. Thermal expansion may also be used in an optical device such as a filter by configuring the device to utilize dispersion of the different wavelengths using the dispersive properties of an MZI or an MMI.

Dielectric Pumping

As seen above, the energy stored in a capacitor (Eq. 7 and 9) is a function of the dielectric constant of the material between the parallel plates. This property can be used to exert a force on the interface between two fluids with different dielectric constants [e.g., see D. J. Griffiths, *Introduction to Electrodynamics*, $2^{nd}$ ed. (Prentice-Hall, Englewood Cliffs, N.J., 1989)]. We have exploited this effect in devising a novel microfluidic actuation principle, which we call dielectric pumping (DP).

Figure 14:
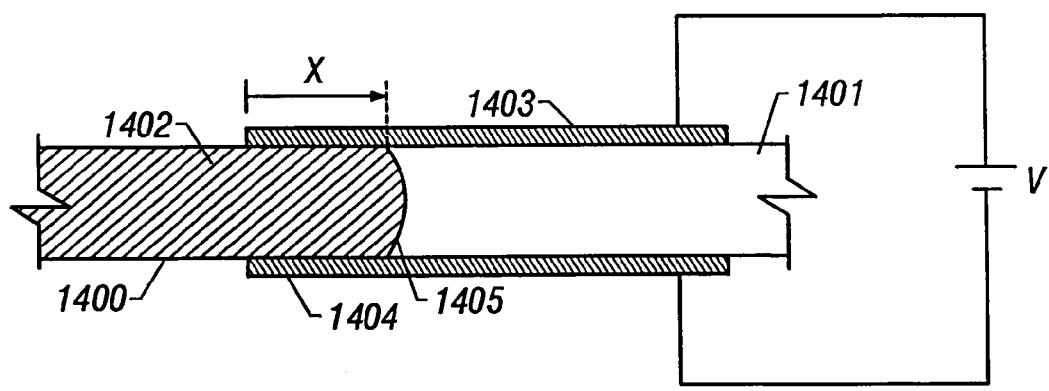
FIG. 14 illustrates a microchannel configured to move fluids using dielectric pumping.

Referring to FIG. 14, microchannel 1400 contains fluid 1402 (e.g., a high-dielectric-constant liquid such as propylene carbonate) and fluid 1401 (e.g., a low-dielectric-constant gas such as air, or liquid such as perfluorooctane). The interface 1405 between the two fluids is placed in the region of the microchannel between the two electrodes 1403 and 1404, which form a capacitor. As a DC voltage V is applied between the electrodes, the fluid with higher dielectric constant is drawn into the capacitor region, causing fluid motion.

The approximate pressure generated by DP can be calculated by looking at how the energy stored in the capacitor varies as interface 1405 moves. From Eq. 7, the total energy U of the system for a fixed voltage V, written as a function of the interface position x, is $$U(x) = \frac{1}{2}C(x)V^2 - Q(x)V = -\frac{1}{2}C(x)V^2, \quad \text{(Eq. 14)}$$

where the first term is the energy stored in the capacitor, the second term is the work done by the external voltage source, and the charge in a capacitor is Q=CV. The capacitance C is $$C(x) = \frac{\varepsilon_0 w}{d}[\varepsilon_2 x + \varepsilon_1(L-x)], \quad \text{(Eq. 15)}$$

where w is the width and L the length of the electrodes, d is the separation between the electrodes, and $\in_1$ and $\in_2$ are the dielectric constants of the two fluids. The force F on the interface is $$F = -\frac{dU}{dx} = \frac{1}{2}\varepsilon_0 \Delta \varepsilon \frac{V^2 w}{d}, \quad \text{(Eq. 16)}$$

where $\Delta\in=(\in_2-\in_1)$ is the dielectric contrast. Finally, the resulting dielectric pumping pressure $\Delta P$ is $$\Delta P = \frac{F}{wd} = \frac{1}{2}\varepsilon_0 \Delta \varepsilon \frac{V^2}{d^2}. \quad \text{(Eq. 17)}$$

Notice that the pressure depends on the square of the electric field E=V/d within the capacitor. This expression is approximate because it neglects, for instance, the effects due to the curvature of the interface between the electrodes. It also neglects the fact that the electric field profile inside a real capacitor is not uniform, particularly close to the edges and in the vicinity of a dielectric step like interface 1405. However, this expression is valid generally.

The fluids used in a DP-based device are selected primarily to provide a desired dielectric contrast between the two fluids. Another consideration is the electrical conductivity of the fluid. Since the DP effect is based on the dielectric polarization of the fluids, any significant concentration of ions in the fluids will tend to reduce or eliminate the effect. This is because in the presence of an electric field in the capacitor, the ions migrate to the electrodes (to form electric double layers) and partially shield the field in the bulk fluid. The result is a lower degree of polarization of the dielectric material inside the capacitor. Therefore, a DP-based device will incorporate suitably low-conductivity materials to maximize the dielectric pumping pressure $\Delta P$.

Because the DP pressure depends on $V^2$, it is also possible to use an AC voltage. When using materials with nonnegligible conductivity, one may therefore actuate the device using an AC voltage with a frequency high enough to prevent formation of the electric double layers. AC signals may also be used to prevent electrochemical reactions at the electrode surfaces. In order to further protect the electrodes, a thin insulating layer (e.g., silicon oxide, polymer, silicate, or other glass) may be deposited on the electrodes.

Dielectric pumping may be used in an optical device such as a phase shifter by configuring the device to utilize effective index modification. Dielectric pumping may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Dielectric pumping may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Dielectric pumping may be used in an optical device such as a multiplexer or demultiplexer by configuring the device to utilize diffraction of the different wavelengths using a diffraction element. Dielectric pumping may also be used in an optical device such as a filter by configuring the device to utilize dispersion of the different wavelengths using the dispersive properties of an MZI or an MMI.

Variable Dielectric Pumping

The DP-based device described above performs a one-way microfluidic actuation. In order to reverse the direction of motion, either a restoring force (e.g., compression or expansion of a reservoir) or an additional, separately actuated pair of electrodes may be used. We have devised a different application of the DP principle, where a variable voltage is used to move fluids to a specified location. This modification enables reversible motion in a single actuation unit without relying on a restoring force. We call this variable dielectric pumping (VDP).

Figure 15:
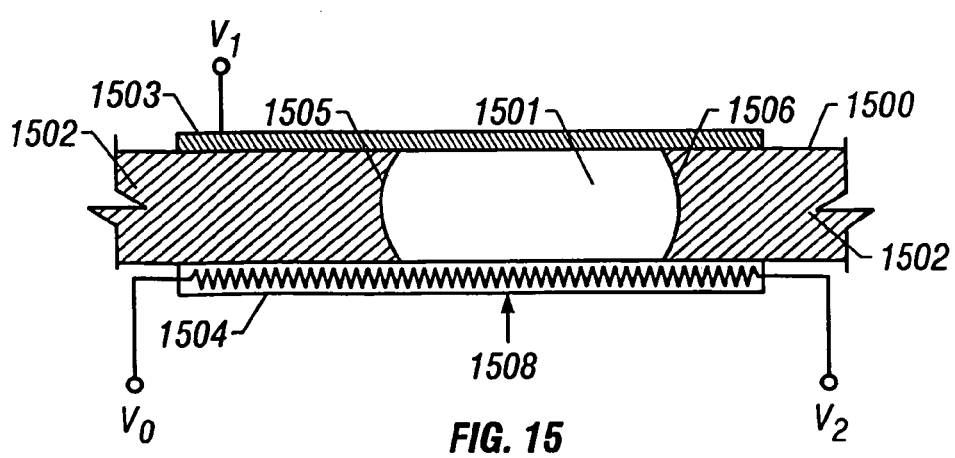
FIG. 15 illustrates a microchannel where fluids are moved using variable dielectric pumping.

A scheme of a device based on VDP is presented in FIG. 15. Microchannel 1500 holds low-dielectric-constant fluid slug 1501 (e.g., air) surrounded by high-dielectric-constant fluid 1502 (e.g., propylene carbonate), with both interfaces 1505 and 1506 in the capacitor region defined by electrodes 1503 and 1504. Electrode 1504 is designed to have a substantial resistance, so that different voltages $V_0$ and $V_2 > V_0$ can be applied at the ends without dissipating excessive amounts of electrical power (e.g., no more than a few milliwatts). A voltage $V_1$, intermediate between $V_0$ and $V_2$, is applied to electrode 1503. Because of the resistive voltage drop, at point 1508 along electrode 1504 (determined by the relationship between $V_0$, $V_1$, and $V_2$) the voltage level is equal to $V_1$. Away from this point, the voltage on the electrode decreases towards $V_0$ and increases toward $V_2$.

The electric field defined by this voltage structure is not uniform as in a common capacitor. The field strength (absolute value) is lowest in the region around point 1508, and increases as one moves away from it. Because the DP effect tends to move fluids with high dielectric constant to regions of high field strength and vice versa, low-dielectric-constant fluid slug 1501 is drawn to the low-field-strength region around point 1508. Changing the applied voltage $V_1$ while keeping $V_0$ and $V_2$ fixed results in moving point 1508, where the voltage equals $V_1$, to a new location; slug 1501 moves in turn to follow this point of lowest electric field strength.

Variable dielectric pumping may be used in an optical device such as a phase shifter by configuring the device to utilize effective index modification. Variable dielectric pumping may be used in an optical device such as a shutter or an attenuator by configuring the device to utilize: (a) mode leakage or spoiling; (b) scattering or absorption; (c) metallic, dielectric, total internal, or frustrated total internal reflection so as to direct the optical signal to a port where the signal is discarded; (d) delta-beta (evanescent) or damped resonant coupling so as to direct light to a discard port; (e) mode evolution so as to couple light to a discard port; or (f) interference in a device such as a Mach-Zehnder interferometer (MZI) or a multimode interferometer (MMI) so as to direct the optical signal to a discard port. Variable dielectric pumping may be used in an optical device such as a switch by configuring the device to utilize: (a) metallic, dielectric, total internal, or frustrated total internal reflection so as to direct the optical signal to a port where the signal is transmitted via waveguide or optical fiber to other signal processing or detection equipment; (b) delta-beta (evanescent) or damped resonant coupling so as to direct light to a transmission port; (c) mode evolution so as to couple light to a transmission port; or (d) interference in a device such as an MZI or an MMI so as to direct the optical signal to a transmission port. Variable dielectric pumping may be used in an optical device such as a multiplexer or demultiplexer by configuring the device to utilize diffraction of the different wavelengths using a diffraction element. Variable dielectric pumping may also be used in an optical device such as a filter by configuring the device to utilize dispersion of the different wavelengths using the dispersive properties of an MZI or an MMI.

Channel and Waveguide Configurations

The methods described above generally provide a force within a fluid stream in response to an electrically applied signal. The mechanics and logistics of making and driving the devices determine the final position of the fluids. While some of the figures to be discussed below include exemplary diagrams of some microfluidic actuation elements for illustration purposes, any of the microfluidic motive forces presented above may be combined with any of the channel and waveguide configurations described below to provide an optical device.

FIGS. 16-59 illustrate waveguide configurations and optical devices utilizing channels in which fluids may be moved using the forces discussed previously. In many instances, the electrodes or heaters are not shown for sake of clarity.

The optical device of the invention has a fluid channel and a waveguide. The fluid channel is positioned near, upon, or through the waveguide, so that at least a portion of the energy or electric field of an optical signal traversing the waveguide extends into whatever fluid is in the fluid channel in the vicinity of the core and/or cladding of the waveguide. In the vicinity of a fluid channel, the core, the cladding, or both may be continuous or segmented.

Figure 16:
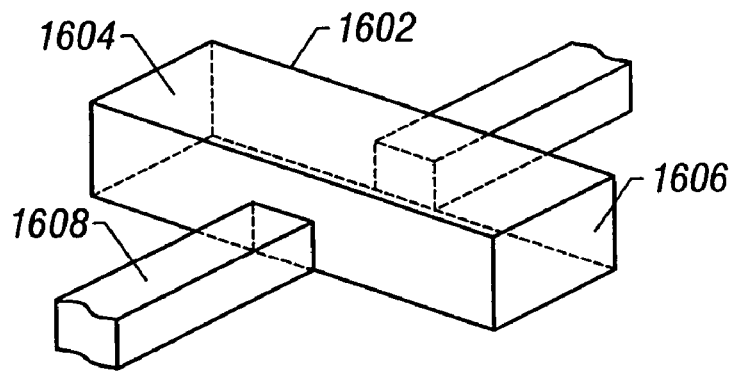
Figure 17:
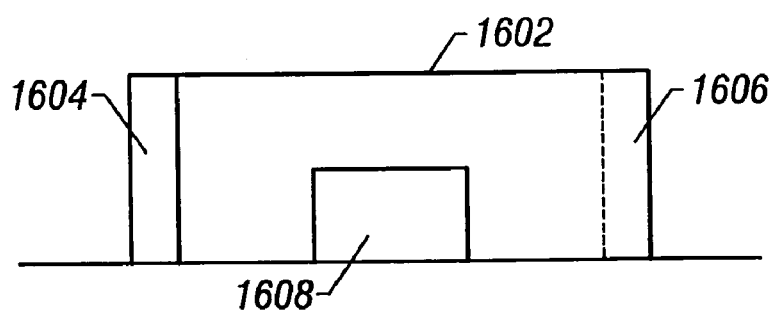
Figure 18:
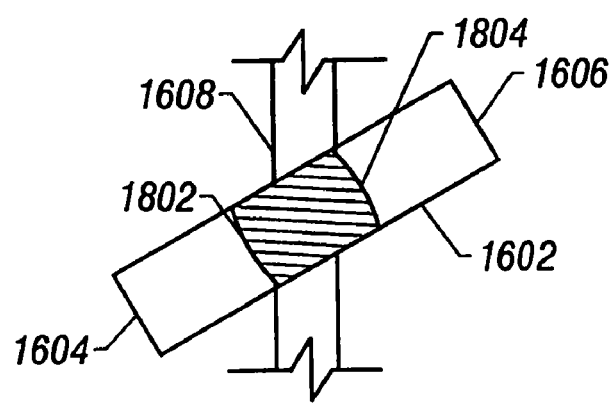
Figure 19:
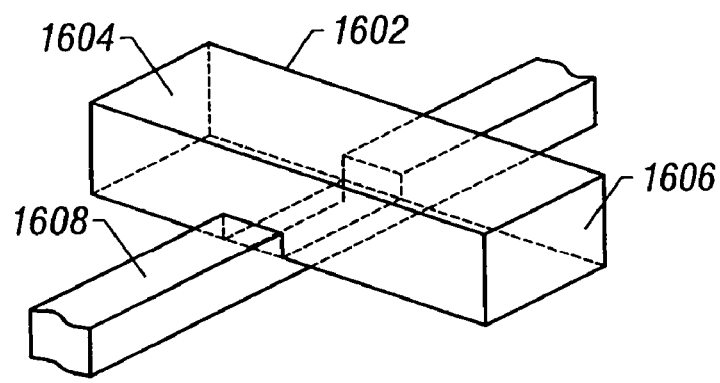
Figure 20:
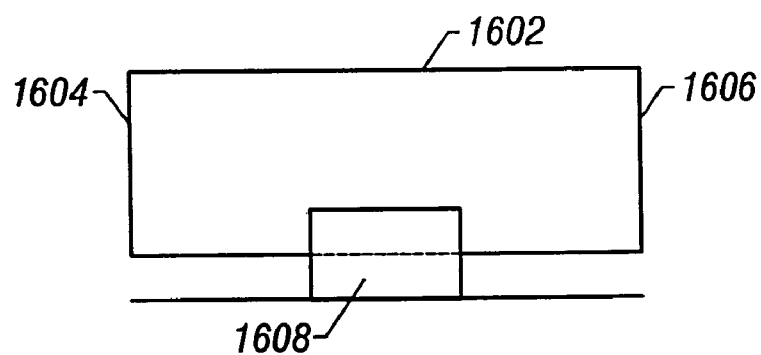
Figure 21:
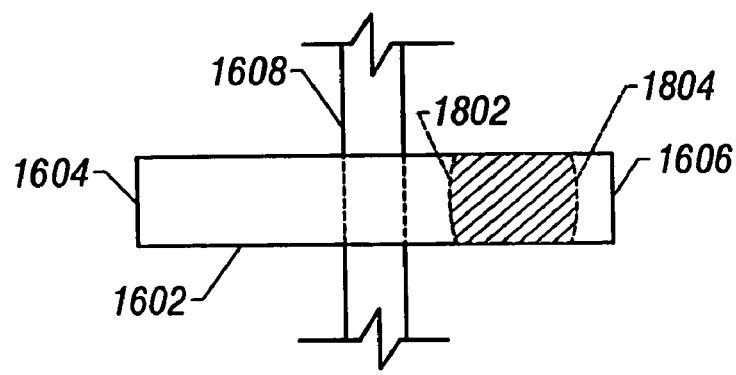
Figure 22:
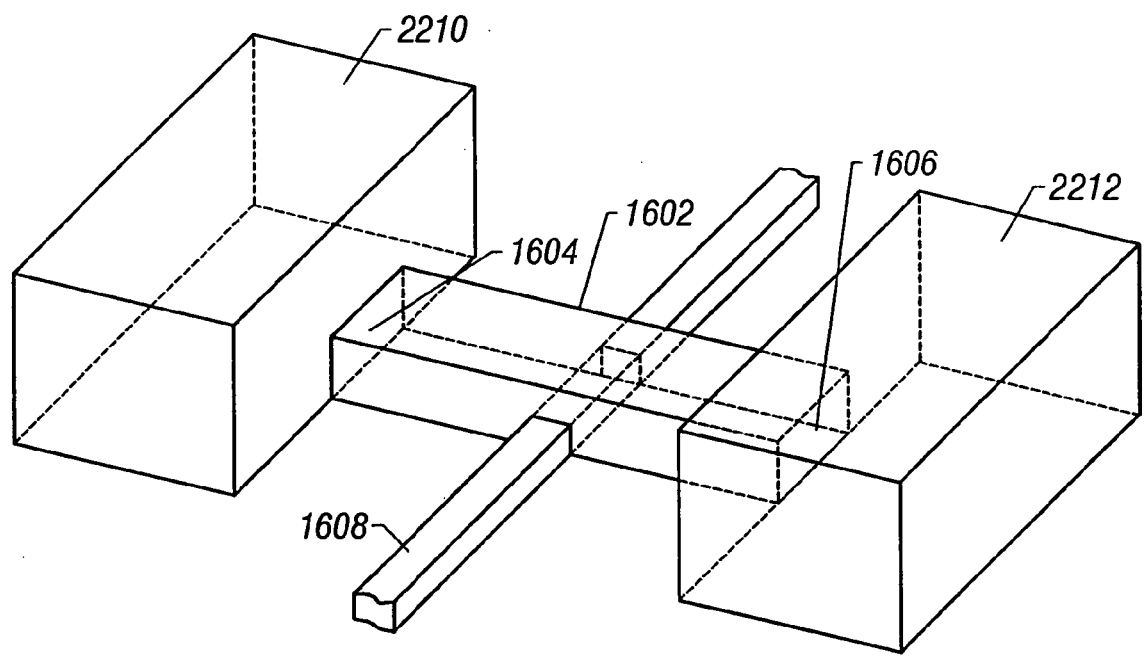
Figure 23:
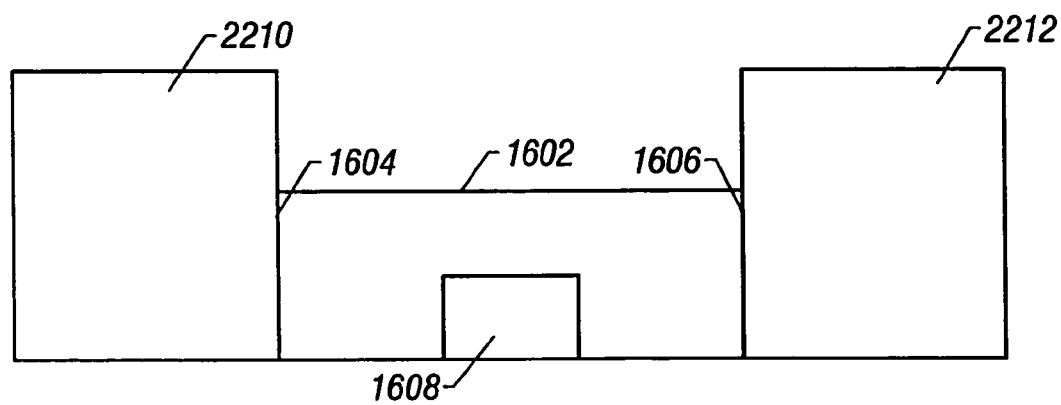
Figure 24:
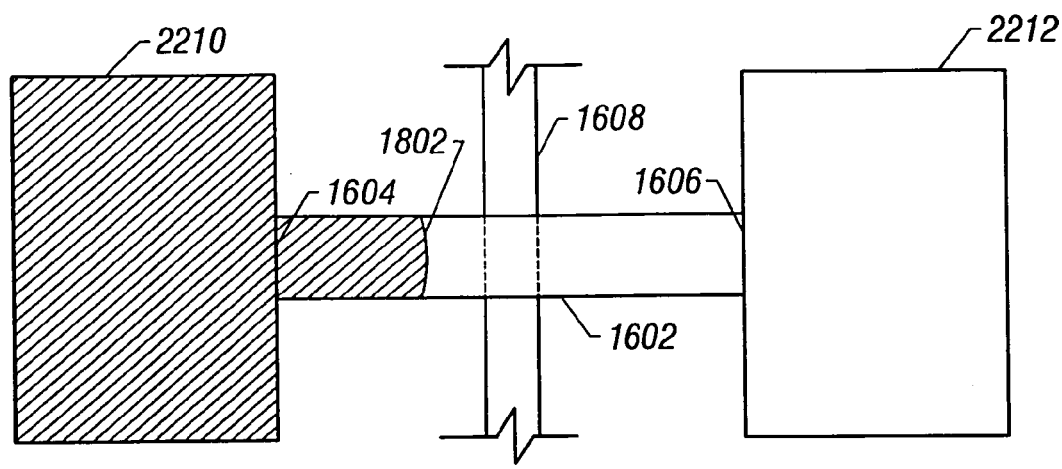
Figure 25:
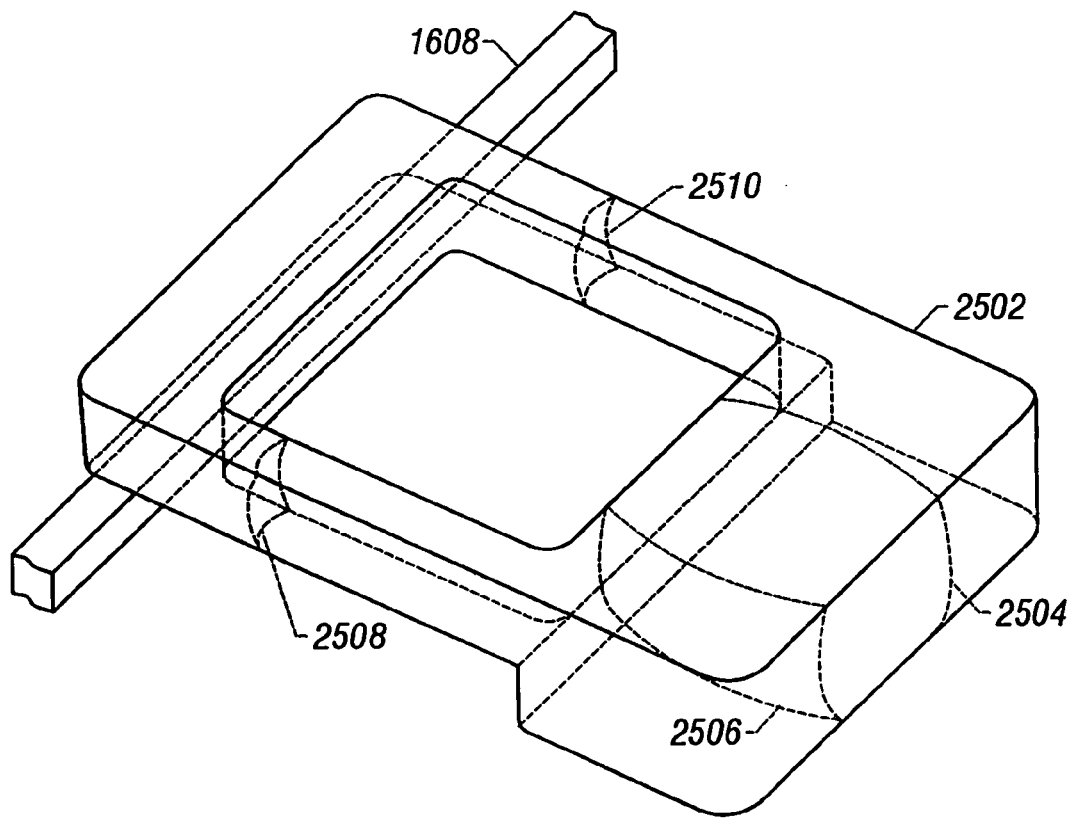
Figure 26:
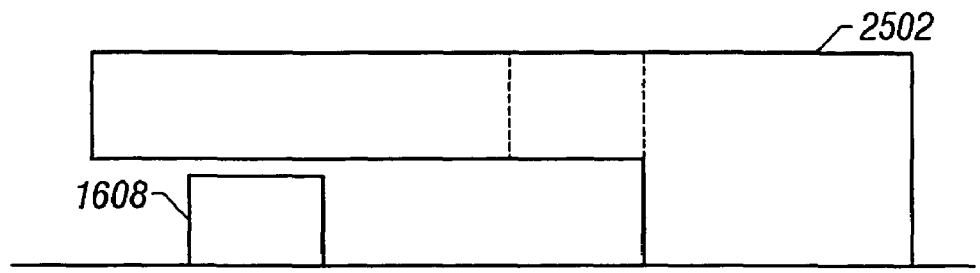
Figure 27:
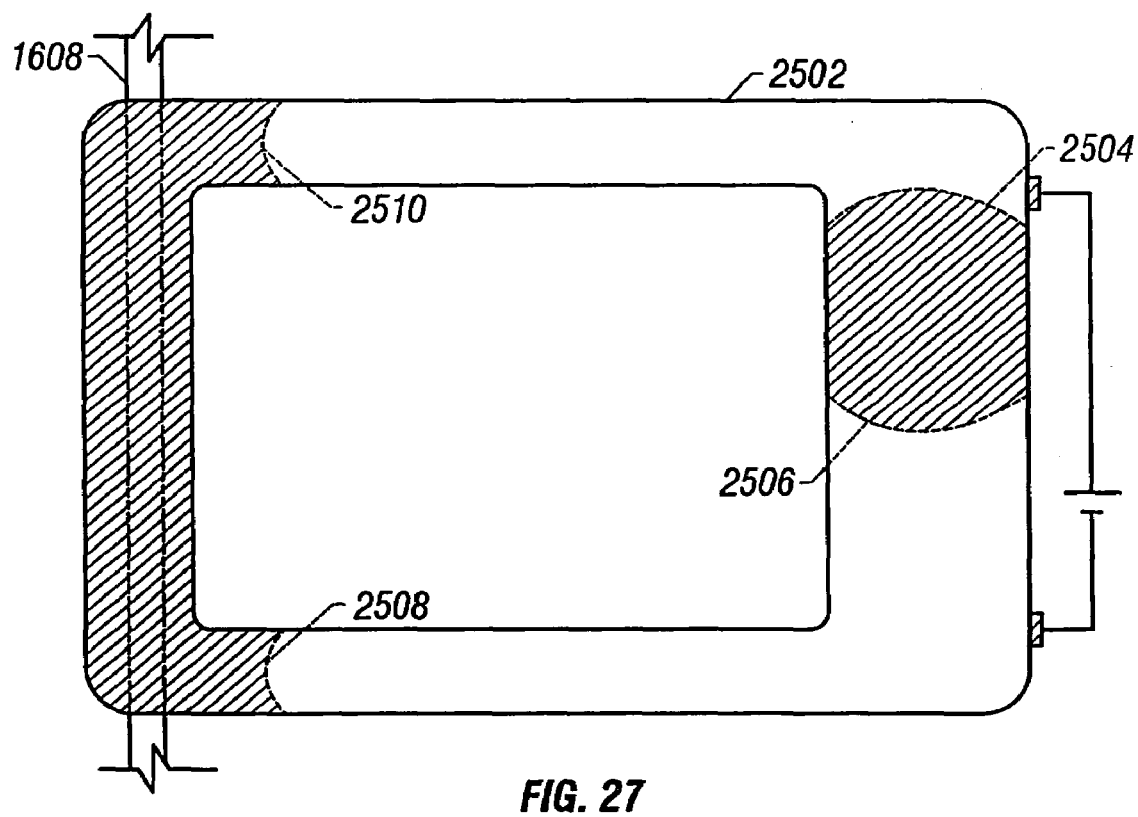
Figure 28:
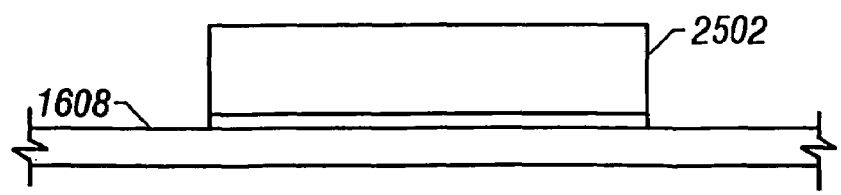

The fluid resides, in whole or in part, within a fluid channel. As illustrated in FIG. 16-24, the fluid channel 1602 may have ends 1604, 1606 that do not adjoin one another. At least one of the ends may be open to atmosphere, or the fluid channel may have at least one end opened to a fluid reservoir (e.g., 2210 and 2212 as illustrated in FIG. 22-24) that contains, for example, one of the fluids found in the channel and optionally a second fluid such as a gas, which compresses easily. The interfaces 1802 and/or 1804 between two fluids are illustrated in FIGS. 18, 21, and 24.

This fluid channel may reside partially or completely above, below, or beside a waveguide. The fluid channel may be in physical contact with the core (such as in an optical attenuator or optical shutter in which mode leakage from the core is desired). The fluid channel may instead be separated from the core by a layer of cladding that is sufficiently thin to allow energy from the optical signal traversing the waveguide to extend into the fluid channel and any fluid contained in the fluid channel in the vicinity of the waveguide. The fluid channel may intersect the core 1608, so that it forms all (as illustrated in FIG. 16-18) or part (as illustrated in FIG. 19-21) of the cross-section of a portion of the core. The fluid channel may cross the core without intersecting it, but surrounding it in whole or in part (as illustrated in FIG. 22-24). The fluid channel may in any of these instances also extend into cladding above and/or below the core to effectively attenuate, refract, diffract, reflect, retard, or block the optical signal encountering the fluid and/or optional solid in the fluid channel.

Figure 29:
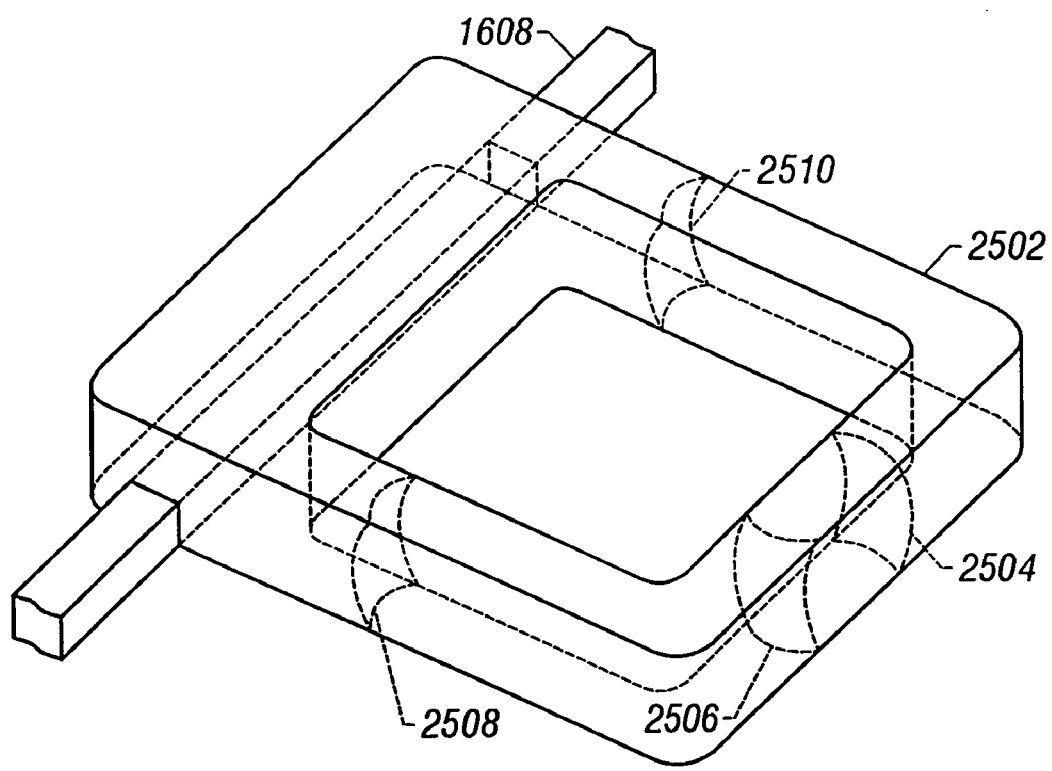
Figure 30:
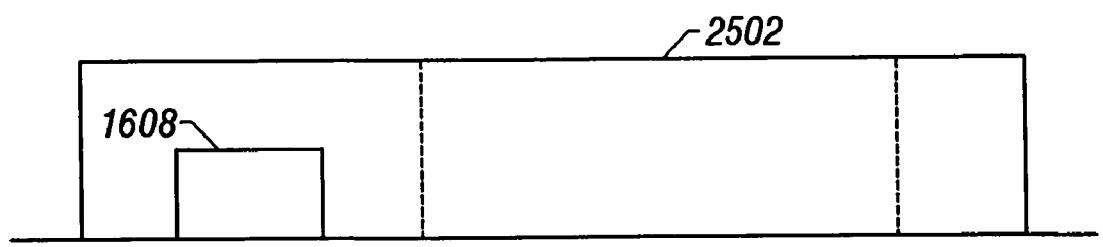
Figure 32:
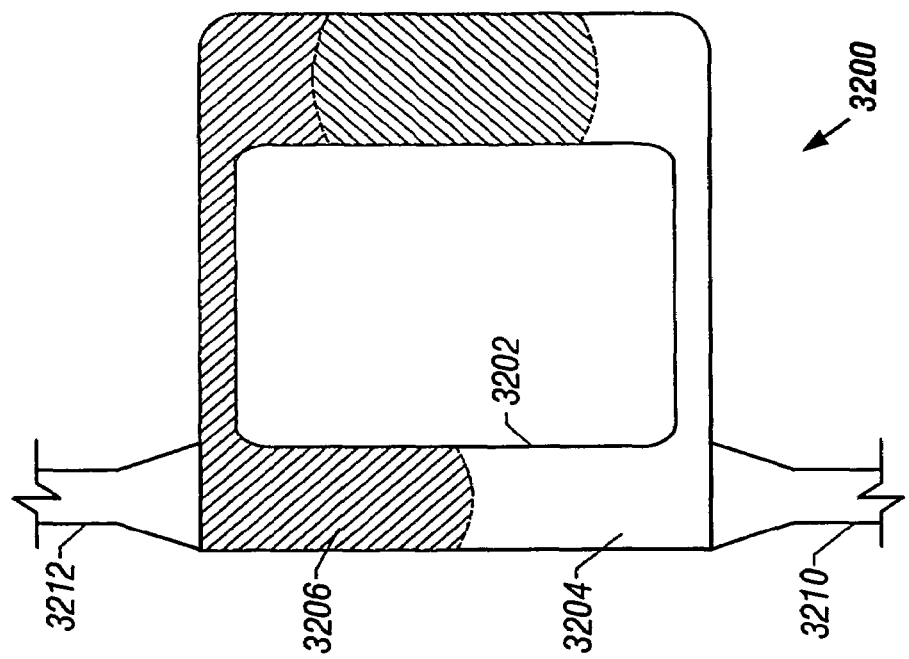
Figure 31:
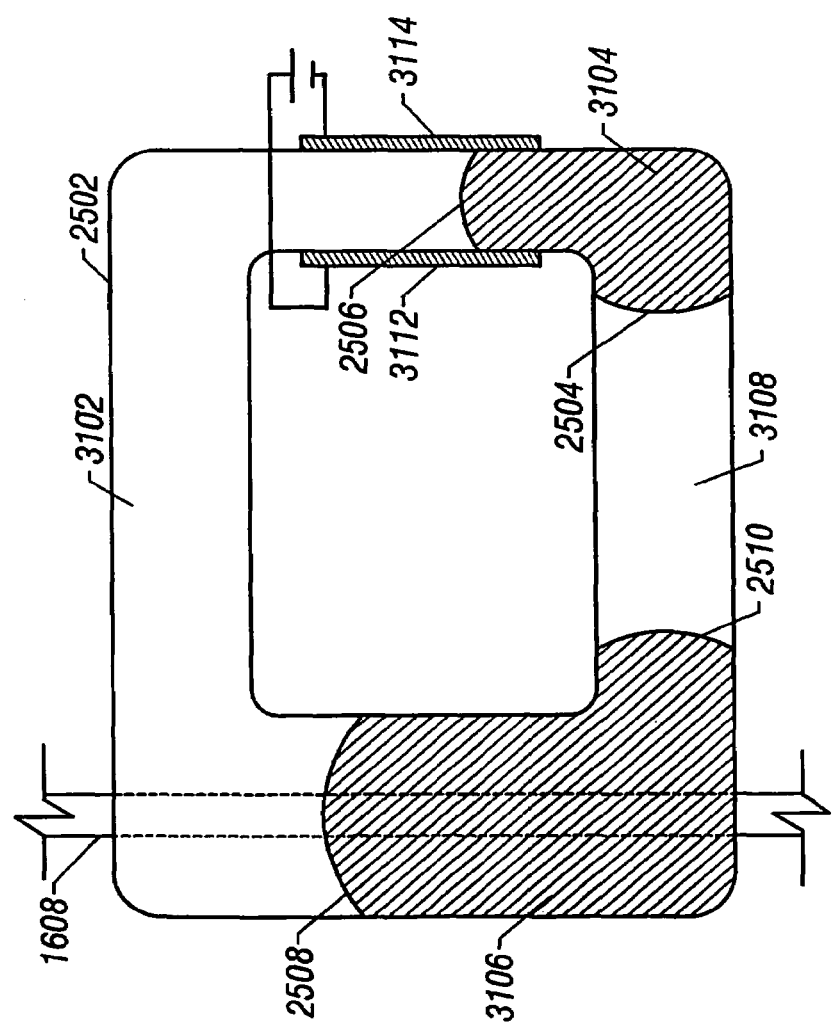

The fluid channel may physically intersect the core or cross above or below the core diagonally (as illustrated in FIG. 18) or perpendicularly to the core (as illustrated in FIGS. 21 and 24), or the fluid channel may intersect a portion of the energy of the optical signal by running in proximity to the core for some length (as illustrated in FIG. 25-28). The fluid channel may instead surround the core on two or more sides for some length (as illustrated in FIG. 29-31). The fluid channel may further be configured as replacing the core of the waveguide for some length (as illustrated in FIG. 32).

The fluid channel may be configured as a continuous channel 2502 as illustrated in FIG. 25-40 rather than a channel with open ends, so that fluids with interfaces 2504, 2506, 2508, and 2510 may be moved along the channel in one direction to return to their points of origin or may be moved forward and backward between different positions as desired. Depending on the microfluidic motive force, on the function of the device, and on the material properties of the fluids used, a channel (whether continuous or open-ended) may contain as few as one or two interfaces between two dissimilar fluids or between two dissimilar phases of the same fluid, as illustrated in FIGS. 18, 21, and 24, or it may contain many such interfaces, as illustrated in FIG. 33.

Figure 33:
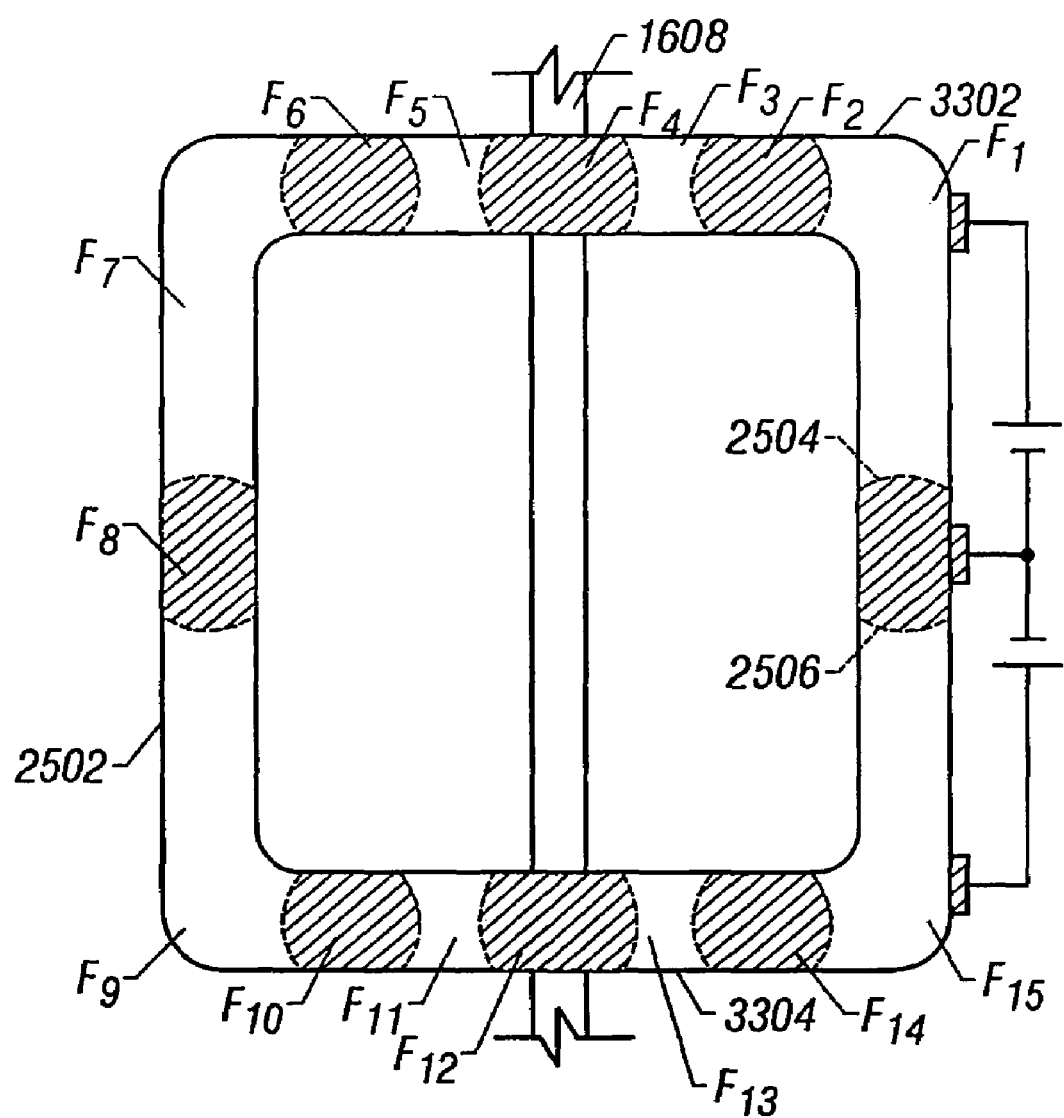
Figure 34:
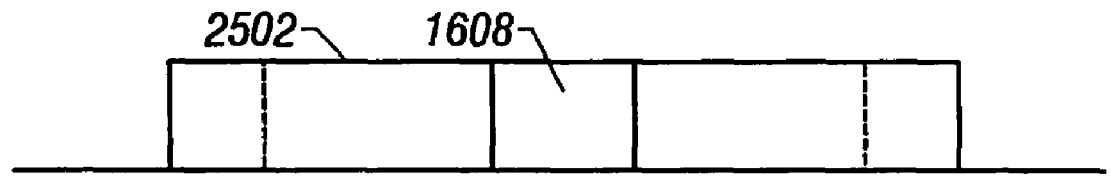

The fluid channel may have a cross-sectional area that is constant across all portions of the fluid channel, as illustrated in FIGS. 33 and 34. The continuous channel may be connected to one or more reservoirs at different locations along the channel, and typically the continuous channel is sealed from the atmosphere. The channel width, depth, and/or cross-sectional area may instead differ along the channel, especially along a continuous channel, to provide better control of the interface motion in the optical region. For example, the fluid channel may have a smaller cross-sectional area in that portion of the channel that intersects a portion of the energy of the optical signal than in that portion of the channel that is subjected to driving force, as illustrated in FIG. 25-28. With this configuration, it is only necessary to move the fluid boundary or interface subjected to the driving force (2504 or 2506) a short distance ink order to move the fluid boundary or interface exposed to the optical energy (2508 or 2510) a longer distance. For example, if the cross-sectional area of the channel exposed to the driving force is 2,000 $\mu m^2$ and the cross-sectional area of the channel exposed to the energy of the optical signal is 400 $\mu m^2$, a 1-mm movement in the fluid boundary or interface exposed to the driving force (e.g., 2504 or 2506) will move the fluid boundary (e.g., 2508 or 2510) a distance of 5 mm in the portion of the channel exposed to the energy of the optical signal. Thus a small, slow movement of the interface by the driving force leads to a larger, rapid movement of an interface in the optical region. The cross-sectional area of the channel in the optical region may instead be greater than the cross-sectional area of the channel in the force region, as in FIG. 29-31. This configuration provides greater control of the position of the interface in the optical region of the channel.

A continuous fluid channel that intersects the core, or that crosses above or below the core without intersecting it, may be configured to intersect or cross the core twice. Interaction of the fluids in the channel with the optical field may occur, for example, by attenuation, diffraction, refraction, scattering, retardation, reflection, and/or total internal reflection (for the case of an intersecting channel). Interaction may also occur, for example, by attenuation, dispersion, mode leakage, mode evolution, retardation, and/or frustrated total internal reflection (for the case of a non-intersecting channel). One such (intersecting) configuration is illustrated in FIG. 33-34. Each of arms 3302 and 3304 of channel 2502 may contain the same fluids, so that the optical signal in core 1608 is affected twice as it traverses the channel. These arms may instead contain many different fluids $F_1$, $F_2$, $F_3$, . . . positioned so that one of the arms has a fluid with a refractive index equal to the refractive index of the core (thereby resulting in little or no interaction with the optical field), while the other arm has several fluids with different values of refractive index and/or reflectivity. Consequently, the desired attenuation, diffraction, refraction, scattering, retardation, reflection, and/or total internal reflection can be provided by positioning in the optical pathway a slug of the desired fluid, present in the channel with many other slugs of fluids of different refractive index and/or reflectivity. Further, a slug of fluid $F_4$ (e.g., an attenuating fluid) may be positioned to encounter energy from the optical signal in arm 3302, and a slug of fluid $F_{12}$ (e.g., a refracting fluid) may be positioned to encounter energy from the optical signal in arm 3304. Similar configurations of fluids in the two arms 3302 and 3304 are possible for the case of a non-intersecting channel, with the interaction between the fluids and the optical field including instead attenuation, dispersion, mode leakage, mode evolution, retardation, and/or frustrated total internal reflection. See Table 1 for optical properties (including refractive indices) of fluids that can be utilized in devices of the invention.

A continuous fluid channel that intersects the core may be configured to have variable depth, so that only one of the intersections or crossings results in interaction of the fluids in the channel with the optical field in the waveguide. For example, in FIG. 35-36, channel 2502 crosses core 1608 twice in the view depicted in FIG. 35. In arm 3502, the channel depth is such that the channel intersects the core (in whole or in part), while in arm 3504, the channel depth is such that the channel remains above the core, as shown in FIG. 36. The intersecting crossing in arm 3502 allows the use of fluids for interacting with the optical field (e.g., by total internal reflection), while the non-intersecting crossing in arm 3504 provides a fluid return path to realize, for example, a self-latching device, without interacting a second time with the optical field.

A continuous fluid channel may be configured to cross the core twice without intersecting the core. One such configuration is shown in FIG. 37-38, where channel 2502 crosses core 1608 twice. In arm 3702, the channel depth is such that the channel comes into close proximity of the core (a gap may or may not be present), while in arm 3704, the channel depth is such that the channel remains further away from the core. The crossing in arm 3702 allows the use of fluids for interacting with the optical field (e.g., by mode leakage), while the crossing in arm 3704 provides the desired return path for the fluids in the channel without introducing a second interaction with the optical field.

Figure 39:
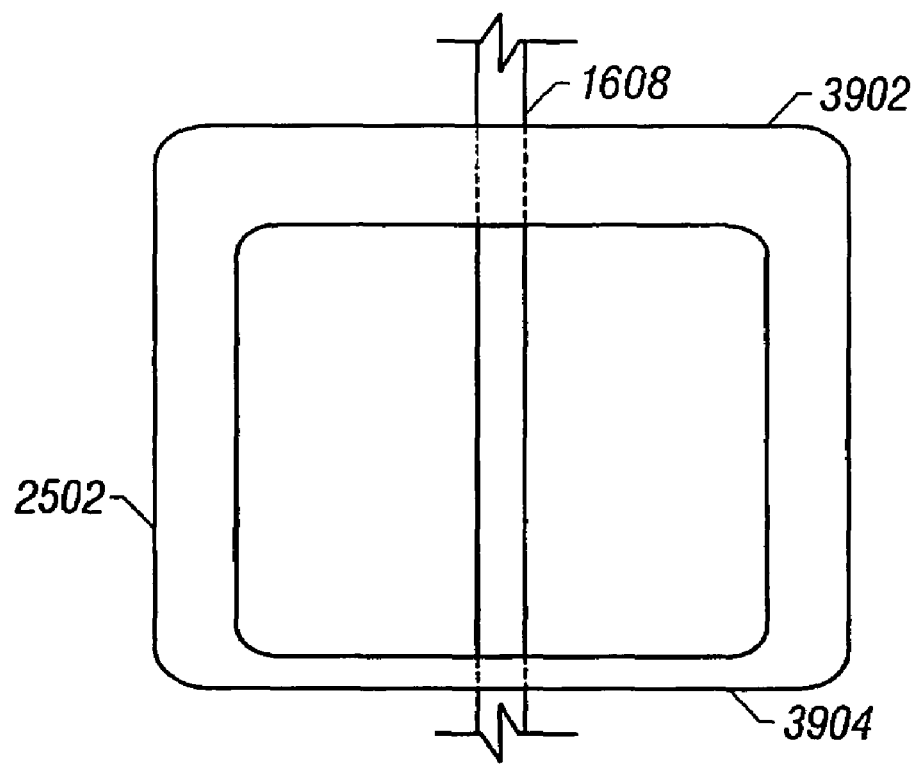
Figure 40:
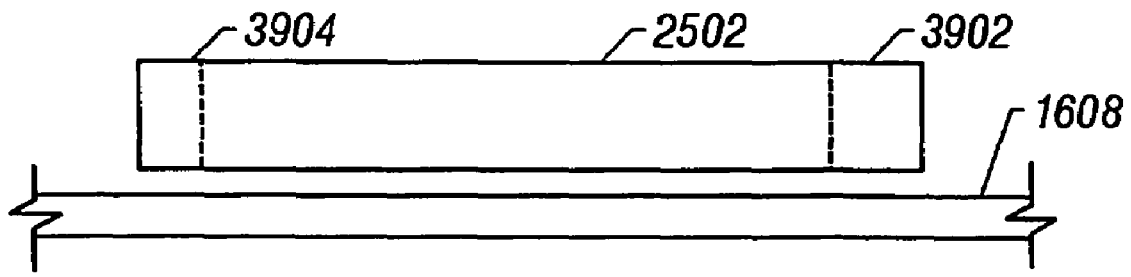

A continuous fluid channel may be configured to have variable width. One such configuration is shown in FIG. 39-40, where channel 2502 crosses core 1608 twice, and may or may not be separated from the core by a gap. In arm 3902, the channel is relatively wide, so that the region of effective interaction between the fluids in the channel and the optical field at this crossing is extensive (e.g., by mode leakage). In arm 3904, the channel is relatively narrow, so that this crossing, while still providing a fluid return path, results in little interaction between the fluids in the channel and the optical field. This configuration allows the channel to be formed into a loop, providing a fluid return path, while effectively confining the interaction between the fluids in the channel and the optical signal to a single crossing location. The loop structure, in turn, enables greater flexibility in the design of the device (e.g., allowing both self-latching and semi-latching operation, as described below).

A channel may further be configured to have variable width as well as variable depth, so as to combine the benefits of both for the purpose of interacting with the optical field at some points but not at others. The width, depth, or both, of the channel may also be varied in different regions of the channel to reduce overall viscous drag. The cross-sectional area may thus be configured to be larger in areas not part of the optical region or the force region. Further, the total viscous drag in a channel can be reduced by filling part of the channel with a gas.

A channel may contain multiple fluids as illustrated in FIG. 31, each selected to fulfill a given function in the device. For example, the interface 2506 between e.g., perfluorooctane 3102 and, e.g., propylene carbonate 3104 would be positioned in channel 2502 between electrodes 3112 and 3114 of the device, so that these fluids can be moved using dielectric pumping, for instance. A third fluid 3106 such as, e.g., decahydronaphthalene would be adjacent to perfluorooctane 3102, and the interface 2508 of these two fluids would be moved along core 1608 to provide a desired amount of attenuation. Thus, the role of propylene carbonate 3104 is to provide a desired motive force but not optically interact with the optical signal, and the role of decahydronaphthalene 3106 is to provide a desired optical interaction but not a motive force. Perfluorooctane 3102 serves two purposes: interacting with the optical signal and creating a difference in capacitance (in combination with propylene carbonate 3104) to provide a way to move the fluids in the channel. An optional fourth fluid 3108 (e.g., a gas such as air) may be inserted in the channel to reduce viscous drag.

Figure 41:
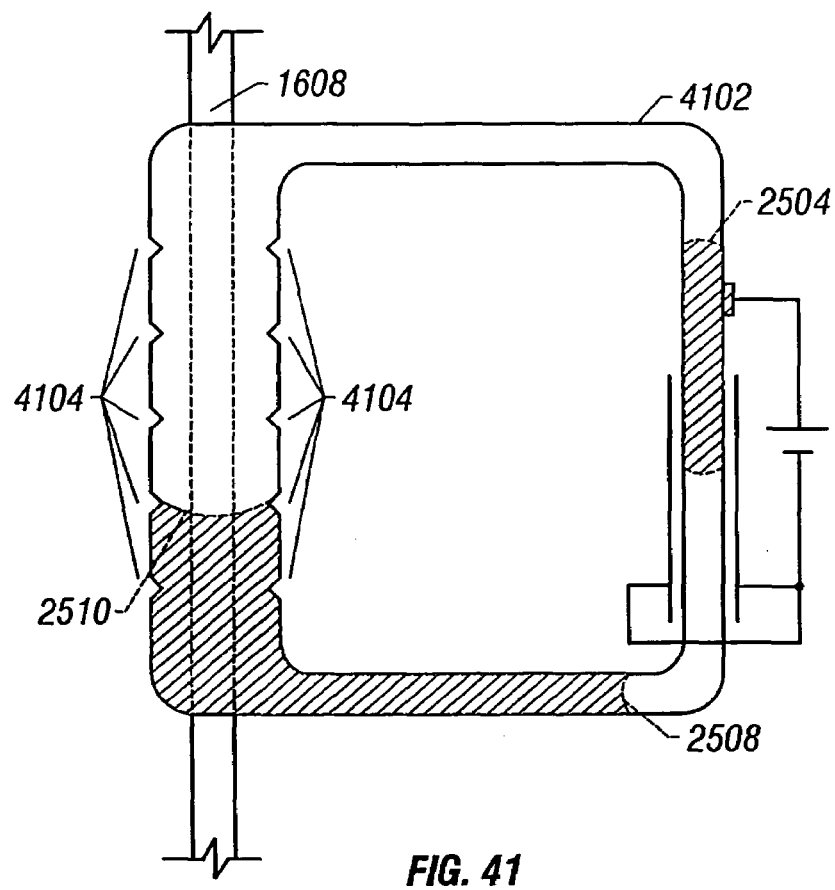

A channel may be configured so that the fluid interface moves in steps or discrete increments by incorporating spatial or surface energy inhomogeneities into the channel walls. One such configuration is illustrated in FIG. 41. The sidewalls of channel 4102 may have a plurality of micron-size indentations 4104 (either out from or into the wall, and either on one side only or on both). Alternatively, a thin film (as thin as a single molecular layer) of a low-surface-energy coating agent such as a silane coupling agent, a fluorocarbon, or a fluoropolymer may be deposited onto one or more of the microchannel walls and patterned into narrow strips that run across the direction of fluid motion. Each of the indentations and the narrow strips effectively act as surface irregularities, which modify the energy landscape seen by moving fluid interface 2510. As the interface moves along the channel, it takes additional pressure to move the interface past either the indentations 4104 or the narrow strips. Keeping the driving pressure below the threshold needed for overcoming the irregularities ensures that the interface remains pinned at one of the irregularities, while applying a short burst of extra pressure moves the interface past the irregularity.

A continuous channel may also be configured to provide for motion of fluids in one direction only. This can be accomplished by configuring multiple sets of electrodes or heaters (as needed by the microfluidic actuation force used) spaced around the entire channel. Each set of electrodes or heaters moves the fluids a certain distance, at which point the next set can be used to move the fluids further, and so on, all the way around the channel. The amounts of actuation fluids and positions of fluid-fluid interfaces are chosen to provide optimally for some overlap between adjacent sets of electrodes or heaters, and actuation of the various sets occurs in a sequence and at a rate such that the inertia and viscosity of the various fluids are taken into account to avoid fluid breakup or unwanted oscillations.

One advantage of a loop or continuous channel configuration is that the channel can be configured so that the moving fluid stops and remains in its stopped position when the stimulus (e.g. electric field, field gradient, voltage, current, heat, and/or thermal gradient) is removed. A device so configured is thus self-latching. That is, once the state of the device is changed, the device remains in the changed state despite removing the stimulus that changed the state of the device. This type of device is self-latching regardless of how the device is oriented with respect to gravitational force when the continuous channel configuration is formed of microchannels. As discussed previously, the gravitational force on fluids in microchannels is negligible when compared with capillary and wetting forces in the channels, and fluids in such microchannels exhibit negligible or no movement regardless of whether the microchannels are oriented vertically or at some other angle to the horizontal. Consequently, one advantage of this configuration is that a stimulus is required only to change the state of the device, not to maintain the device in its changed state. A self-latching device is made to return to its previous state by applying a reverse stimulus (such as electric field, field gradient, voltage, current, heat, and/or thermal gradient in a direction opposite to that of the first stimulus). The devices illustrated in FIG. 25-40, for example, can be configured to be self-latching when the channels are microchannels. Devices as illustrated in FIG. 22-24 can be made self-latching if an additional fluid channel between the reservoirs 2210 and 2212 (not illustrated in the figure for sake of clarity) is provided to prevent a differential pressure from being generated in the reservoirs when interface 1802 moves through microchannel 1602.

A device is made self-latching by selecting the size and shape of the microchannels so that the fluids in the microchannel are under no net force in the direction of movement except when a stimulus such electric field, field gradient, voltage, current, heat, or thermal gradient is applied. For example, a device having microchannels that have a constant cross-sectional area throughout, as illustrated in FIG. 33-34, is self-latching. A device composed of several microchannels, each of which has a constant cross-sectional area, but different from the others, as illustrated in FIG. 25-32, may be configured as self-latching by properly positioning the fluid interfaces so that motion of each interface only occurs within a microchannel with constant cross-sectional area. A device having microchannels with a cross-sectional area that decreases or increases in the direction of fluid movement (i.e., tapered portions) may also be configured to be self-latching when each tapered portion is filled with a single liquid.

A device may be designed to be semi-latching rather than self-latching. In a semi-latching device, an interface between fluids moves to a new position when a stimulus (such as an electric field, field gradient, voltage, current, heat, and/or thermal gradient) is applied, but the interface returns to the same resting position when the stimulus is removed. The return to equilibrium is due to the presence of a substantial restoring force in the device that acts in opposition to the actuation force or forces. Thus, in this type of device, a stimulus is applied to change and maintain the state of the device, but when the stimulus is removed, the device returns to its previous state without having to apply a reverse stimulus (such as electric field, field gradient, voltage, current, heat, and/or thermal gradient in a direction opposite to that of the first stimulus) or control its magnitude. Instead, the restoring force is responsible for returning the device to its equilibrium state.

An example of a semi-latching device is shown in FIG. 22-24. Here the restoring force is the compressibility of the fluids in the reservoirs 2210 and 2212. As interface 1802 moves (e.g., to the right) by a microfluidic actuation force, the fluid (or fluids) in reservoir 2210 expands and the fluid (or fluids) in reservoir 2212 compresses. This expansion and compression generates a differential pressure between the two reservoirs which balances the actuation pressure. When the actuation pressure is removed, the differential pressure moves interface 1802 back to its equilibrium position. Because of their greater compressibility, in some instances it may be preferable to employ gases in a device of this kind. A gas may then fill one reservoir entirely, or two gases may fill the two reservoirs while being separated by an intervening liquid slug in channel 1602, or gases may fill part of one or both reservoirs, the remaining part being filled with liquids.

Figure 42:
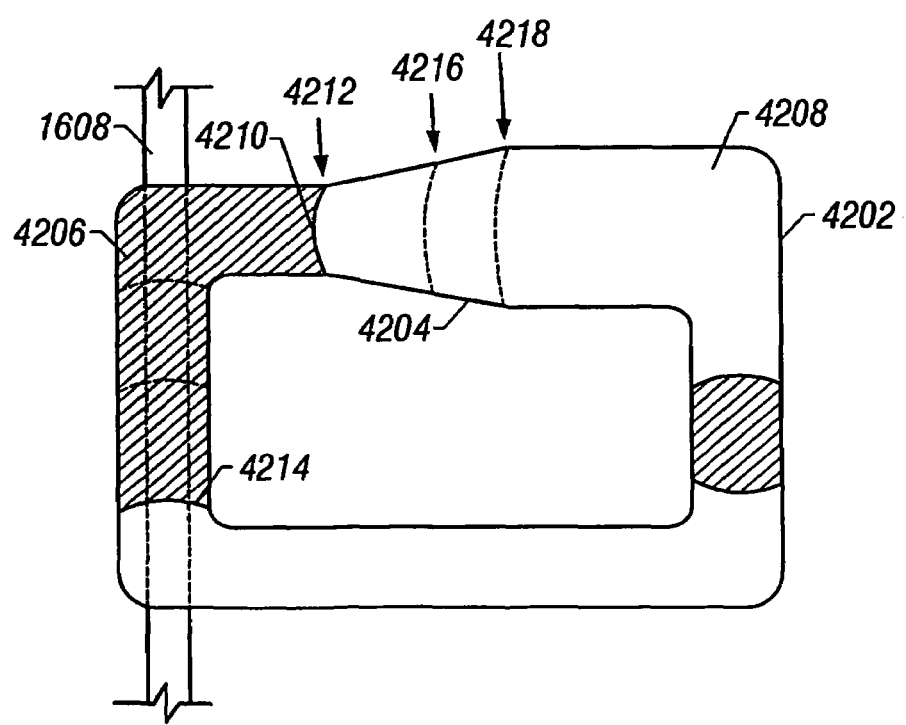

Another example of a semi-latching device is shown in FIG. 42. The restoring force in this case is capillary pressure. Continuous channel configuration 4202 has a uniform cross-section, except in tapered region 4204. Fluids 4206 and 4208 are placed in the microchannels so that interface 4210 between fluids 4206 and 4208 is positioned at the narrow end 4212 of tapered region 4204. This is an equilibrium state as; the capillary pressures at interfaces 4212 and 4214 are equal in magnitude. As a microfluidic actuation moves the fluids in the microchannels clockwise, interface 4210 is forced into wider and wider portions (e.g., 4216, 4218, . . . ) of tapered region 4204. The resulting imbalance in capillary pressure across fluid slug 4206 acts as a restoring force against the actuation force. When actuation ceases, this differential pressure moves the fluids counterclockwise until interface 4210 returns to its equilibrium position 4212.

A microchannel that runs in proximity to a waveguide core for some length is typically separated from the core by a thickness of cladding material ranging from 0 to 20 µm, with preferred embodiments between 0 and 5 µm. The length of the overlapping region can range from 100 µm to 10 mm, and typically would be between 1 mm and 5 mm; slug lengths in this case are comparable to the length of the overlap region. For the case of a microchannel that intersects the waveguide core, the channel width at intersection is up to about 20 µm, the core width at intersection is also up to about 20 µm, and slug lengths can range from about 50 µm to as much as 1 mm, with typical lengths between 100 µm and 500 µm. All these dimensions are appropriate for optical wavelengths in the neighborhood of 1.5 µm; where the devices are designed to work in other wavelength in the range from 0.3 µm to 1.8 µm, the dimension would be scaled appropriately (e.g., for a wavelength of 0.6 µm, the intersecting channel width would be up to about 8 µm). The ranges of dimensions, particularly for the depth of the microchannels, vary depending on the fabrication approach and on the device structure. For example, a microchannel may be constructed only in the optical chip and devised to act by proximity to (e.g., on top of) the waveguide. It would then be between about 10 µm and 20 µm deep. On the other hand, it may be constructed in both the optical chip and in the cover chip, and devised to act by intersecting the waveguide. It would then be between about 20 µm and 100 µm deep (15 µm to 30 µm of depth in the optical chip, the rest in the cover chip).

Optical Devices

Any of the configurations discussed above can be used to form programmable optical elements. Examples of these optical elements include optical switches, shutters, dynamically programmable attenuators, programmable filters and related devices. Any individual device is a functional instance of a programmable optical element. There are a great many physical devices that can be realized in the class of programmable optical elements, and many of those can provide the function necessary for more than one type of functional instance. For instance, the well-known thermooptic Mach-Zehnder interferometer is commonly configured as a switch in some applications and is also commonly configured as an attenuator in others by selecting the appropriate materials to construct the interferometer and manufacturing it so that its arms have the dimensions appropriate for switching or for attenuating, or by providing a single interferometer with a temperature controller that is programmed to provide a level of heat sufficient to attenuate the optical signal. Likewise, a switch may be configured to switch an optical signal to a desired output port to which, e.g., an optical fiber or other waveguide is coupled, or it may be configured to shutter an optical signal by switching the optical signal to a port where the optical signal is discarded.

The transmission of an optical device can be manipulated by introducing changes in the refractive index experienced by an optical signal travelling along the optical path. These changes can be applied to either or both the phase-accumulation and the absorption components of the refractive index. These changes are manifested in the optical propagation through the device through any one or more of the mechanisms of refraction, diffraction, dispersion, reflection, retardation, and absorption. Optical devices can be designed and configured to provide a functional response to the mechanisms according to numerous effects, many embodiments of which will be enumerated in the following paragraphs.

One embodiment of the present invention, a device for programmable phase retardation and/or advancement, can be configured as illustrated in FIG. 25-31. Such a device is made by introducing a fluid into the cladding region that alters the propagation constant, or effective refractive index, of the waveguide in its proximity. Referring to FIG. 25-28, the fluid channel 2502 extends much of the length of the waveguide 1608 and is physically in contact with one side of the core of the waveguide or is separated from it by a narrow gap. Alternately, referring to FIG. 29-31, the fluid channel 2502 extends much of the length of the waveguide 1608 and is physically in contact with three sides of the core of the waveguide or is separated from them by a narrow gap. The refractive indices of both the fluid defined by interfaces 2508 and 2510 and the fluid defined by interfaces 2508 and 2506 are close to the cladding index, but different from each other. Acting upon fluid interface 2504 or 2506 using one of the microfluidic actuation forces and devices discussed above results in the slug of fluid defined by interfaces 2508 and 2510 to move and to be replaced by a slug of fluid (e.g., defined by interfaces 2508 and 2506) with a different refractive index. Since the effective index of the waveguide depends on the index of the material surrounding the core, movement of interface 2508 along waveguide 1608 results in a programmable change of the total phase accumulation of the optical signal as it travels through core 1608. Elements for controlling or modulating the fluid flow, such as the indentations illustrated in FIG. 41 or others discussed above, may also be employed to enhance the programmability of the phase shift.

In another embodiment of the present invention, a device for programmable attenuation and/or shuttering is made by introducing a fluid into the cladding region that spoils the mode of the waveguide and allows significant fractions of the optical energy to radiate away from the waveguide. Such a device can be configured much as illustrated in FIG. 25-31, where the fluid channel 2502 extends much of the length of the waveguide 1608 and is physically in contact with the core of the waveguide or is separated from it by a narrow gap. Referring to FIG. 29, the refractive index of the fluid slug defined by interfaces 2508 and 2510 in the portion of the channel contacting the waveguide is less than that of the waveguide core and behaves as a proper cladding when the device is to pass the optical signal at low attenuation. To increase the attenuation, the fluid interface 2504 or 2506 is acted upon using one of the microfluidic actuation forces and devices discussed above. This causes the slug of fluid defined by interfaces 2508 and 2510 in the channel above the core of the waveguide to move, replacing it with a slug of fluid (e.g., defined by interfaces 2506 and 2508) having a refractive index that is equal to or greater than the refractive index of the core. In the region where the higher-index fluid is adjacent to the waveguide, the waveguide is spoiled and optical energy quickly radiates away from the waveguide as it propagates (mode leakage). The longer the region of overlap of the high-index fluid, the higher the attenuation of the signal transmitted to the output portion of the waveguide. Elements for controlling or modulating the fluid flow, such as the indentations illustrated in FIG. 41 or others discussed above, may also be employed to enhance the programmability of the attenuation. If the maximum attenuation of the device is high enough, usually greater than 20 dB, the device may also be used as a shutter.

A programmable optical attenuator or shutter may instead be configured as illustrated in FIG. 32. In this attenuator 3200, fluid channel 3202 contains a fluid 3204 that acts as the core of the waveguide. Fluid 3206 also acts as the core when it is positioned between waveguides 3210 and 3212. However, fluid 3206 contains a colloidal suspension (e.g., a dispersion of silica, titania, or polystyrene microspheres in carbon tetrachloride) that induces a high rate of loss of the optical signal from the guided mode due to scattering. Alternatively, fluid 3206 may be highly absorptive in the wavelength range of interest, or it may contain a colloidal suspension of highly absorptive particles (e.g., a carbon black dispersion), resulting again in a high rate of loss. Consequently, the extent of attenuation is dependent upon how much of the channel 3202 between waveguides 3210 and 3212 is filled with fluid 3206. Maximum attenuation (shuttering) occurs when channel 3202 between waveguides 3210 and 3212 is completely filled with fluid 3206.

Figure 43:
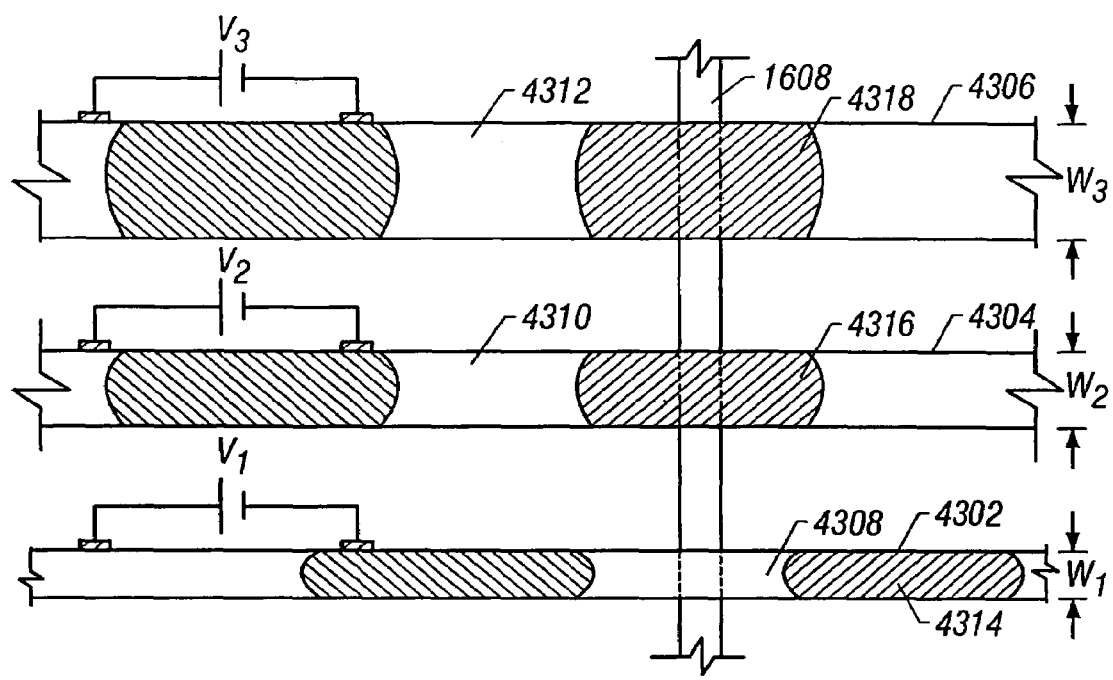
Figure 44:
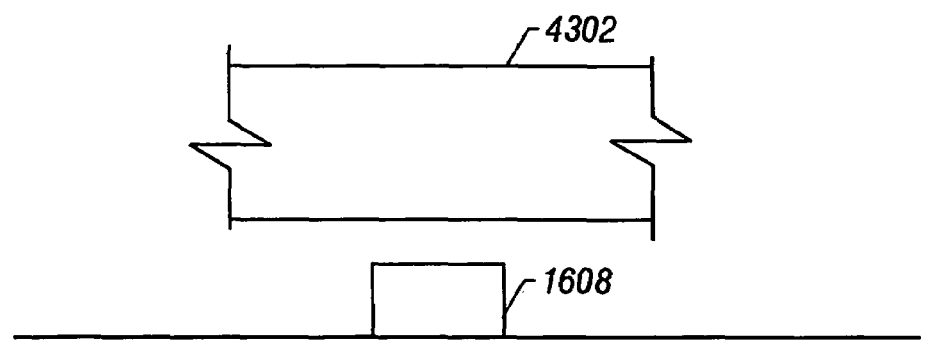

A programmable optical attenuator having discrete, varying levels of attenuation may be configured as illustrated in FIG. 43. This device has multiple fluid channels 4302, 4304, 4306, . . . of different widths $w_1$, $w_2$, and $w_3$, . . . that cross over the core. The crossings may be configured as illustrated in FIG. 44, where the channels 4302, cross over (or under) the core 1608 and are separated from the core by a narrow gap, or the crossings may be configured without such a gap. The crossings may also be configured as illustrated in FIG. 22-24, where the channels cross the core surrounding the core on more than one side. The crossings may also be configured as illustrated in FIG. 19-21, where the channels cross the core and intersect the core to a lesser or greater degree. Referring again to the exemplary illustration in FIG. 43, if a small percentage of attenuation is desired, a slug of fluid 4308 having the appropriate refractive index (referred to as a high-index slug) is positioned in channel 4302 over the core 1608 to spoil the mode along the width $w_1$ of the channel, while low-index slugs 4316 and 4318 are positioned over the core in fluid channels 4304 and 4306, respectively. If a greater amount of attenuation is desired, a high-index slug 4310 is positioned above core 1608 in the wider fluid channel 4304, whereas channels 4302 and 4306 have low-index slugs 4314 and 4318, respectively, adjacent to the waveguide. To obtain a yet greater amount of attenuation, high-index slug 4312 can be positioned above the core in the yet wider channel 4306, with channels 4302 and 4304 having low-index slugs 4314 and 4316, respectively, adjacent to the waveguide core. In addition, any combination of fluid channels 4302, 4304, 4306, . . . may have high-index slugs positioned above the core, up to all of the fluid channels having high-index slugs, so that the optical device provides maximum attenuation or even shuttering of the optical signal. This configuration enables the use of digital (on/off) actuation on each of the channels to obtain an effectively analog optical function (variable attenuation). Further, the high-index slug in each of the channels may be the same fluid, or the high-index slugs may be different fluids with different refractive indices if desired. If a long fluid channel or a continuous fluid channel is employed (e.g., as illustrated in FIG. 33), multiple high-index slugs having different refractive indices may instead be placed in an individual channel, so that the amount of attenuation provided by any individual channel can be varied as desired to provide a selected attenuation from the device.

Figure 45A:
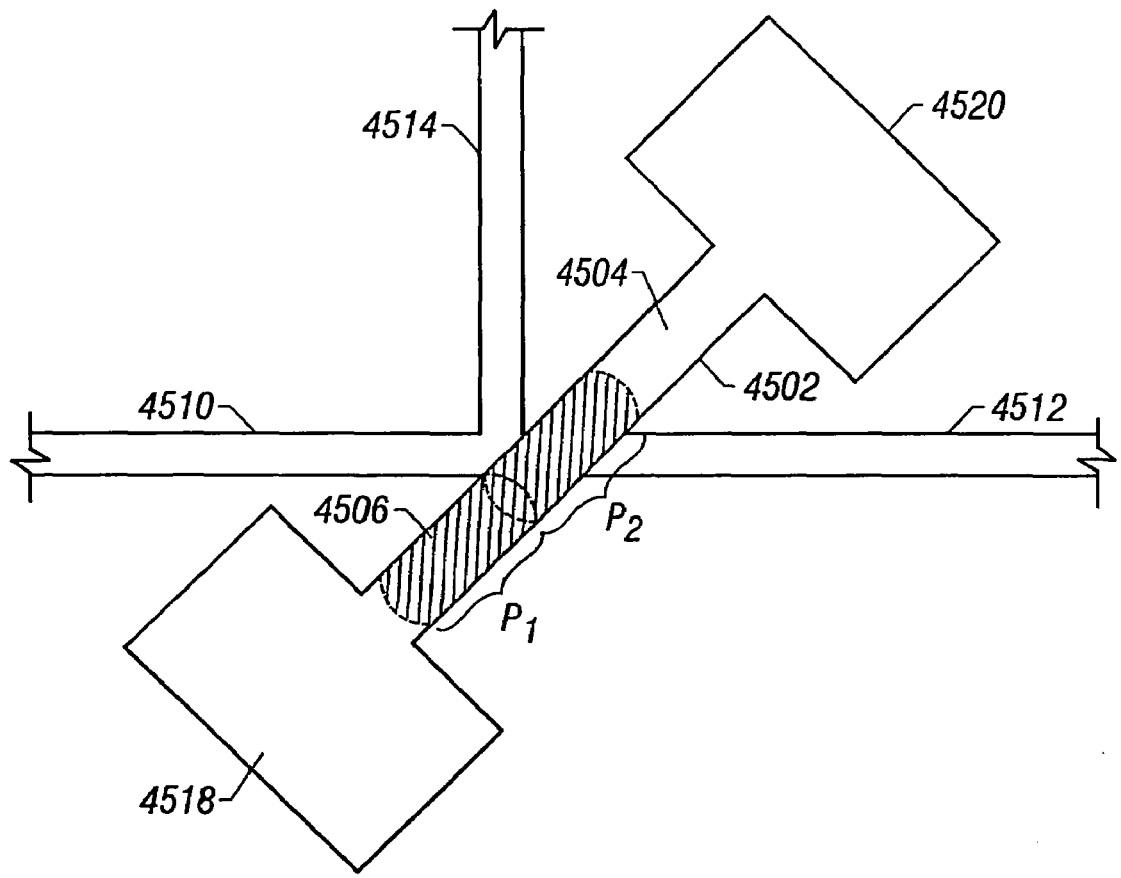
FIG. 45A illustrates one embodiment of the invention, an optical switch or shutter.

Another embodiment of the present invention is illustrated in FIG. 45A and utilizes the effect of total internal reflection to provide for optical switching and/or shuttering. In this device, fluid channel 4502 crosses the waveguides 4510, 4512, and 4514 in a way similar to the illustrations in FIG. 16-18; i.e., the channel intersects the entire cross-section of the waveguides. Fluid channel 4502 contains a fluid 4504 with refractive index greater than, but very near (preferably within about 0.1) that of the waveguide material. Adjacent to fluid 4504 in channel 4502 is another fluid 4506, which has a much lower refractive index than the cores 4510, 4512; and 4514. The channel is preferably less than about 20 µm wide along the axes of waveguides 4510 and 4512. When the high-index fluid 4504 is in the portion of the channel interrupting the waveguides and fluid 4506 is in position $P_1$, optical signals are transmitted across the trench with little effect: light coming in on channel 4510 is transmitted out channel 4512 with high efficiency and very little light is coupled into waveguide 4514. When the low-index fluid slug 4506 is moved into the path of the waveguide (position $P_2$), the optical signal in waveguide 4510 experiences total internal reflection at the first boundary of the trench and is switched into channel 4514 with very little leakage into channel 4512. The slug 4506 may be moved by any of the microfluidic mechanisms discussed previously. Waveguides 4510, 4512, and 4514 may be configured to be single-mode, or they may be configured to be multimode, whether in the vicinity of the fluid channel, far away from it, or both.

Figure 45B:
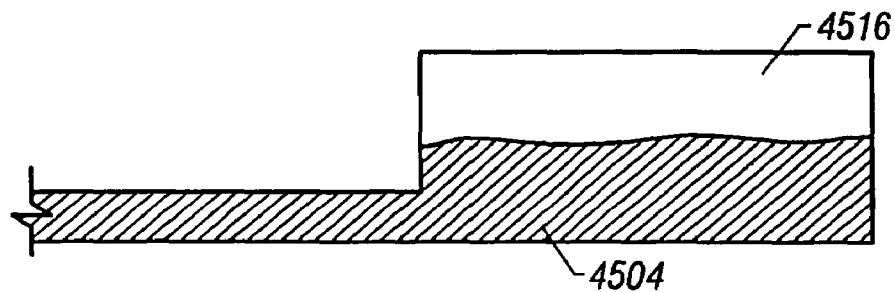
FIG. 45B is a side view of a reservoir of the optical switch of FIG. 45A.

The device illustrated in FIG. 45A shows channel 4502 having two fluid reservoirs 4518 and 4520 at either end. FIG. 45B depicts a side view of reservoir 4520, showing that a portion of the reservoir contains liquid 4504 and gas 4516 (air, nitrogen, carbon dioxide, or other gas compatible with the materials with which the gas is in contact). The gas compresses, allowing fluid to move into or out of the chamber readily. Reservoir 4518 may be similarly configured to contain a volume of gas to further facilitate fluid flow in and out of the chamber. If desired, an additional fluid channel between the reservoirs (not illustrated for sake of clarity) may be provided in the gaseous area to equalize pressure. In this instance, the entry to the channel is provided in a location along a wall of the reservoir that remains in contact with gas 4516 through the full range of travel of fluid slug 4506. This device works in similar fashion if the slug 4506 is instead a liquid metal such as mercury or a gallium alloy, but the optical effect used is metallic reflection rather than total internal reflection.

One way to provide total internal reflection for, e.g., an optical switch or shutter, is to generate a bubble of gas or vapor in the pathway of the optical signal, so that the bubble reflects the signal where the bubble intersects the core of the waveguide [e.g., see J. L. Jackel et al., U.S. Pat. No. 4,988,157 (1991); J. E. Fouquet et al., U.S. Pat. No. 5,699, 462 (1997); D. K. Donald, U.S. Pat. No. 5,978,527 (1999); J. E. Fouquet et al., U.S. Pat. No. 5,960,131 (1999); J. E. Fouquet et al., U.S. Pat. No. 6,055,344 (2000)]. A device of the invention can provide a similar effect with a different structure. For example, an optical device as depicted in FIG. 45A contains at least two fluids in its fluid channel, a liquid 4504 and a gas bubble 4506 (or another fluid with a refractive index less than that of the cladding). The gas bubble is always present, having been introduced during manufacturing and prior to sealing the optical device. The gas bubble is moved using any of the microfluidic methods discussed above to intersect core 4510 when the optical device is to switch or shutter the optical signal.

Further, a gas bubble can dissolve in one region and grow in another when a gas/liquid interface is moved, since liquids are permeable to gases. Consequently, in a channel having two bubbles of a gas, one bubble can dissolve into the liquid as it is pressurized by fluid movement, while gas evolves from the liquid into the second bubble to equalize the pressure between the two bubbles. The rate at which pressure is equalized is limited by the rate at which gas diffuses through the liquid and across the gas-liquid interfaces. Consequently, the first bubble can become pressurized and may compress despite transfer of some of the gas through the liquid by dissolution from the first bubble and evolution into the second bubble. Gas compression can delay movement of a liquid downstream of the gas (such as a liquid in the optical zone of the device), but once the downstream liquid moves, the liquid will continue moving until the motive force is removed and/or pressures in the bubbles equalize. This property may be used to provide a delayed spike in the force applied to the downstream fluid and reduce the actual transition time of the switching action, or to damp out unwanted after bounces.

Figure 46A:
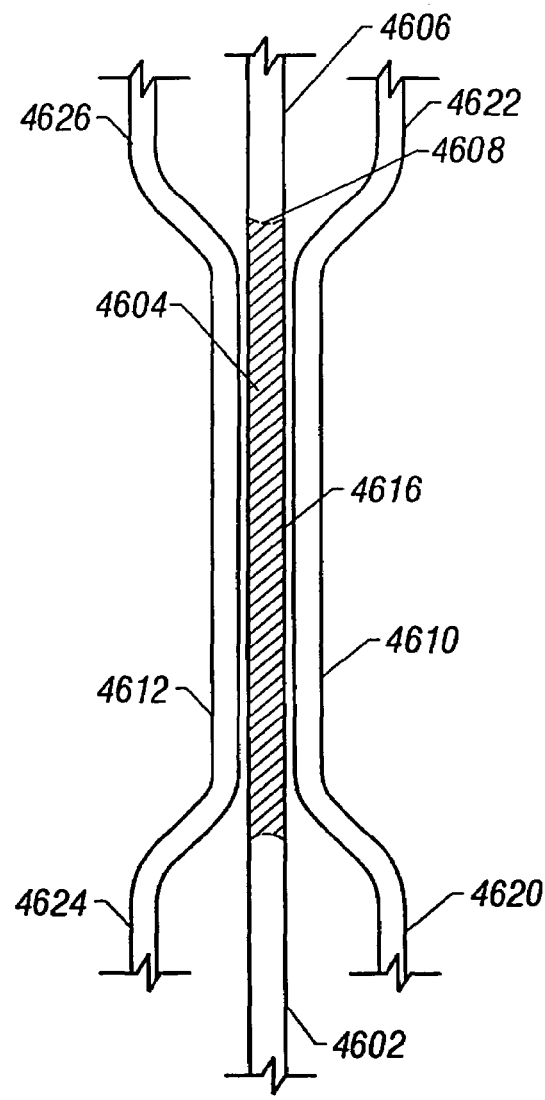
Figure 46B:
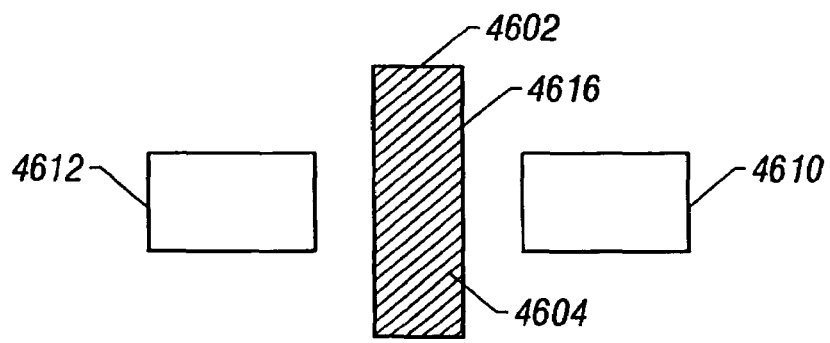

Another embodiment of the invention that provides a switching or shuttering function based on a directional optical coupler is illustrated in FIG. 46A. Fluid channel 4602 runs between arms 4610 and 4612 of the directional coupler, in horizontal proximity to both cores, and extends vertically across the region between the two cores, as depicted in the cross-sectional view of FIG. 46B. In the particular configuration depicted in FIG. 46A, first fluid 4604 positioned in the portion of the fluid channel 4602 between cores 4610 and 4612 has a refractive index lower than that of the cladding, so that an optical signal entering the coupler at point 4620 continues to propagate along arm 4610 to exit at point 4622. To switch the device, a second fluid 4606 of refractive index close to that of the cladding is moved into the portion of fluid channel 4602 between cores 4610 and 4612 by any of the microfluidic methods discussed above. The new fluid can be thought of as changing the optical condition at interface 4616 from one of total internal reflection to one of frustrated total internal reflection, whereby part of the optical field in arm 4610 extends to arm 4612. In this case the optical signal entering the coupler at point 4620 propagates to arm 4610, evanescently couples over to arm 4612 through the coupler gap, and exits the coupler at point 4626. The same configuration provides for a shuttering function at point 4626.

Figure 47:
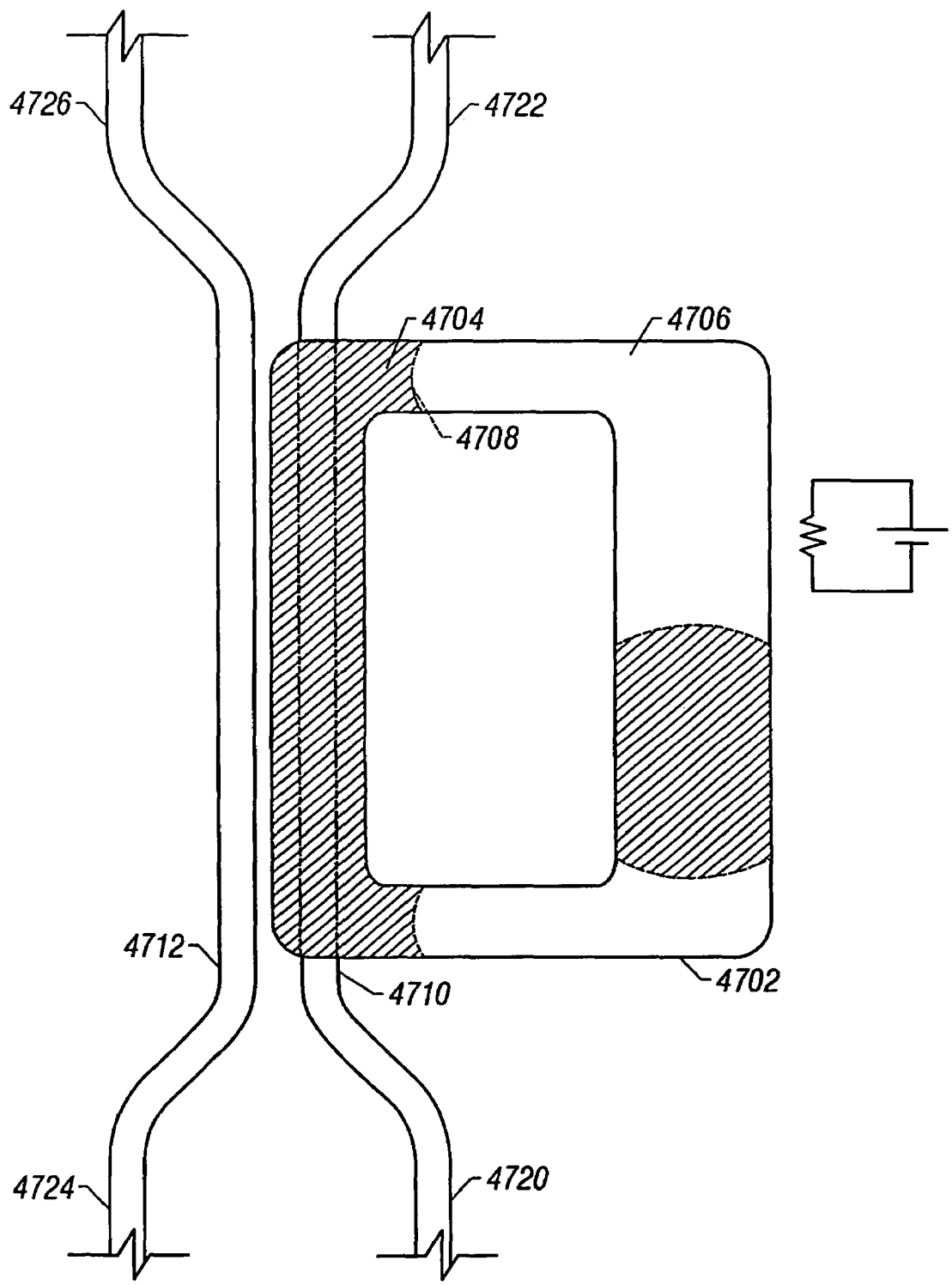

Another embodiment of the present invention that uses a directional coupler for switching, attenuation, or shuttering is illustrated in FIG. 47. Fluid channel 4702 is in proximity to core 4710, e.g., in a configuration as illustrated in FIG. 25-28, FIG. 29-31, or other similar configuration described herein. In the particular configuration depicted in FIG. 47, first fluid 4704 positioned in the portion of the fluid channel 4702 above the core 4710 has a refractive index equal to that of the cladding, so that an optical signal entering the delta-beta coupler at point 4720 couples over and exits the coupler at point 4726. To switch the device, a second fluid 4706 of suitable refractive index is moved into the portion of fluid channel 4702 above the core 4710 by any of the microfluidic methods discussed above. The new fluid changes the propagation constant of the underlying waveguide such that it is no longer strongly coupled to the adjacent arm 4712 of the coupler. In this case the optical signal entering the coupler at point 4720 is now switched to exit the coupler at point 4722. The same configuration provides for a shuttering function at point 4726.

A variation of this embodiment (not shown for clarity) involves a second fluid channel overlying core 4712. This second channel is configured to be symmetrical to channel 4702 in terms of its length and position relative to the core, and is permanently filled with a single fluid identical to 4704. Since this fluid has a refractive index equal to the cladding, it does not adversely affect the switching function of the device. The advantage with respect to the configuration illustrated in FIG. 47 is a greater balance between the two halves of the coupler. This may help in compensating for variations in the coupler properties due, e.g., to inaccuracies in the manufacturing process. It may also help in compensating for variations in the fluid optical properties due to fluctuations in temperature or other environmental parameters.

The fluid channel 4702 may instead contain a number of fluids of different refractive index, enabling the coupler to split the optical signal entering the coupler at point 4720 to distribute it between points 4722 and 4726. The intensity of the portion of the optical signal exiting at point 4726 varies depending upon the refractive index of the slug of fluid occupying the portion of the fluid channel above the core. Thus, the intensity of the optical signal exiting at point 4726 (and complementary to point 4722) can be varied between 0% and 100% by placing slugs of fluids of the appropriate refractive indices in the fluid channel, providing a programmable optical attenuator and/or shutter. Alternatively, interface 4708 between fluids 4704 and 4706 may be programmably positioned at any point in the portion of channel 4702 over core 4710. In this case, the intensity of the portion of the optical signal exiting at point 4726 can be varied between 0% and 100% depending upon the position of interface 4708, such intensity increasing as cladding-index fluid 4704 overlays a greater portion of core 4710.

In another configuration of the embodiment of FIG. 47 based on damped resonant coupling, core arm 4710 is made intentionally narrower than the other core arm 4712, and fluid 4706 has an index greater than the core index or has an index greater than the cladding index and a high rate of absorption. When the cladding-index fluid 4704 overlays arm 4710, the arms are out of resonance and light entering from input 4724 is transmitted through the coupler without coupling and exits at point 4726. As 4706 displaces 4704, the modal index of arm 4710 increases, the coupler comes into resonance, and light input into 4724 couples into arm 4710. Since the cladding 4706 is lossy due to radiation and/or absorption, the resonance is damped and the device strongly attenuates both modes, with an attenuated optical signal exiting from point 4722. This provides a function for programmable attenuation and shuttering.

Figure 48:
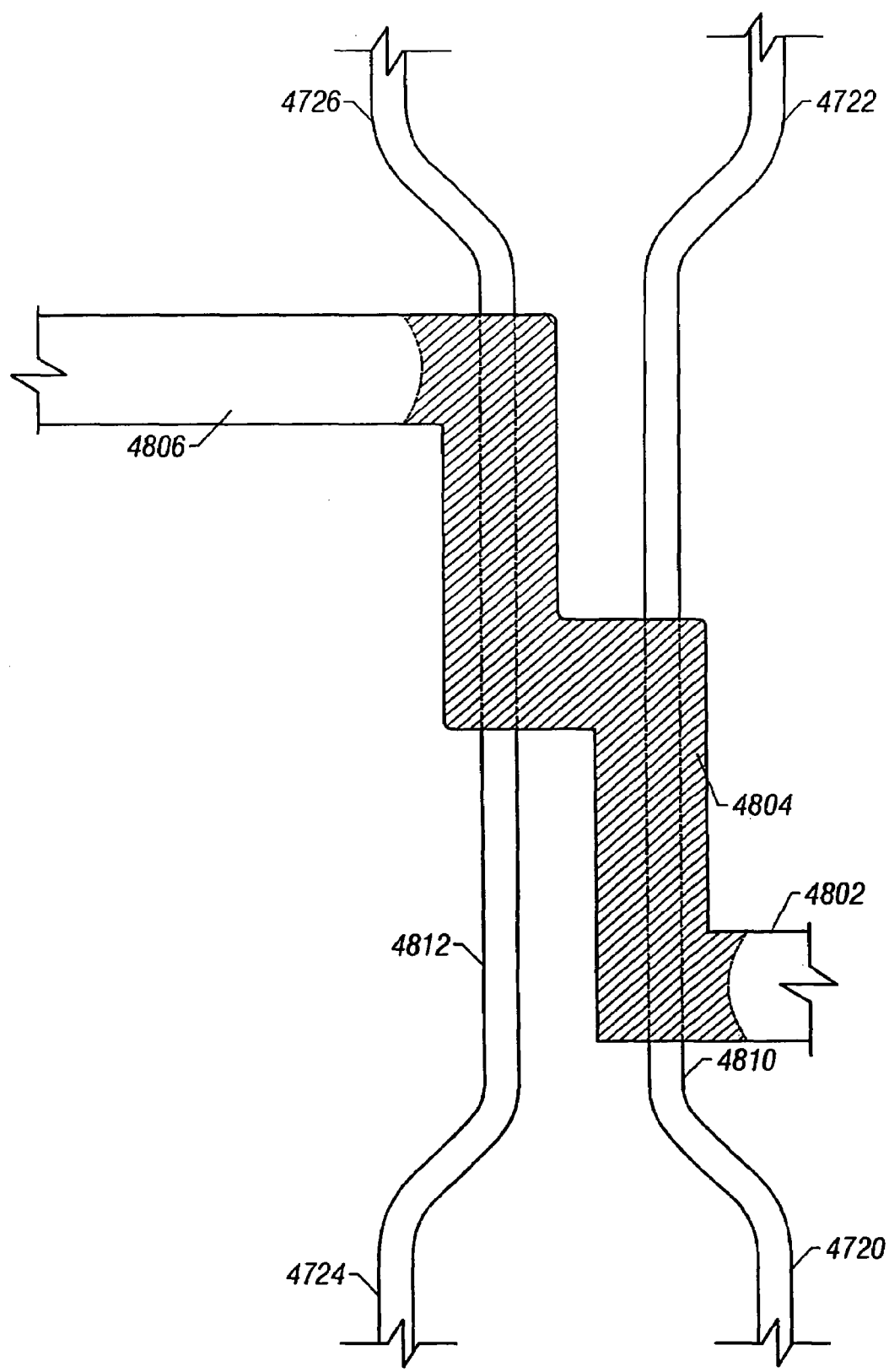

Another embodiment of the invention utilizing a directional optical coupler for switching is illustrated in FIG. 48. Fluid channel 4802 is in proximity to cores 4810 and 4812, e.g., in a configuration as illustrated in FIG. 25-28, FIG. 29-31, or other similar configuration described herein. In the particular configuration illustrated in FIG. 48, channel 4802 overlies a section of core 4810 and a section of core 4812 in the coupler region of the device. A first fluid 4804 positioned in the portion of the fluid channel 4802 above the cores 4810 and 4812 has a refractive index equal to that of the cladding, so that an optical signal entering the coupler at point 4720 couples over and exits the coupler at point 4726. To switch the device, a second fluid 4806 of suitable refractive index is moved into the portion of fluid channel 4802 above the cores 4810 and 4812 by any of the microfluidic actuation forces and devices discussed herein. The new fluid changes the propagation constant of the underlying waveguides such that the two arms 4810 and 4812 are no longer strongly coupled. In this case the optical signal entering the coupler at point 4720 is now switched to exit the coupler at point 4722. The same configuration provides for a shuttering function at point 4726 if the devices is configured not to transport the optical signal exiting at point 4722 to other equipment that processes or detects the optical signal. The advantage with respect to the configuration in FIG. 47 is that the modification of propagation constant in the coupler is split evenly between the two halves of the coupler, which may make the device less susceptible to fluctuations either in manufacturing process or in environmental conditions, such as temperature.

Figure 49:
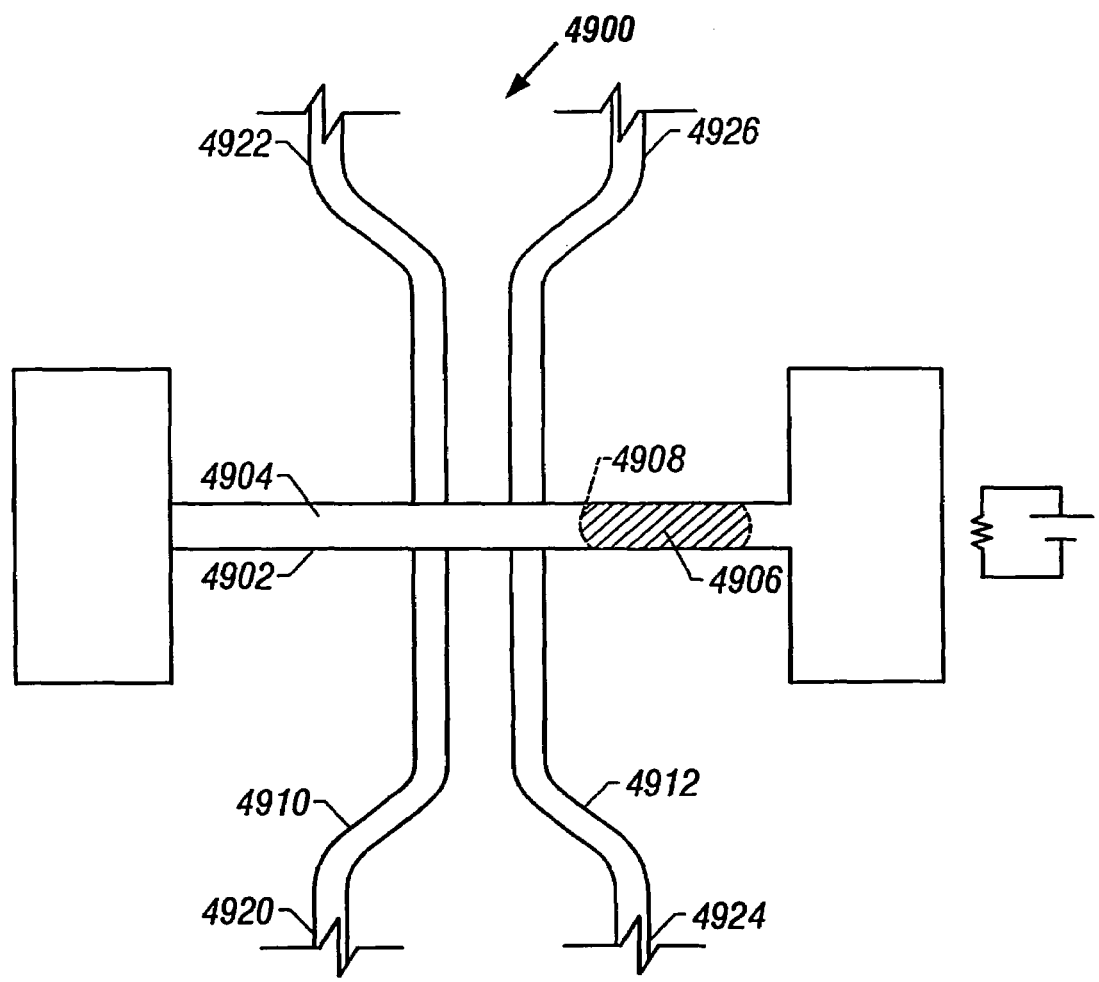

Another embodiment of the present invention utilizing a coupler is depicted in FIG. 49. A directional coupler 4900 typically several millimeters long is bisected by a fluid channel 4902 typically about 20 μm wide; each of the crossings may be configured, e.g., as illustrated in FIG. 16, with the channel completely intersecting each core. The channel contains two fluids 4904 and 4906 having a small, but well defined, index difference, both being near the modal index of the waveguides in the device. If the major fluid 4904 is in the channel region intersecting both arms 4910 and 4912 of the coupler, then there is no effect on the optical coupling between the arms. An optical signal injected into 4920 travels in arm 4910 to the coupling region and begins coupling into arm 4912. At the center of the coupler, where the channel intersects the waveguides, approximately 50% of the optical signal is concentrated in each arm of the coupler, and the phase of the portion in arm 4910 leads the phase of the portion in 4912 by ¼ of an optical wavelength. Both signals cross the channel in fluid 4904 and reach the other side of the channel with essentially the same relationships. Coupling continues as the optical signal propagates and finally most of the signal is concentrated in arm 4912 and exits at 4926 with very little leakage into 4922. To switch the device, fluid 4906 is moved to intersect arm 4912 but not arm 4910, so that the interface 4908 between fluids 4904 and 4906 comes to lie between arms 4910 and 4912. If the index of 4906 is just the right amount less than the index of 4904, such that the optical path across the trench in 4906 is half an optical wave less than in 4904, the ¼-wave lead of the phase of the portion of the optical signal in 4910 abruptly becomes a ¼-wave lag on crossing the trench. This is the mirror image of the former condition, and by symmetry the coupling reverses as propagation along the coupler continues, with the light being switched into 4922. For a 20-μm wide trench, and optical wavelengths in the vicinity of 1.5 μm, the fundamental index difference between 4904 and 4906 would preferably be 0.0375. To aid in controllably stopping interface 4908 between the two arms 4910 and 4912 during actuation, elements for modulation of fluid flow (e.g., indentations or surface treatments) as described herein may be employed. This embodiment has the desirable property that variations in the refractive index of fluid 4904 due to temperature fluctuations will generally be accompanied by similar variations in the refractive index of fluid 4906, since the two fluids have a small index difference and can be chosen to have a similar temperature dependence of the refractive index. The device can therefore be optimized for a thermal operation.

In a variation of this embodiment of the invention, the fluid channel 4902 may be configured to have different widths where it intersects the cores 4910 and 4912. The coupler 4900 is designed to compensate for this optical path length difference so that, when fluid 4904 fills the channel at both intersections, an optical signal entering at point 4920 is coupled over to exit at point 4926. Actuation of the device proceeds by displacing fluid 4904 with fluid 4906 through both intersections of the fluid channel with the waveguide cores, so that the optical signal in both arms of the coupler 4910 and 4912 propagates across the channel in fluid 4906. The different refractive index of fluid 4906 compared to fluid 4904 results in an altered optical path length difference across the channel; the fluid indices and the channel intersection widths are chosen to make this change in optical path length difference equal to half an optical wave. For example, for a refractive index difference of 0.5 (typical of gas-liquid pairs), the difference in channel widths would preferably be in the vicinity of the optical wavelengths used (typically around 1.5 μm). The advantage with respect to the uniform-width configuration described above is that the fluid-fluid interface 4908 need not be stopped precisely between cores 4910 and 4912. Instead, the device is actuated so the same fluid is between both cores. In addition, this configuration allows for a much greater difference in refractive index between the two fluids.

Figure 50:
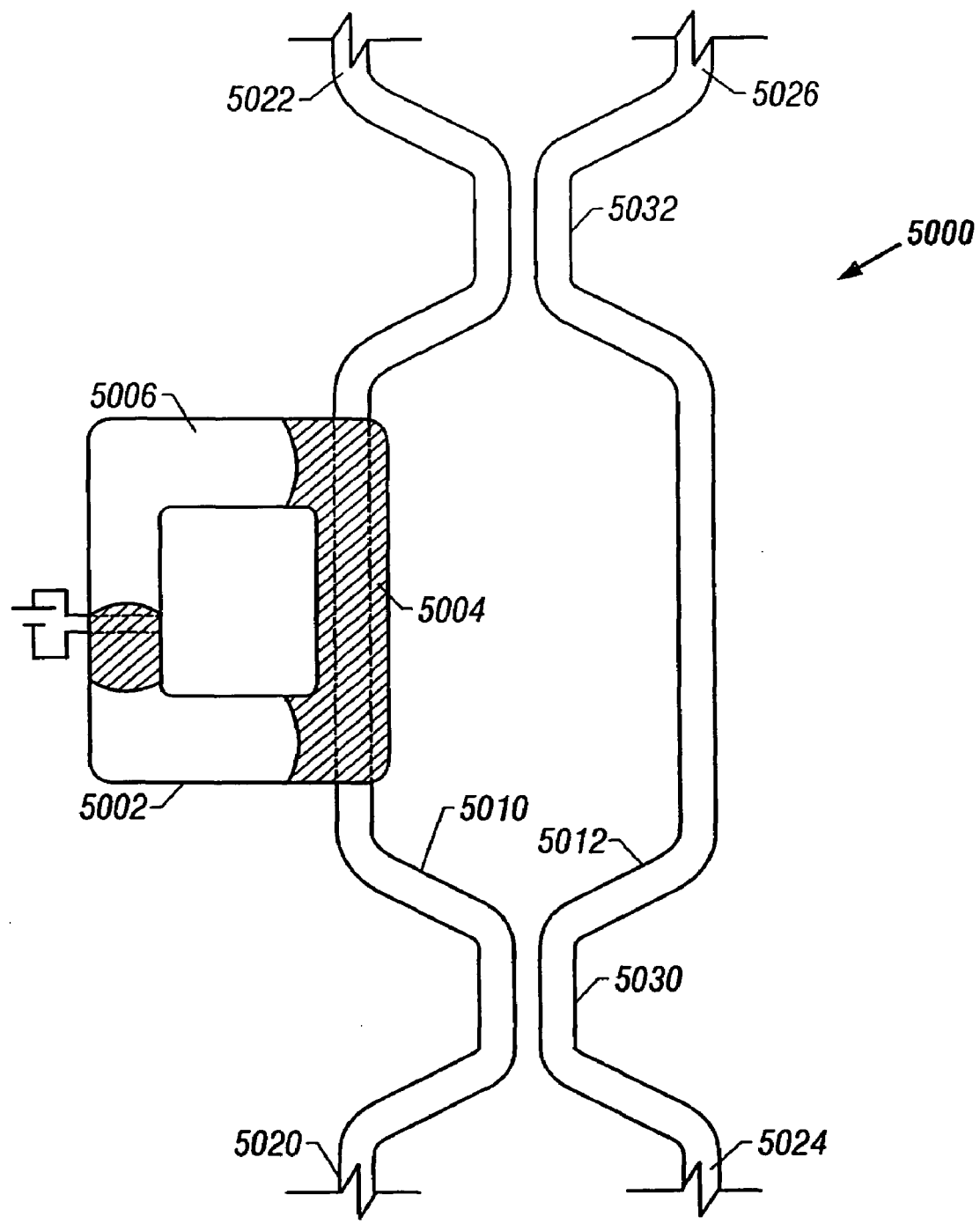

Other embodiments of the present invention utilize an integrated interferometer such as a Mach-Zehnder interferometer (MZI). FIG. 50 depicts one such interferometer 5000, in which channel 5002 runs in proximity of the core of interferometer arm 5010 for some length. In this particular configuration, a slug of fluid 5004 of the appropriate refractive index is positioned in the portion of the channel 5002 above the core of arm 5010, so that an optical signal entering the MZI at point 5020 is split at coupler 5030 and propagates through arms 5010 and 5012 to interfere at coupler 5032 and exit at point 5026. To operate the device, the slug of fluid 5004 is moved using one of the above-discussed forces to replace it with a slug of fluid 5006 having a refractive index which introduces a delay into the portion of the optical signal travelling through arm 5010 of the interferometer. As the optical path in arm 5010 becomes unbalanced from the optical path in arm 5012 through the advancement of fluid 5006, the portion of light coupled to output 5026 is decreased and the complementary portion is coupled to output 5022. This versatile optical device may thus be configured as a switch, a programmable attenuator, a modulator, or a shutter. In a variation of this embodiment, if the arms are purposely made with optical path lengths that are different by many (e.g., more than 20) wavelengths, the division of power between the two output arms will be dispersive (i.e., wavelength-dependent), and programmable filters may be realized.

Figure 51:
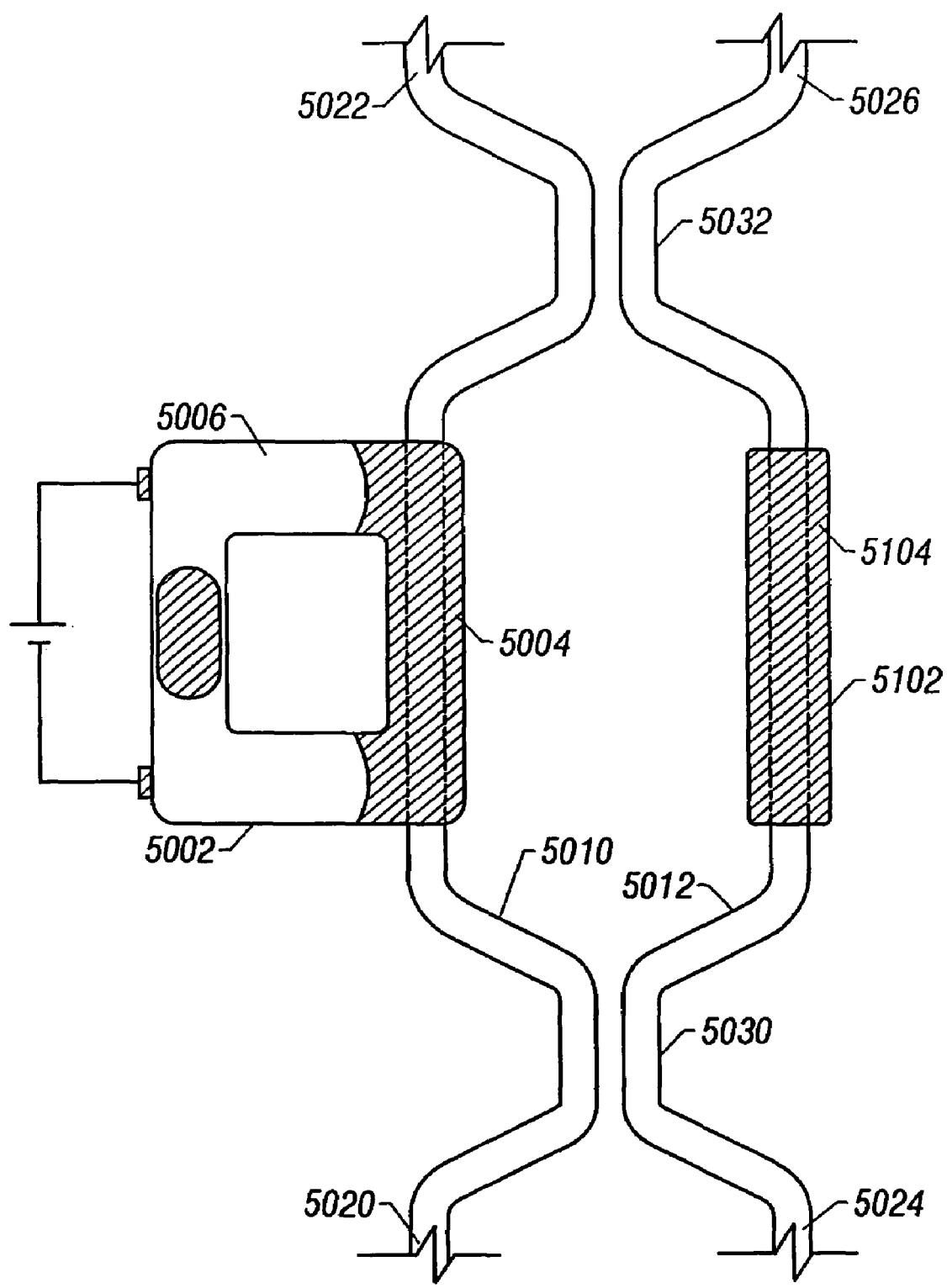

In another variation of this embodiment, illustrated in FIG. 51, a second channel 5102 overlays arm 5012 of the MZI and is permanently filled with a single fluid 5104 identical to fluid 5004. With a properly chosen refractive index for fluids 5004 and 5104, the operation of the device proceeds in an analogous manner to that described above in reference to FIG. 50; the advantage of the second fluid-filled channel is to provide a greater balance between the two MZI arms 5010 and 5012 against manufacturing inaccuracies or environmental variations (e.g., in temperature).

Figure 52:
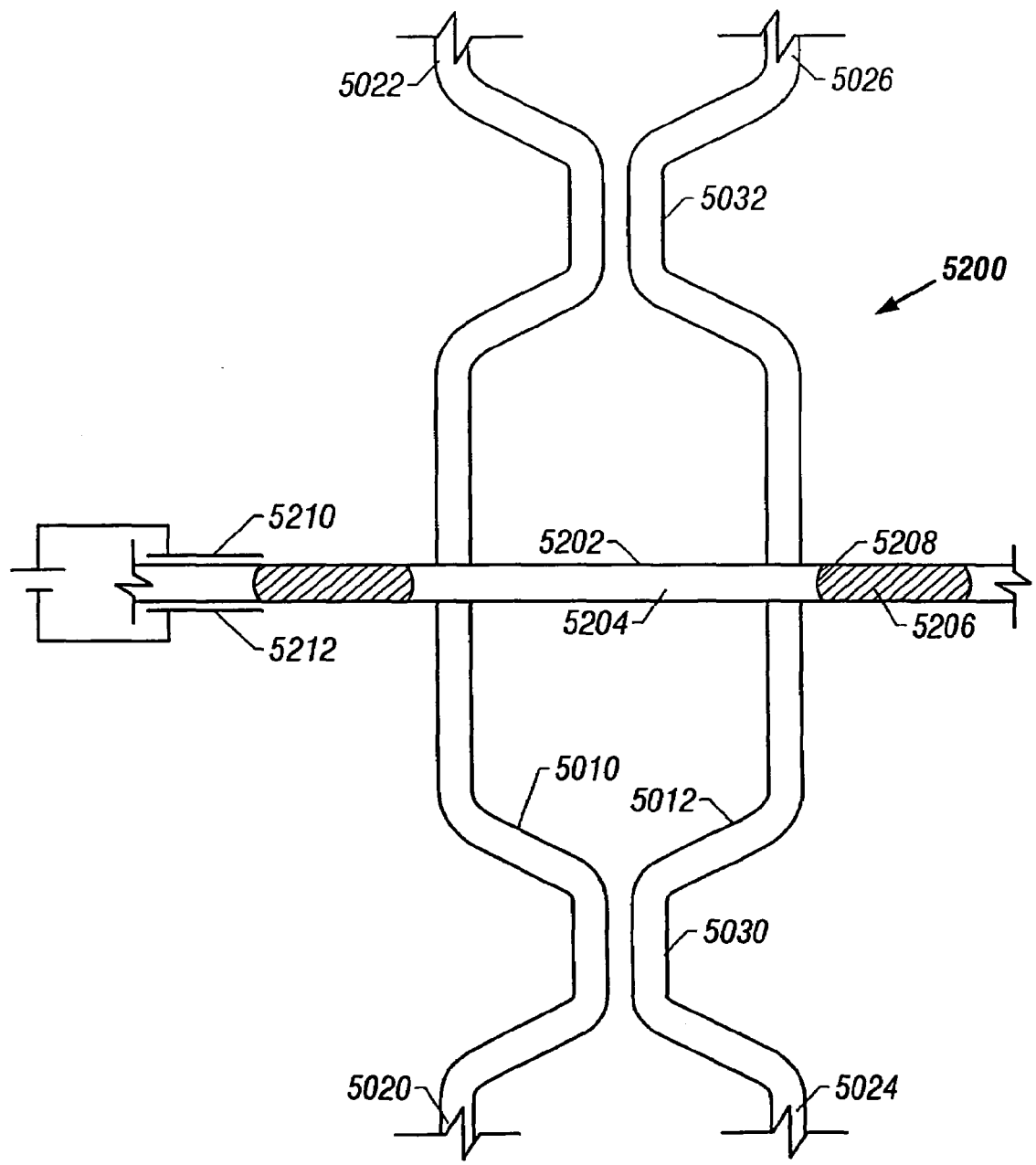

Another embodiment of the invention using a MZI is illustrated in FIG. 52. In this configuration, fluid channel 5202 (typically about 20 μm wide) bisects interferometer 5200 by intersecting the cores 5010 and 5012; each of the crossings may be configured, e.g., as illustrated in FIG. 16, with the channel completely intersecting each core. The channel contains two fluids 5204 and 5206 having a small, but well defined, index difference, both being near the modal index of the waveguides in the device. This configuration is very closely related to that of the coupler-based switch illustrated in FIG. 49, and actuation of the switch proceeds in an entirely analogous manner. That is, the fluid interface positioned within electrodes 5210 and 5212 is moved (to the left in FIG. 52) in order to move fluid 5206 toward arm 5012 of the MZI. Another pair of electrodes (not shown) acts upon a second interface in order to move fluid 5206 in the opposite direction, away from arm 5012 of the MZI. Desirable properties of the coupler-based configuration, such as the ability to optimize the device for a thermal operation, are likewise present in the MZI-based device shown in FIG. 52. The main difference in the interferometer-based switch in FIG. 52 is that the coupling activity is spatially separated into two distinct parts (couplers 5030 and 5032). This allows for a greater separation between the waveguides in the region where the channel intersects the waveguide cores 5010 and 5012, which relaxes some constraints for controlling the position of interface 5208 between fluids 5204 and 5206. Similarly, a fluid channel that intersects the two arms 5010 and 5012 with different widths, as described above, may also be employed here.

Figure 53:
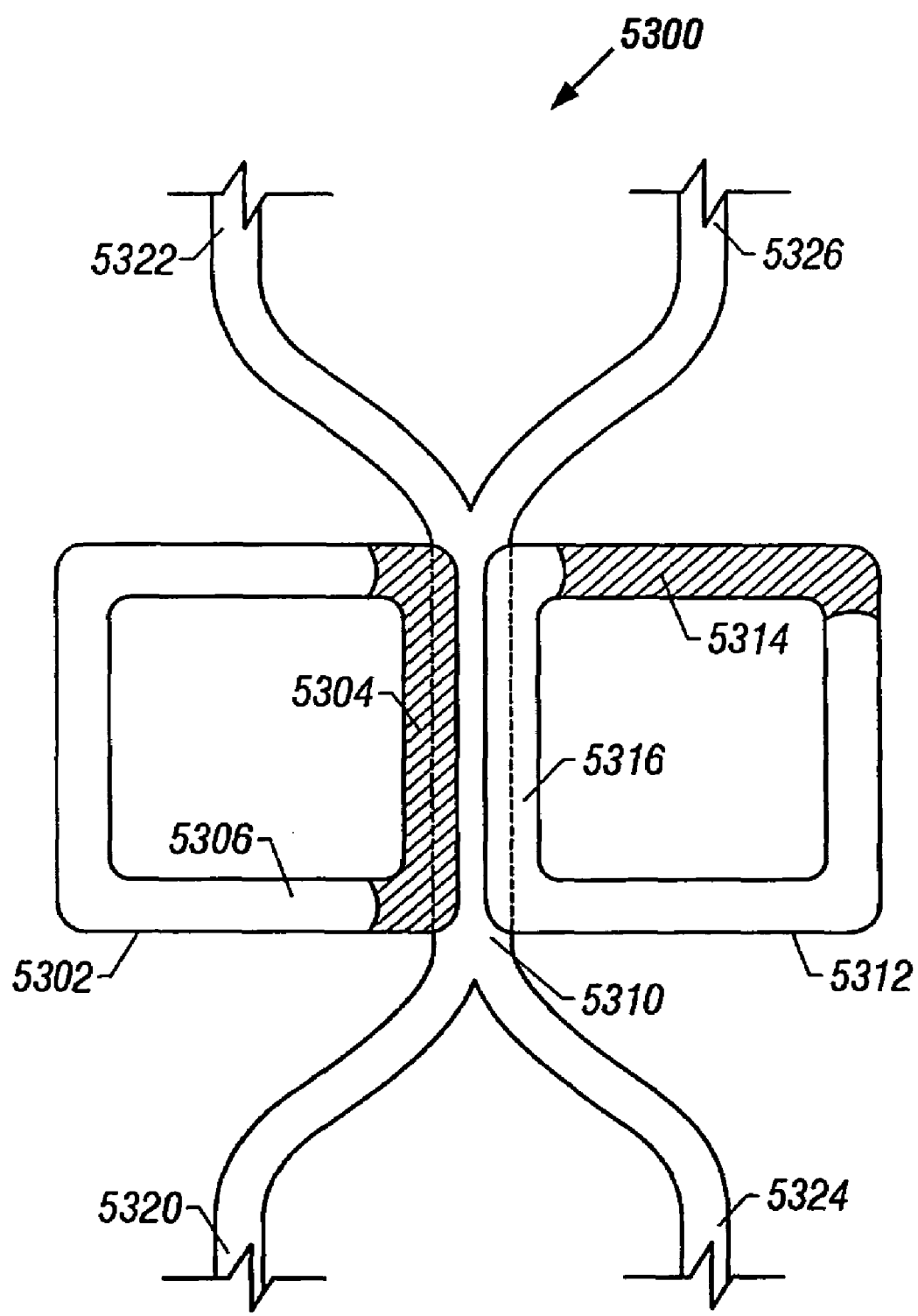

As illustrated in FIG. 53, an optical device of the invention may be incorporated into a multimode interference (MMI) filter 5300 for tuning the filter, e.g., to adjust the center wavelength in the sampled spectrum or to switch a desired bandwidth of light. The tuning may be used to overcome manufacturing inaccuracies or to allow the switch to better operate over a wider range of wavelengths. MMI filter 5300 has two channels 5302 and 5312 over the multimode section 5310 of the filter. The channels each contain at least two fluids: 5304 and 5306 in channel 5302, and 5314 and 5316 in channel 5312. The fluid pairs in each channel have a difference in refractive index, so that moving one fluid or the other in the portion of the channels in proximity to the multimode section 5310 alters the effective index of the multimode region, adjusting the operation of the filter. The refractive indices of each fluid in the channel, as well as the device configuration, may be selected to obtain, upon actuation of the device, shifts in the center wavelength of the sampled spectrum or switching of an optical signal within a given bandwidth. For example, the device may be configured with fluids 5304 and 5314 overlying the multimode section 5310, such that a given spectrum of light entering the device at point 5320 is sampled as it goes through the filter and exits from points 5326 and 5322. When the device is actuated (by displacing fluid 5304 with 5306, or fluid 5314 with 5316, or both), the center wavelength of the filter is shifted, resulting in a different sampling of the spectrum of the light exiting from points 5326 and 5322.

Figure 54:
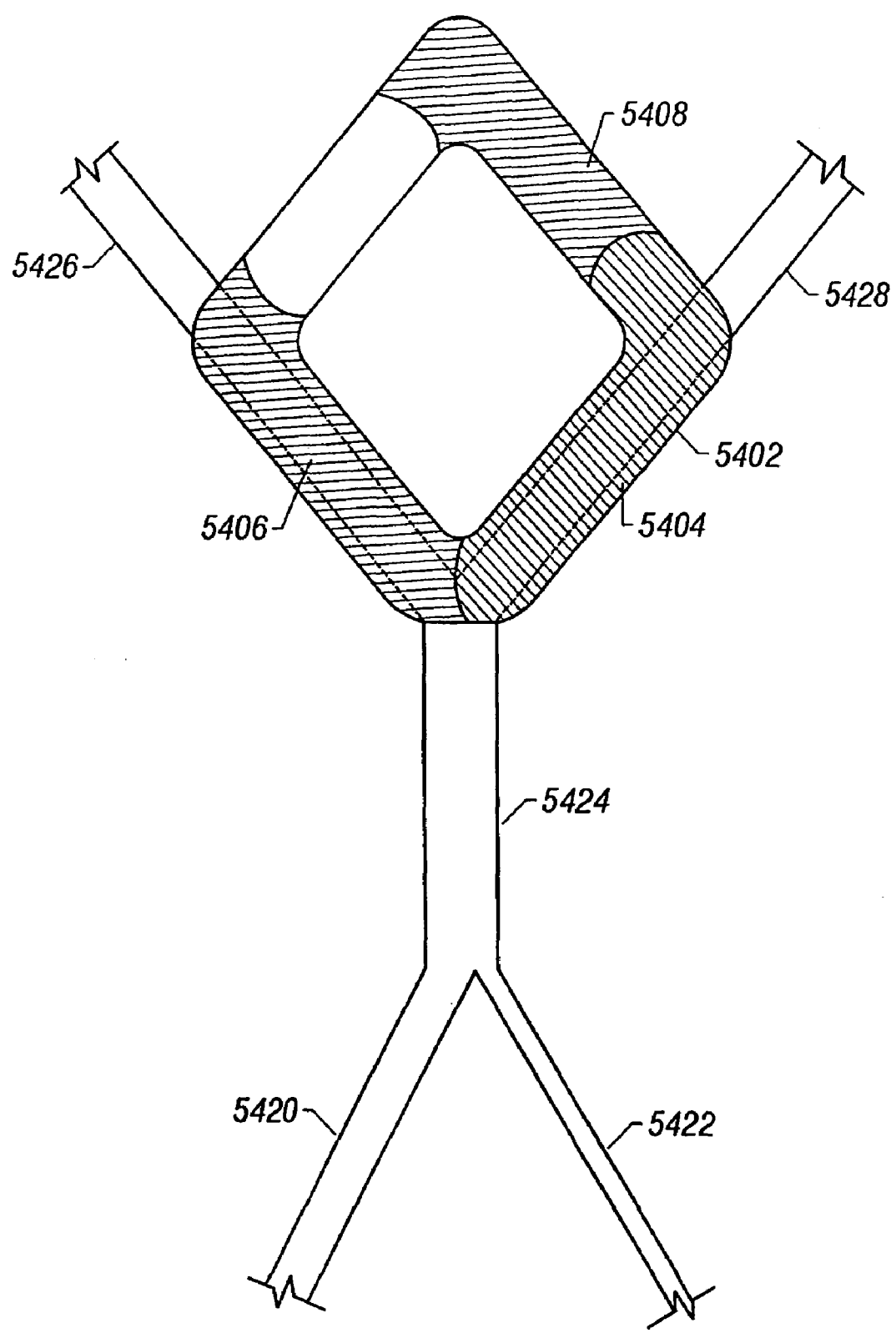
Figure 55:
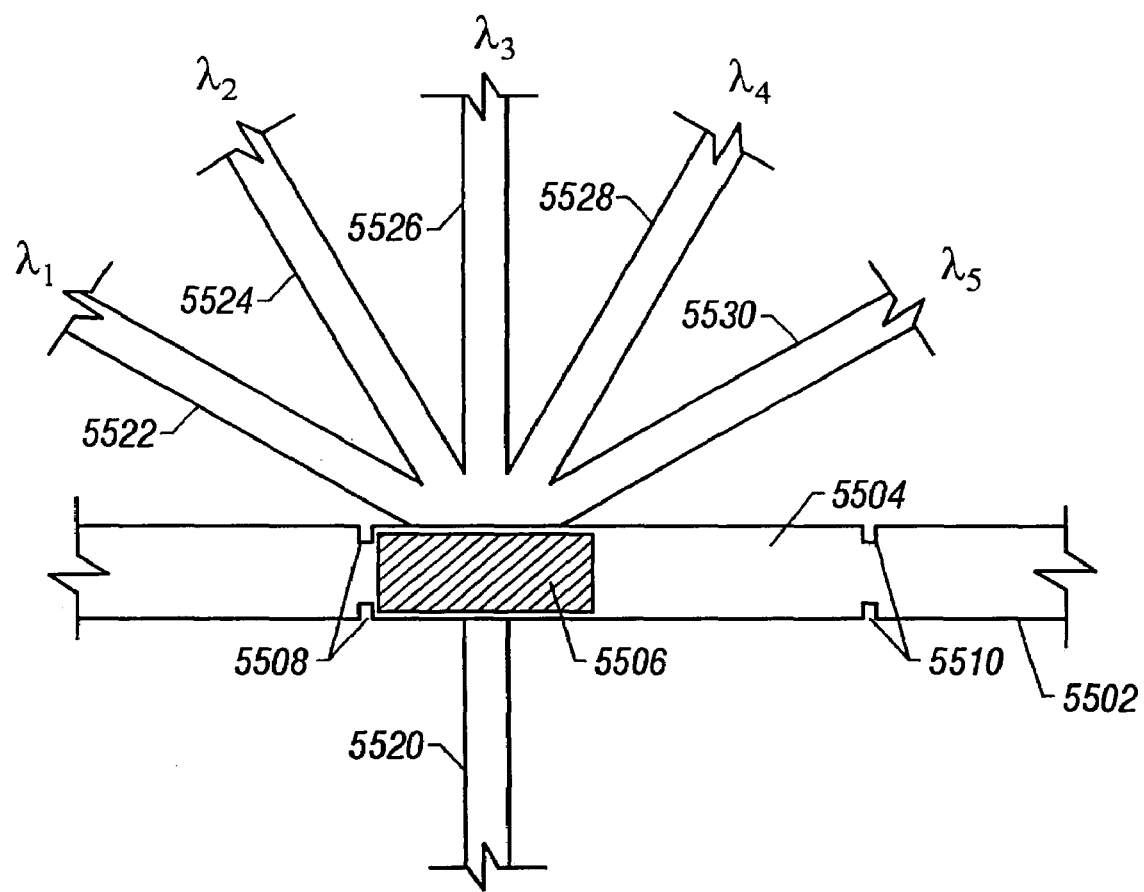

Another embodiment of the present invention utilizes modal evolution and is depicted in FIG. 54. Two waveguides 5420 and 5422 of unequal widths converge on the two-mode section of waveguide 5424, which branches into two equal-width waveguides 5426 and 5428. A microfluidic channel 5402 overlays the two outputs, e.g., as illustrated in FIG. 25-28, or 29-31, or other similar configuration as discussed herein. A bubble or slug of low-index fluid 5404 (e.g., a vapor) can be positioned over either of the output waveguides 5426 and 5428, while cladding-index fluid 5406 or 5408 can be positioned over the other output, by means of any of the microfluidic forces and devices described above. The channel 5402 may further be textured or patterned as described earlier to make the bubble locally stable over each of the output waveguides. When properly designed for adiabatic transitions, light entering on the wider channel 5420 preferentially launches into the lower-order mode of the middle section 5424 of the device. Correspondingly, light entering on the narrower input 5422 preferentially launches into the next higher mode of the middle section. With a low-index bubble 5404 over one output arm and a cladding-index fluid 5406 over the other, light in the lower-order mode of the middle section preferentially exits the arm 5426 without the overlying bubble, while light from the higher-order mode preferentially exits through the arm 5428 with the overlying bubble. Consequently, the optical signal entering the device from the narrower input will be directed out whichever arm has the bubble aligned to it and the optical signal entering the from the wider input will be directed out the arm that does not have the bubble aligned to it. This provides a simple optical switching function. Note that in the limit where the narrower arm 5422 goes to zero width, the remaining input arm 5420 may simply taper into the center region 5424, and the waveguide configuration becomes the classic adiabatic Y-branch switch.

Another device of the invention can be configured to diffract an optical signal into its multiple wavelengths, thus demultiplexing the optical signal (or multiplexing a number of optical channels to form the optical signal if operated in reverse). In the example illustrated in FIG. 55, a microfluidic channel 5502 completely intersects a waveguide core 5520, e.g., as pictured in FIG. 16. A diffraction element 5506 (such as, e.g., a holographic grating patterned in photoresist or other polymer; or a polymer-dispersed liquid crystal) is suspended in a fluid 5504, and the diffraction element is moved into position at the intersection with the core 5520 by viscous drag of the fluid 5504 surrounding it, or by interface tension if it is placed between two fluids. The fluids may be displaced using any of the microfluidic methods discussed above. An optical signal entering the waveguide 5520 encounters the diffraction element 5506 and is diffracted into its individual wavelengths $\lambda_1, \lambda_2, \lambda_3, \lambda_4, \lambda_5, \ldots$, which exit the device from waveguides 5522, 5524, 5526, 5528, 5530, . . . The microfluidic channel 5502 may be additionally structured with indentations 5508, 5510 to provide hard stops for the solid diffracting element. In this case, the diffraction element is introduced in the proper section of the microchannel during assembly of the device.

Method of Making Optical Devices of the Invention

Generally, devices of the invention can be fabricated using available semiconductor and/or glass processing techniques. The fabrication process chosen to construct a specific device of the invention depends in part on the nature of the optical device, the type of the motive force used, the properties of the fluids, the configuration of the channels with respect to the waveguides, and the configuration of the electrodes in relationship to both the channels and the waveguides. In what follows, some exemplary embodiments of fabrication processes ate outlined, while others are readily apparent to those skilled in the art from the disclosure herein. While a single core, electrode, and injection port are illustrated in the accompanying figures for the sake of clarity, a device of the invention may include multiple such cores, electrodes, and/or injection ports, as required by the function and design of the device. In addition, while the methods below describe fabrication fluid flow channels, waveguides, and optical devices using, e.g., a silicon substrate and glass cover, other materials may readily be substituted by those skilled in the art. For example, either or both of the substrate and the cover may consist of silicon, silica, Pyrex or other glass, polymer (such as, e.g., polycarbonate, polyimide, benzocyclobutene, or polyacrylate), or a combination thereof.

Preferably, the microfluidic devices, waveguide devices, and optical devices described herein are configured to have microchannels in which at least a portion of one of the fluids resides. Microchannels, as discussed previously, are channels having a size such that fluid motion is dominated by interfacial forces and not by gravity. The incorporation of microchannels provides small optical devices and other planar lightwave circuits as are found in optical telecommunications systems today.

FIG. 56 illustrates a cross-section of an optical device as it is being fabricated. In this example, a fluid channel is patterned over a waveguide, and one electrode on the substrate makes contact with the fluid in a reservoir. As illustrated in FIG. 56(*a*), a waveguide is patterned on a standard silicon wafer 5602 (as used in semiconductor manufacturing) by thermally growing bottom cladding $SiO_2$ layer 5604 and forming doped $SiO_2$ core 5606 within doped $SiO_2$ top cladding 5608 using, e.g., low-pressure chemical vapor deposition (LPCVD) or plasma-enhanced chemical vapor deposition (PECVD) and reactive ion etching (RIE). A 2-μm thick layer of amorphous silicon (α-Si) 5620 is deposited onto the wafer (e.g., using PECVD) and patterned (e.g., using a photoresist mask and RIE), as illustrated in FIG. 56(*b*). This provides a hard mask used to etch top cladding 5608 to a depth of approximately 15 μm from the surface of the cladding, resulting in the (communicating) structures 5622 and 5624 illustrated in FIG. 56(*c*). The distance between core 5606 and the outer surface of the residual oxide layer 5608 in 5624 is sufficiently small that a portion of the optical signal that the device is designed to carry extends into the open space 5624 above the core. This open space will eventually be filled with a fluid, as described below. A thin conductive layer (e.g., 0.5 μm of tungsten or indium tin oxide, ITO) or a thin resistive layer (e.g., 0.2 μm of tungsten, titanium, or tantalum, optionally anodized to vary its resistance) is deposited (e.g., by sputtering) and etched to form electrode 5630 in reservoir 5622 not overlying the core, as illustrated in FIG. 56(*d*). This conductive or resistive layer is optionally passivated with a thin layer of oxide (e.g., $SiO_2$). The structure in FIG. 56(*d*) is then typically diced into individual units, or chips. To complete the fluid channel, a Pyrex or silica cover glass 5660 approximately 0.5-1 mm thick is first patterned with injection port 5662 (formed by, e.g., drilling, etching, or ablation), as illustrated in FIG. 56(*e*). A bonding layer 5680 (consisting, e.g., of an epoxy, polystyrene, polyimide, or other polymer, a low-temperature melting glass, frit, or sealing glass, a spin-on silicate glass, or other similarly suitable material) is then deposited on the cover glass, e.g., by sputtering, PECVD, or spin coating. As illustrated in FIG. 56(*f*), this cover glass is then assembled with and bonded to cladding 5608 (e.g., by application of heat, light, and/or pressure over some period of time), and electrical connection 5632 is made to the exposed portion of electrode 5630 by wire bonding. Liquid 5640 is finally inserted into the fluid channels 5622 and 5624 through injection port 5662, after which the injection port is sealed with epoxy, polymer, or other suitable material 5664.

The method described above allows a continuous or discontinuous microchannel to be formed on the same substrate in which the waveguide is formed. A second substrate may then be glued or fused to the microchannel-containing substrate to seal the microchannel without having to accurately align features on the second substrate to the first substrate. The second substrate may thus have a flat face that adheres to a flat face on the microchannel-containing substrate, which provides strong bonding and good microchannel sealing.

Figure 56A:
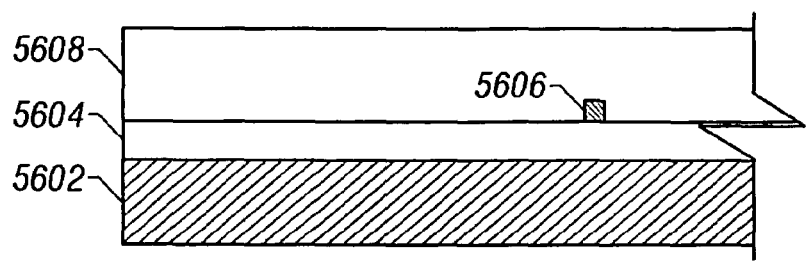
FIG. 56-59 illustrate manufacturing details for making devices as described herein.
Figure 56B:
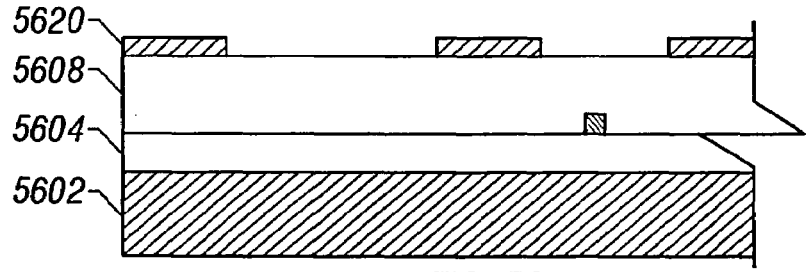
Figure 56C:
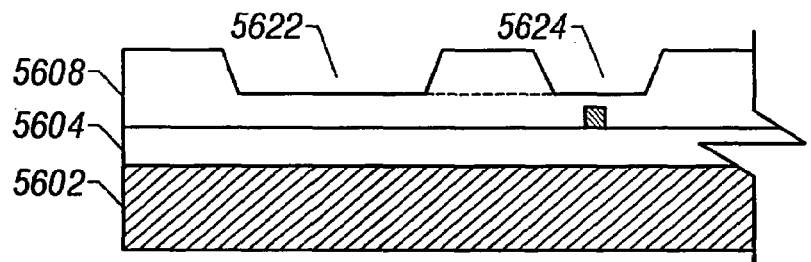
Figure 56D:
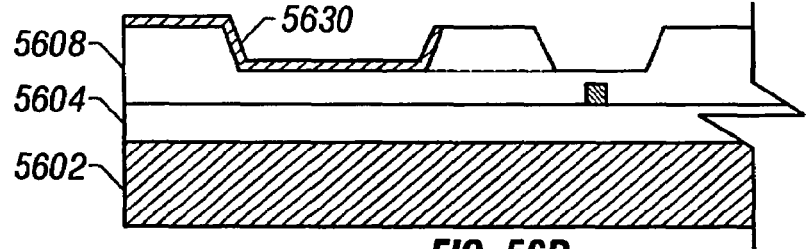
Figure 56E:
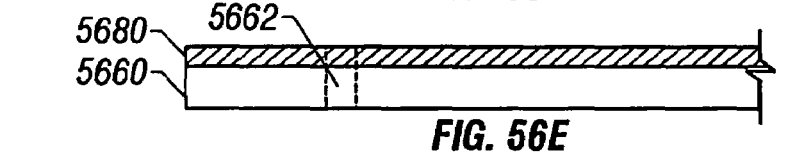
Figure 56F:
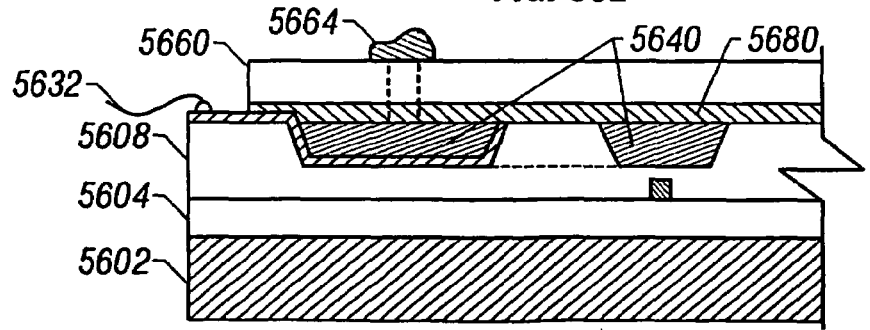
Figure 57A:
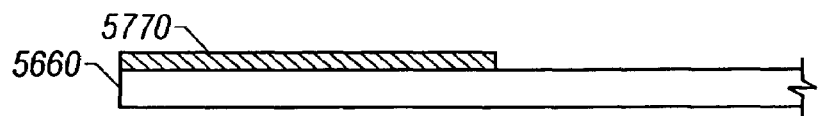
Figure 57B:
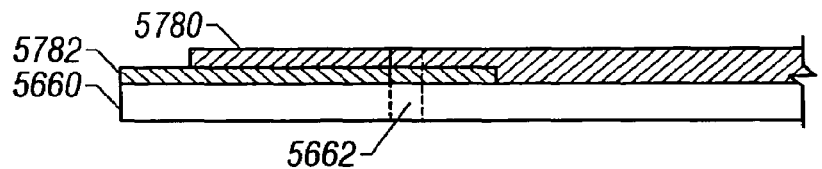
Figure 57C:
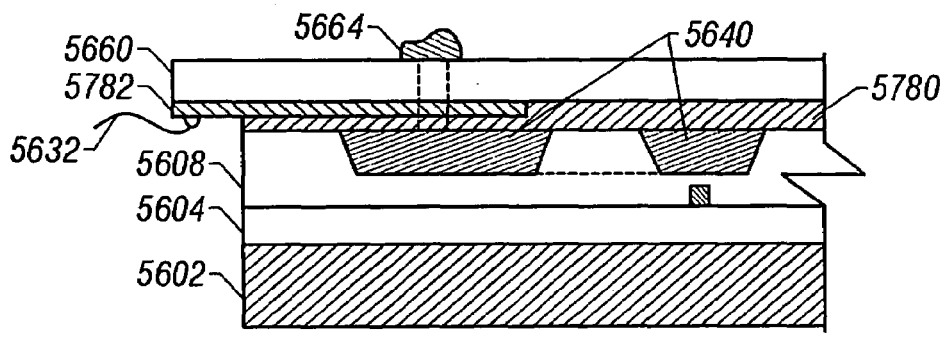

One alternate method of forming a device of the invention is shown in FIG. 57. In this example, a fluid channel is patterned over a waveguide as in FIG. 56(*a-c*), and one electrode on the cover glass makes indirect contact with the fluid in a reservoir. As illustrated in FIG. 57(*a*), a thin conductive layer (e.g., 0.5 μm of tungsten or indium tin oxide, ITO) or a thin resistive layer (e.g., 0.2 μm of tungsten, titanium, or tantalum, optionally anodized to vary its resistance) is deposited (e.g., by sputtering) on a Pyrex or silica cover glass 5660 and etched to form electrode 5770. This conductive or resistive layer is optionally passivated with a thin layer of oxide (e.g., $SiO_2$). FIG. 57(*b*) depicts the injection port 5662 formed in the cover glass, e.g., by drilling; where such port coincides with a metal region, the port extends through the metal layer. A thin bonding layer 5780 is deposited, e.g., by spin coating, and bond pads 5782 are cleared to allow for wire bonding. FIG. 57(*c*) illustrates the resulting cover glass structure being bonded to the waveguide and channel structure shown in FIG. 56(*c*). Wire bonding 5632 to the electrode, fluid injection, and injection port sealing follow as described above. This configuration of the conductive or resistive electrode in relationship to the fluid enables using the silicon substrate as a second electrode (ground plane) for devices where a parallel-plate electrode structure is appropriate.

Figure 58A:
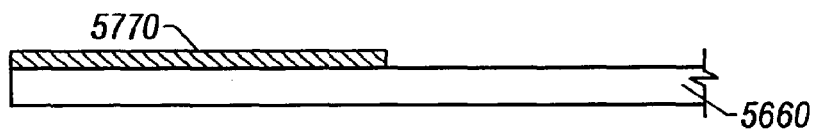
Figure 58B:
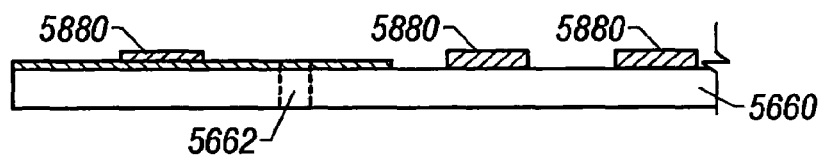
Figure 58C:
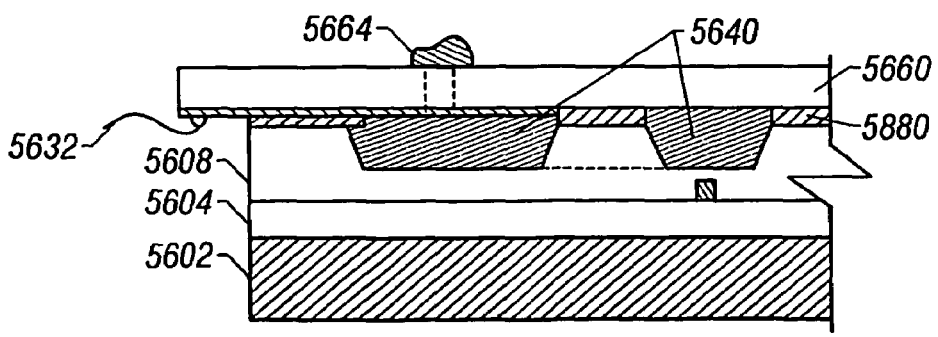
Figure 59A:
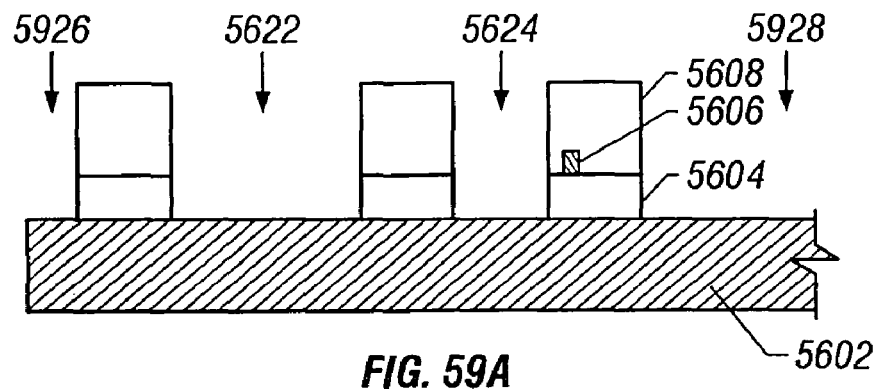
Figure 59B:
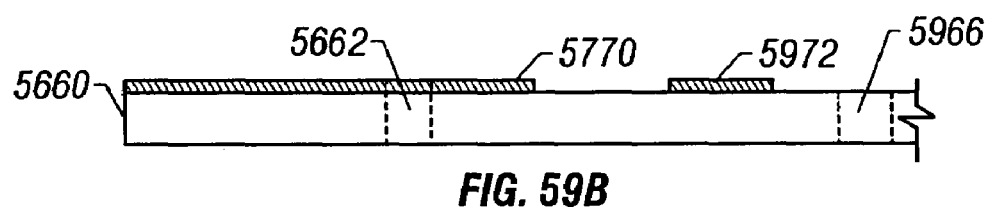
Figure 59C:
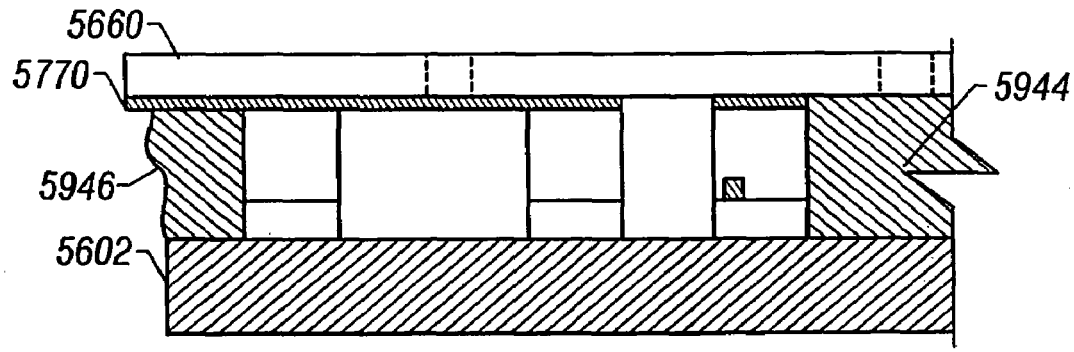
Figure 59D:
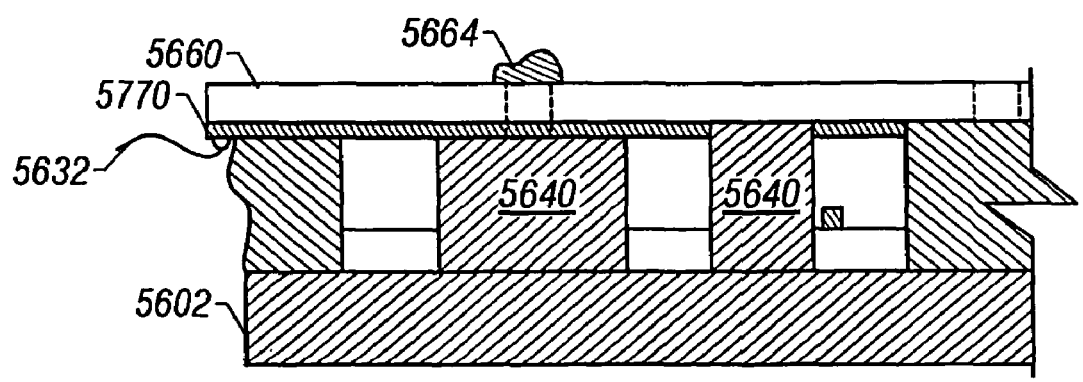

An alternate method of bonding the cover glass to the waveguide and channel structure is illustrated in FIG. 58. In this example, a fluid channel is patterned over a waveguide as in FIG. 56(*a-c*), and one electrode on the cover glass makes direct contact with the fluid in a reservoir. As depicted in FIG. 58(a), a cover glass 5660 is patterned with electrode 5770 as described above. FIG. 58(b) shows a bonding layer deposited and patterned (e.g., by deposition and etching or by screen printing), resulting in bonding regions 5880, which are configured to match the unetched portions of the oxide layer 5608. The cover glass is then aligned and bonded to the waveguide and channel structure as illustrated in FIG. 58(c). Wire bonding 5632 to the electrode, fluid injection, and sealing of the injection port follow as described above. Yet another option (not shown) is to form the patterned bonding layer on the waveguide and channel side instead of on the cover glass. Alignment, bonding, and subsequent electrical connections, fluid injection, and injection port sealing proceed in an analogous manner to what described above.

Yet another method of forming a device of the invention is illustrated in FIG. 59. In this example, a deep fluid channel is patterned next to a waveguide, and one electrode on the cover glass makes contact with the fluid in a reservoir. FIG. 59(a) illustrates a waveguide and channel structure formed by deep etching (e.g., with RIE) channels 5622, 5624, 5926, and 5928 through top cladding 5608 and bottom cladding 5604. The channels may reach down to the silicon substrate 5602, or there may be a thin residual oxide layer above the silicon surface. The gap between core 5606 and channel 5624 is sufficiently small that a portion of the optical signal that the device is designed to carry extends into channel 5624. This channel, as well as channel 5622 with which it communicates, will eventually be filled with fluids for operation of the device according to the invention. Channels 5926 and 5928, on the other hand, will eventually be filled with adhesive material and are not communicating with channels 5622 or 5624. As illustrated in FIG. 59(b), a cover glass 5660 is deposited with a conductive or resistive layer, which is then patterned to yield electrode 5770 and element 5972. This latter element, which is not electrically connected to the electrode, is left unetched to provide a very nearly planar surface for subsequent bonding to the waveguide and channel structure. Injection ports 5662 and 5966 are patterned in the cover glass, e.g., by drilling or etching. The cover glass is then aligned to the waveguide and channel structure, as illustrated in FIG. 59(c). A liquid bonding material 5944 (e.g., epoxy, polymer, silicate glass, or other suitable material) is injected through port 5966, and the same material 5946 is applied to exposed areas on the outside of the assembled structure. The bonding material is processed as needed to obtain a stable bond (e.g., by application of heat and/or light for a period of time). Wire bonding, fluid injection, and sealing of the injection port proceed as described above.

The devices described in the preceding figures consist of fluid channels patterned in the same substrate that holds the waveguide structures. A device of the invention may instead consist of channels partly patterned in the cladding layer or layers of the waveguide structure, and partly in the cover glass. Similar masking and etching steps used in the process to pattern a channel in the oxide layers of the waveguide may be employed to pattern a channel in the Pyrex or silica cover glass. The resulting devices may consist of channels entirely in the waveguide structure, entirely in the cover glass, or a combination of the two. Patterning channels at least partly in the cover glass may present several advantages, such as larger dimensions for reduced viscous drag, and greater flexibility in designing the channel structures.

Another method of forming a device of the invention consists of patterning the channels in a bare silicon substrate or in a silicon substrate with a thermally grown oxide layer, while the optical waveguides are patterned on a separate substrate in the standard way as shown in FIG. 56(a). To provide proper alignment of the cores to the fluid-containing channels, location tabs (or slots) may be etched into the surface of the core-containing substrate, which tabs (or slots) fit into slots (or tabs, respectively) on the channel-containing substrate.

In the bonding methods described above, the bonding layer is assumed to have a certain mechanical compliance, either at standard temperature and pressure, or at elevated temperature and/or pressure. This compliance enables the bond to form even when the two surfaces to be bonded are not perfectly flat. Departures from flatness may arise because of nonuniformities in the manufacturing process, e.g., in the thickness of deposited oxide layer 5608; because of curvature, either inherent or induced, of either the substrate or the cover glass; because of particles of dust or dirt inadvertently trapped between the two surfaces during assembly; or because of surface topography, e.g., such as the conductive or resistive layer 5630 in FIG. 56(f). Formation of the bond, e.g., through application of heat and/or pressure over a period of time, can be designed to occur with a degree of plastic deformation, or flow, of the bonding material sufficient to ensure full contact of the two surfaces over the entire bonding area.

Alternatively, the two surfaces may be configured to be very nearly flat prior to the bonding step. This may be achieved through careful control of the processing conditions and/or through subsequent planarization of either one or both surfaces (e.g., by lapping, polishing, chemical mechanical polishing, or a combination of all three). In this case, compliance of the bonding material is not required, and additional bonding processes may be employed. For example, if the two surfaces to be bonded have silicon oxide as the topmost layer, direct bonding (e.g., applying pressure in vacuum or in a clean atmosphere) may be used. Another process, suitable where the materials in the substrate and cover glass are conductive, is anodic bonding, where a large electrical current is sent through the bonding area after making contact between the two surfaces.

A device of the invention may also be hermetically sealed with glass, metal, or other material to prevent evaporation of liquid or diffusion of fluids from or into the device. Polymers used in making a device (such as, e.g., epoxy) typically allow fluid diffusion. Consequently, a hermetic seal is desirable to extend the useful life of a device of the invention. A hermetic seal may include the use of a suitably hermetic material in the bonding process (e.g., sealing glass or spin-on silicate glass), the use of a hermetic bond (e.g., direct bonding or anodic bonding), and/or the use of a hermetic material (e.g., gold or other metal, or a glass overlayer) in sealing the fluid injection ports.

The devices described above include injection ports patterned in the cover glass, typically drilled, etched, or ablated vertically through the cover glass thickness. An alternative consists of patterning a horizontal channel, either in the waveguide structure or in the cover glass, that extends all the way to the edge of the device. This channel may then be used as an injection port to deliver a fluid or fluids to the desired positions in the main channel structures inside the device, and may then be sealed as described above for vertical injection ports.

A gas bubble may be introduced into the channel as one of the fluids. Once a bubble is injected through one of the fluid injection ports, additional fluid or fluids can be injected through the same port to move the bubble into proper position in the channel. Other components such as solids may be introduced through the injection port or may be placed in the channel before glass layer 5660 is placed on cladding 5608. Thus, a polymeric or crystalline diffraction grating may be placed in the channel prior to bonding the glass layer onto the cladding, and fluid or fluids may then be introduced into the channel through the injection ports to contact the grating and fill the remainder of the channel.

In some devices of the invention, several fluids are required for proper function. In this and other cases, it may be advantageous to use two ports, one for injection and one for venting. The desired fluids are then injected through an injection port in the order in which they are to be found in the channel. The fluids are positioned in the desired places in the channel (so that fluids to be moved by the motive force are in the region of the motive force, and fluids to be moved into or out of the optical zone are in the desired positions), and all the air in the channel vacates the channel through the second (venting) port if air is not one of the fluids to be incorporated into the device. Once the channel is filled with the desired fluids, the injection and venting ports are sealed with epoxy, and an optional protective glass overlayer is placed over the assembled device to improve the quality of the seal.

The processes of fluid injection and sealing of the injection port may instead be reversed. The injection port may be sealed with, e.g., RTV silicone, epoxy, or other suitable material. A needle inserted through the sealing material allows a microsyringe to deliver carefully controlled amounts of fluid or fluids to the channels in the device; an optional second needle, inserted in another sealed port, may function as a venting port. After the fluid or fluids are injected, the needles may optionally be removed, the sealing material closing up behind to form a seal.

Although only a few exemplary embodiments of the invention have been described in detail above, those skilled in the art will readily appreciate that a number of modifications are possible in the exemplary embodiments without materially departing from the novel teachings and advantages of the invention. Accordingly, the following claims are to be afforded an interpretation consistent with the specific embodiments as well as the broad principles of the invention discussed herein.

What is claimed is:

1. A planar waveguide device comprising a substrate defining a first microchannel and having a first waveguide composed of a core and a cladding, wherein a first portion of the microchannel is positioned in sufficient proximity to a first portion of the core of the waveguide that an amount of optical power from an optical signal traversing the waveguide extends into said portion of the microchannel positioned in proximity to said portion of the core, wherein the microchannel does not bisect the core, wherein the microchannel comprises a continuous microchannel in which a fluid can circulate, wherein interfaces within the fluid can be moved along the microchannel in one direction to return to their points of origin or the interfaces can be moved forward and backward between different positions as desired, and wherein the microchannel is formed in the substrate.

2. A device according to claim 1 further comprising a second waveguide having a second core, a first portion of the second core being in sufficient proximity to the first waveguide that at least a portion of the optical power from the optical signal traversing the first waveguide couples into the second waveguide.

3. A device according to claim 2 wherein a second portion of the microchannel is in sufficient proximity to the first portion of the second core that an amount of optical power from an optical signal traversing the second waveguide extends into said second portion of the microchannel.

4. A device according to claim 2 wherein the first portion of the microchannel in proximity to the first core is also in sufficient proximity to the second core that an amount of optical power from an optical signal traversing the second waveguide extends into the first portion of the microchannel.

5. A device according to claim 2 wherein the device further comprises a second microchannel, a first portion of the second microchannel being in sufficient proximity to the first portion of the second core that an amount of optical power from an optical signal traversing the second waveguide extends into said first portion of the second microchannel.

6. A device according to claim 5 wherein the second microchannel is a discontinuous microchannel having a first end and a second end.

7. A device according to claim 6 wherein the second microchannel contains a fluid identical to one of said fluids in the first microchannel and the second microchannel has dimension about equal to dimensions of the first portion of the first microchannel such that temperature sensitivity of the device is reduced compared to an identical device that does not have the second microchannel.

8. A device according to claim 5 wherein the second microchannel is a continuous microchannel.

9. A device according to claim 8 wherein the second microchannel contains a first optical material and a first fluid, the first optical material being movable to and from the first portion of the second microchannel by application of electricity or heat.

10. A device according to claim 1 wherein the first waveguide is configured such that the optical signal is multimode as the optical signal traverses the portion of the first core positioned in sufficient proximity to the first portion of the first microchannel that said amount of optical power extends into the first portion of the first microchannel.

11. A device according to claim 10 wherein the device comprises a second microchannel having a first portion in sufficient proximity to the first core that a portion of said optical power extends into the first portion of the second microchannel.

12. A device according to claim 11 wherein the second microchannel is a continuous microchannel.

13. A device according to claim 10 wherein the optical device is a multimode interference filter having a first exit waveguide and a second exit waveguide coupled to said first waveguide.

14. A device according to claim 1 wherein the device is configured to separate different optical modes of the optical signal.

15. A device according to claim 14 wherein said first waveguide forms a portion of a first exit waveguide from the device, wherein the device further comprises a first entrance waveguide, a second entrance waveguide, and a second exit waveguide in optical communication with a multimode interference waveguide, wherein the first entrance waveguide and the second entrance waveguide are of unequal width, wherein the first exit wave guide and the second exit waveguide are of equal width, and wherein a second portion of the first microchannel is also positioned in sufficient proximity to a portion of said second exit waveguide that an amount of said optical power extends into said second portion of the first microchannel.

16. A device according to claim 15 wherein said first portion of the first microchannel is positioned adjacent to the first exit waveguide in sufficient proximity that a portion of power of the optical signal entering the first exit waveguide extends into the first portion of the first microchannel and said second portion of the first microchannel is positioned adjacent to the second exit waveguide in sufficient proximity that a portion of power of the optical signal entering the second exit waveguide extends into the second portion of the first microchannel.

17. A device according to claim 1 wherein the device is configured to effect an interference of the optical signal.

18. A device according to claim 17 wherein the device comprises a Mach-Zehnder interferometer.

19. A device according to claim 17 wherein the device comprises a multimode interference filter.

20. A device according to claim 1 wherein the device is configured to leak at least a portion of the optical signal from the core.

21. A device according to claim 20 wherein said first microchannel forms a portion of the cladding and not the core of the device.

22. A device according to claim 1 wherein the first portion of the first microchannel supplants said portion of the core of the first waveguide.

23. A device according to claim 1 wherein the first portion of the first microchannel does not supplant said portion of the core of the first waveguide.

24. A device according to claim 23 wherein the first portion of the first microchannel is immediately adjacent to said portion of the core of the first waveguide.

25. A device according to claim 23 wherein the first portion of the first microchannel is adjacent to and separated from said portion of the core of the first waveguide by a portion of the cladding.

26. A device according to claim 24 wherein said first portion of the core of the first waveguide is rib-shaped and wherein said first portion of the first microchannel is adjacent to one face of the rib.

27. A device according to claim 24 wherein said first portion of the core of the first waveguide is rib-shaped and wherein said first portion of the first microchannel is adjacent to three faces of the rib.

28. A device according to claim 1 wherein the first portion of the microchannel has a first cross-sectional area, and a second portion of the microchannel away from the first waveguide has a second cross-sectional area greater than the first cross-sectional area.

29. A device according to claim 1 wherein the first portion of the microchannel has a first cross-sectional area, and a second portion of the microchannel away from the first waveguide has a second cross-sectional area smaller than the first cross-sectional area.

30. A device according to claim 28 wherein the microchannel contains a first optical material in or near the first portion of the microchannel and the microchannel contains a first fluid and a second fluid in a second portion of the microchannel, the first and second fluids having physical properties such that an interface between the first fluid and the second fluid moves as heat is applied to at least the first fluid or electricity is applied to the first and second fluids to thereby move the first optical material out of or into the first portion of the microchannel.

31. A device according to claim 1 wherein the first portion of the microchannel has a portion of a surface defining the microchannel modified to provide a force to the first optical material when an interface between the first optical material and the first fluid encounters said portion of the surface.

32. A device according to claim 1 wherein the device is configured as an evanescent coupler or a Mach Zehnder interferometer.

33. A device according to claim 1 wherein the device is configured as an optical shutter, a switch, an attenuator, a branching waveguide switch, or a multiplexer.

34. A device according to claim 1 wherein said device contains at least two immiscible fluids.

35. A planar waveguide device comprising a substrate defining a first microchannel and having at least one heater in heat exchange relationship with the microchannel and a first waveguide composed of a core and a cladding, wherein a first portion of the microchannel is positioned in sufficient proximity to a first portion of the core that an amount of optical power from an optical signal traversing the waveguide extends into the first portion of the microchannel; wherein the microchannel does not bisect the core; wherein the microchannel contains at least a first material having optical properties and a first fluid having physical properties such that the first fluid moves the first material toward or away from the core when the heater is actuated; and wherein the heater is positioned sufficiently far from the first material that the optical properties of the first material are unaffected when the heater is actuated.

36. An optical device comprising a substrate defining a first microchannel and having a first waveguide composed of a core and a cladding, wherein a first portion of the microchannel is positioned in sufficient proximity to a first portion of the core of the waveguide that an amount of optical power from an optical signal traversing the waveguide extends into the microchannel, wherein the microchannel does not bisect the core, wherein the microchannel contains at least a first fluid and a first optical material, wherein the first fluid has physical properties that move the first optical material within the first fluid upon application of energy to the first fluid, and wherein the first optical material has physical properties such that the first optical material refracts, diffracts, scatters, absorbs, or phase shifts an amount of the optical signal passing through the first optical material.

37. An optical device comprising a substrate defining a first microchannel and having a first waveguide composed of a core and a cladding, wherein a first portion of the microchannel is positioned in sufficient proximity to a first portion of the core of the waveguide that an amount of optical power from an optical signal traversing the waveguide extends into the microchannel, wherein the microchannel does not bisect the core, wherein the microchannel contains at least a first fluid and a first optical material, wherein the first fluid has physical properties that move the first optical material within the first fluid upon application of a force to the first fluid, said force being selected from electrocapillarity, differential-pressure electrocapillarity, electrowetting, electrophoresis, electroosmosis, dielectrophoresis, electrohydrodynamic pumping, magnetohydrodynamic pumping, thermal expansion, dielectric pumping, and variable dielectric pumping, and wherein the first optical material has physical properties such that the first optical material reflects an amount of the optical signal encountering the first optical material.

38. A device according to claim 37 wherein the first fluid has physical properties that move the first optical material within the first fluid upon application of a force to the first fluid, said force being selected from differential-pressure electrocapillarity, electrophoresis, electroosmosis, dielectrophoresis, electrohydrodynamic pumping, magnetohydrodynamic pumping, and variable dielectric pumping.

39. A method of transmitting an optical signal in a planar waveguide device comprising positioning a first optical fluid sufficiently near to a core of a waveguide of the device such that at least a portion of optical power from the optical signal passing through the waveguide extends into the first optical fluid, wherein the first optical fluid does not bisect the core, wherein the first optical fluid is in a microchannel that comprises a continuous microchannel in which the first optical fluid can circulate, and wherein interfaces within the first optical fluid can be moved along the microchannel in one direction to return to their points of origin or the interfaces can be moved forward and backward between different positions as desired.

* * * * *